United States Patent
Baligh et al.

(10) Patent No.: US 12,218,717 B2
(45) Date of Patent: Feb. 4, 2025

(54) SYSTEMS AND METHODS FOR USE OF REFLECTIVE INTELLIGENT SURFACES IN COMMUNICATION SYSTEMS

(71) Applicant: HUAWEI TECHNOLOGIES CO., LTD., Guangdong (CN)

(72) Inventors: Mohammadhadi Baligh, Kanata (CA); Jianglei Ma, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 18/325,454

(22) Filed: May 30, 2023

(65) Prior Publication Data
US 2023/0308140 A1 Sep. 28, 2023

Related U.S. Application Data

(63) Continuation of application No. PCT/CN2020/139179, filed on Dec. 24, 2020.

(51) Int. Cl.
*H04B 7/04* (2017.01)
*H04L 5/00* (2006.01)

(52) U.S. Cl.
CPC ....... *H04B 7/04013* (2023.05); *H04L 5/0048* (2013.01); *H04L 5/0098* (2013.01)

(58) Field of Classification Search
CPC .......... H04B 7/04013; H04B 7/0617; H04B 7/0639; H04B 7/026; H04L 5/0048; H04L 5/0098
See application file for complete search history.

(56) References Cited

U.S. PATENT DOCUMENTS

| | | | |
|---|---|---|---|
| 2019/0170484 A1* | 6/2019 | Kante | F41H 3/02 |
| 2023/0101393 A1* | 3/2023 | Dai | H04W 72/23 726/6 |

FOREIGN PATENT DOCUMENTS

| | | |
|---|---|---|
| CN | 111181615 A | 5/2020 |
| CN | 111245492 A | 6/2020 |
| CN | 111245494 A | 6/2020 |
| CN | 111313951 A | 6/2020 |
| CN | 111917448 A | 11/2020 |
| CN | 111954190 A | 11/2020 |
| WO | 2022055943 A1 | 3/2022 |

OTHER PUBLICATIONS

Jung Minchae et al., "Asymptotic Optimality of Reconfigurable Intelligent Surfaces: Passive Beamforming and Achievable Rate", ICC 2020—2020 IEEE International Conference on Communications (ICC), IEEE, Jun. 7, 2020 (Jun. 7, 2020), XP033797656, pp. 1-6.

Liu, Yiming et al., "Beamforming Designs for Reconfigurable Intelligent Surface Enhanced Wireless Communication System with Non-Ideal Hardware", CAC2020, Nov. 6, 2020 (Nov. 6, 2020).

* cited by examiner

*Primary Examiner* — Sung S Ahn
(74) *Attorney, Agent, or Firm* — Slater Matsil, LLP

(57) ABSTRACT

According to the present disclosure, there are provided methods and devices for utilizing controllable metasurface devices capable of redirecting a wavefront transmitted by a transmitter to a receiver in the wireless network to take advantage of the controllable metasurface device capabilities, intelligence, coordination and speed, and thereby enable solutions having different signaling details and capability requirements.

20 Claims, 26 Drawing Sheets

SYSTEMS AND METHODS FOR USE OF REFLECTIVE INTELLIGENT SURFACES IN COMMUNICATION SYSTEMS

CROSS REFERENCE

This application is a continuation of International Application No. PCT/CN2020/139179, filed on Dec. 24, 2020, the disclosure of which is hereby incorporated by reference in its entirety.

TECHNICAL FIELD

The present disclosure relates generally to wireless communications, and in particular embodiments, use of reflective intelligent surfaces (RIS) in communication systems.

BACKGROUND

In some wireless communication systems, user equipments (UEs) wirelessly communicate with a base station (for example, NodeB, evolved NodeB or gNB) to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

Metasurfaces have been investigated in optical systems for some time and recently have attracted interest in wireless communication systems. These metasurfaces are capable of affecting a wavefront that impinges upon them. Some types of these metasurfaces are controllable, meaning through changing the electromagnetic properties of the surface, the properties of the surface can be changed. For example, manipulation of the amplitude and/or phase can be achieved by changing an impedance or relative permittivity (and/or permeability) of the metamaterial.

As a result, a controllable metasurface can affect the environment and effective channel coefficients of a channel of which the metasurface is a part thereof. This results in the channel being represented as the combination of an incoming wireless channel and an outgoing wireless channel and the phase/amplitude response of the configurable metasurface.

Using these metasurfaces in wireless communication systems will necessitate methods for using them in the wireless network from deploying the metasurfaces to enabling them to work with other devices in the network.

SUMMARY

According to an aspect of the present disclosure, there are provided methods and devices for utilizing controllable metasurface devices capable of redirecting a wavefront transmitted by a transmitter to a receiver in the wireless network to take advantage of the controllable metasurface device capabilities, intelligence, coordination and speed, and thereby enable solutions having different signaling details and capability requirements. Embodiments for the methods and devices described herein provide mechanisms for identification, setup, signaling, control mechanism and communication of a communication network that includes one or more controllable metasurface device, one or more base station and one or more UE.

In some aspects of the disclosure, there is provided a method involving: a user equipment (UE) receiving first beam direction configuration information, the first beam direction configuration information indicating a beam direction for a first link to communicate with a base station (BS), wherein the first link is established between the UE and the BS via a reflective intelligent surface (RIS); and the UE receiving second beam direction configuration information, the second beam direction configuration information indicating a beam direction for a second link to communicate with the BS, wherein the second link is established between the UE and the BS without a RIS.

In some embodiments, the first link is used for at least one of: a data channel; a control channel; a feedback channel; a measurement channel; or a report channel.

In some embodiments, the second link is used for at least one of: a data channel; a control channel; a feedback channel; a measurement channel; or a report channel.

In some embodiments, the method further involves: the UE receiving channel measurement configuration information from the BS on the control channel, the channel measurement configuration information for configuring the UE to measure a channel between the BS and the UE for which a signal on the measurement channel has been reflected by the RIS; the UE receiving physical layer configuration information from the BS on the control channel, the physical layer configuration information for configuring the UE to receive data from the BS or transmit data to the BS that is reflected by the RIS; and the UE receiving a message comprising an indication for activation of the UE, the message comprising scheduling information pertaining to when the UE will receive a data signal on the data channel on the beam direction of a first link.

In some embodiments, the method further involves the UE receiving data from the RIS or transmitting data to the RIS.

In some embodiments, the method further involves the UE transmitting measurement feedback information on the report channel, the measurement feedback information comprising channel measurement information pertaining to the channel on a link between the BS and UE via reflection by the RIS or the channel on a link between the RIS and UE.

In some embodiments, the method further involves: the UE receiving a reference signal (RS) for channel measurement on the measurement channel; and the UE measuring the RS.

In some embodiments, the method further involves: the UE receiving configuration information from the BS on the control channel to enable the UE to establish a link with the RIS; and the UE establishing a link with the RIS.

In some embodiments, the method further involves the UE transmitting channel measurement feedback information on the report channel comprising channel measurement information pertaining to the channel on a link between the RIS and UE.

In some embodiments, the method further involves the UE transmitting a RS on a measurement channel to be measured by the RIS.

In some aspects of the disclosure, there is provided a method involving: a base station (BS) transmitting first beam direction configuration information, the first beam direction configuration information indicating a beam direction for use by a user equipment (UE) for a first link to communicate with the BS, wherein the first link is established between the BS and the UE via a reflective intelligent surface (RIS); and the BS transmitting second beam direction configuration information, the second beam direction configuration information indicating a beam direction for use by the UE for a second link to communicate with the BS, wherein the second link is established between the BS and the UE without a RIS.

In some embodiments, the first link is used for at least one of: a data channel; a control channel; a feedback channel; a measurement channel; or a report channel.

In some embodiments, the second link is used for at least one of: a data channel; a control channel; a feedback channel; a measurement channel; or a report channel.

In some embodiments, the method further involves: the BS transmitting channel measurement configuration information to the UE on the control channel, the channel measurement configuration information for configuring the UE to measure a channel between the BS and the UE for which a signal on the measurement channel has been reflected by the RIS; the BS transmitting physical layer configuration information to the UE on the control channel, the physical layer configuration information for configuring the UE to receive data from the BS or transmit data to the BS that is reflected by the RIS; the BS transmitting a message comprising an indication for activation of the UE, the message comprising scheduling information pertaining to when the UE will receive a data signal on the data channel on the beam direction of a first link.

In some embodiments, the method further involves the BS transmitting data to the UE or receiving data from the UE.

In some embodiments, the method further involves the BS receiving measurement feedback information on the report channel, the measurement feedback information comprising channel measurement information pertaining to the channel on a link between the BS and UE via reflection by the RIS or the channel on a link between the RIS and UE.

In some embodiments, the method further involves the BS transmitting a reference signal (RS) for channel measurement on the measurement channel.

In some embodiments, the method further involves the BS transmitting configuration information to the UE on the control channel to enable the UE to establish a link with the RIS.

In some embodiments, the method further involves the BS receiving channel measurement feedback information on the report channel comprising channel measurement information pertaining to the channel on a link between the RIS and UE.

In some embodiments, the method further involves the BS transmitting configuration information on the control channel to the RIS to enable the RIS to detect control and feedback information that the RIS is reflecting from the UE.

In some aspects of the disclosure, there is provided a method involving: a base station (BS) transmitting channel measurement configuration information to a user equipment (UE), the channel measurement configuration information for configuring the UE to measure a channel between the BS and the UE for which a signal on the channel has been reflected by a reflective intelligent surface (RIS); the BS transmitting physical layer configuration information for the UE, the physical layer configuration information for configuring the UE to receive data from the BS or transmit data to the BS that is reflected by the RIS; and the BS transmitting data to the RIS or receiving data from the RIS.

In some aspects of the disclosure, there is provided a method involving: a user equipment (UE) receiving channel measurement configuration information from a base station (BS), the channel measurement configuration information for configuring the UE to measure a channel between the BS and the UE for which a signal on the channel has been reflected by a reflective intelligent surface (RIS); the UE receiving physical layer configuration information, the physical layer configuration information for configuring the UE to receive data from the BS or transmit data to the BS that is reflected by the RIS; and the UE receiving data from the RIS or transmitting data to the RIS.

In some aspects of the disclosure, there is provided a method involving: a reflective intelligent surface (RIS) receiving channel measurement RIS panel configuration information, the RIS panel channel measurement configuration information for configuring the RIS to reflect a reference signal (RS) for measurement to the UE; the RIS redirecting the RS to the UE; and the RIS receiving RIS panel configuration information, the RIS panel configuration information for configuring the RIS to reflect data from the BS to the UE or from UE to the BS; and the RIS redirecting the data from the BS to the UE or from UE to the BS.

In some aspects of the disclosure, there is provided a method involving: a reflective intelligent surface (RIS) receiving channel measurement RIS panel configuration information, the RIS panel channel measurement configuration information for configuring the RIS to reflect a reference signal (RS) for measurement to the UE; the RIS receiving the RS from the UE; and the RIS receiving RIS panel configuration information, the RIS panel configuration information for configuring the RIS to reflect data from the BS to the UE or from UE to the BS; and the RIS redirecting the data from the BS to the UE or from UE to the BS.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
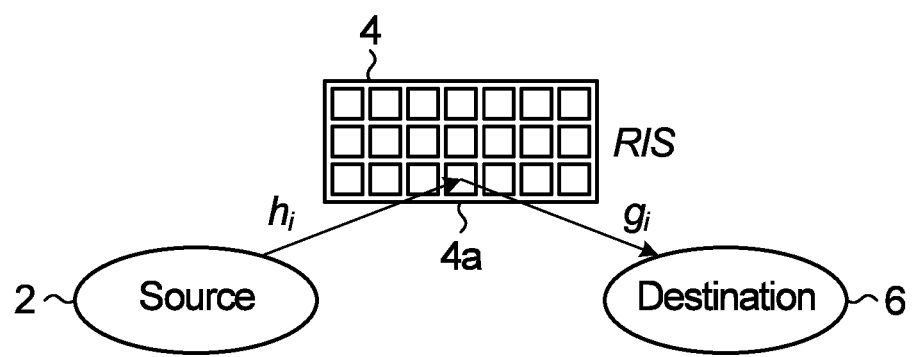
FIG. 1 is a schematic diagram of a transmission channel between a source and destination in which a planar array of configurable elements is used to redirect signals according to an aspect of the disclosure.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Controllable metasurfaces are referred to by different names such as reconfigurable intelligent surface (RIS), large intelligent surface (LIS), intelligent reflecting surface (IRS), digital controlled surface (DCS), intelligent passive mirrors, and artificial radio space. While in subsequent portions of this document RIS is used most frequently when referring to these metasurfaces, it is to be understood then this is for simplicity and is not indented to limit the disclosure.

A RIS can realize smart radio environment or "smart radio channel" i.e. the environment radio propagation properties can be controlled to realize personalized channel for desired communication. The RIS may be established among multiple base stations to produce large scale smart radio channels that serve multiple users. With a controllable environment, RISs may first sense environment information and then feeds it back to the system. According to his date, the system may optimize transmission mode and RIS parameters through smart radio channels, at the transmitter, channel and receiver.

Because of the beamforming gains associated with RISs, exploiting smart radio channels can significantly improve link quality, system performance, cell coverage, and cell edge performance in wireless networks. Not all RIS panels use the same structure. Different RIS panels may be designed with various phase adjusting capabilities that range from continuous phase control, to discrete control with a handful of levels.

Another application of RISs is in transmitters that directly modulate incident radio wave properties, such as phase, amplitude polarization and/or frequency without the need for active components as in radio frequency (RF) chains in traditional MIMO transmitters. RIS based transmitters have many merits, such as simple hardware architecture, low hardware complexity, low energy consumption and high spectral efficiency. Therefore, RIS provides a new direction for extremely simple transmitter design in future radio systems.

RIS assisted MIMO also may be used to assist fast beamforming with the use of accurate positioning, or to conquer blockage effects through CSI acquisition in mmWave systems. Alternatively, RIS assisted MIMO may be used in non-orthogonal multiple access (NOMA) in order to improve reliability at very low SNR, accommodate more users and enable higher modulation schemes. RIS is also applicable to native physical security transmission, wireless power transfer or simultaneous data and wireless power transfer, and flexible holographic radios.

The ability to control the environment and network topology through strategic deployment of RISs, and other non-terrestrial and controllable nodes is an important paradigm shift in MIMO system, such as 6G MIMO. Such controllability is in contrast to the traditional communication paradigm, where transmitters and receivers adapt their communication methods to achieve the capacity predicted by information theory for the given wireless channel. Instead, by controlling the environment and network topology, MIMO aims to be able to change the wireless channel and adapt the network condition to increase the network capacity.

One way to control the environment is to adapt the topology of the network as the user distribution and traffic pattern changes over time. This involves utilizing HAPs, UAVs and drones when and where it is necessary.

RIS-assisted MIMO utilizes RISs to enhance the MIMO performance by creating a smart radio channels. To extract full potential of RIS-assisted MIMO, a system architecture and more efficient scheme are provided in the present disclosure.

Comparing with beamforming at transmit or receiver sides, spatial beamforming at RIS has more flexibility to realize the beamforming gain as well as to avoid the blockage fading between the transmitter and receiver, which is more favorable for high frequency MIMO communication.

An RIS may include many small reflection elements, often comparable in size with the wavelength (for example, from 1/10 to a couple of wavelengths). Each element can be controlled independently. The control mechanism may be, for example, a bias voltage or a driving current to change the characteristics of the element. The combination of the control voltages for all elements (and hence the effective response) may be referred to as the RIS pattern. This RIS pattern may control the behavior of the RIS including at least one of the width, shape and direction of the beam, which is referred to as the beam pattern.

The controlling mechanism of the RIS often is through controlling the phase of a wavefront incident on the surface and reflected by the surface. Other techniques of controlling the RIS include attenuating reflection of the amplitude to reduce the reflected power and "switching off" the surface. Attenuating the power and switching off the surface can be realized by using only a portion of the RIS, or none of the RIS, for reflection while applying a random pattern to the rest of the panel, or a pattern that reflects the incident wavefront in a direction that is not in a desired direction.

In some portions of this disclosure, RIS may be referred to as a set of configurable elements arranged in a linear array or a planar array. Nevertheless, the analysis and discussions are extendable to other two or three dimensional arrangements (e.g., circular array). A linear array is a vector of N configurable elements and a planar array is a matrix of N×M configurable elements, where M and N are non-zero integers. These configurable elements have the ability to redirect a wave/signal that is incident on the linear or planar array by changing the phase of the wave/signal. The configurable elements are also capable of changing the amplitude, polarization, or even the frequency of the wave/signal. In some planar arrays these changes occur as a result of changing bias voltages that controls the individual configurable elements of the array via a control circuit connected to the linear or planar array. The control circuit that enables control of the linear or planar array may be connected to a communications network that base stations and UEs communicating with each other are part of. For example, the network that controls the base station may also provide configuration information to the linear or planar array. Control methods other than bias voltage control include, but are not limited to, mechanical deformation and phase change materials.

Because of their ability to manipulate the incident wave/signal, the low cost of these types of RIS, and because these types of RIS require small bias voltages, RIS have recently received heightened research interest in the area of wireless communication as a valuable tool for beamforming and/or modulating communication signals. A basic example for RIS utilization in beamforming is shown in FIG. 1 where each RIS configurable element 4a (unit cell) can change the phase of the incident wave from source such that the reflected waves from all of the RIS elements are aligned to the direction of the destination to increase or maximize its received signal strength (e.g. maximize the signal to noise ratio (SNR)). Such a reflection via the RIS may be referred to as reflect-array beamforming. In some embodiments, the planar array of configurable elements, which may be referred to as an RIS panel, can be formed of multiple co-planar RIS sub-panels. In some embodiments, the RIS can be considered as an extension of the BS antennas or a type of distributed antenna. In some embodiments, the RIS can also be considered as a type of passive relay.

Introduction of controllable metasurfaces in a wireless network can increase the flexibility and reliability of the networks. Recently there has been a surge in interest in RIS utilization in wireless networks. However, much of this interest has been focused on measurement and channel state information (CSI) acquisition related to the RIS and how to optimize the RIS pattern for particular circumstances, capabilities and measurement accuracies.

Aspects of the present disclosure provide methods and device for utilizing RIS panels in the wireless network to take advantage of the RIS capabilities, intelligence, coordination and speed, and thereby propose solutions having different signaling details and capability requirements. Embodiments for the methods described herein provide mechanisms for identification, setup, signaling, control mechanism and communication of a communication network that includes one or more BS, one or RIS and one or more UE.

FIG. 1 illustrates an example of a planar array of configurable elements, labelled in the figure as RIS 4, in a channel between a source 2, or transmitter, and a destination 6, or receiver. The channel between the source 2 and destination 6 include a channel between the source 2 and RIS 4 identified as $h_i$ and a channel between the RIS 4 and destination 6 identified as $g_i$ for the $i^{th}$ RIS configurable element (configurable element 4a) where $i \in \{1, 2, 3, \ldots, N*M\}$ assuming the RIS consists of N*M elements or unit cells. A wave that leaves the source 2 and arrives at the RIS 4 can be said to be arriving with a particular angle of arrival (AoA). When the wave is reflected or redirected by the RIS 4, the wave can be considered to be leaving the RIS 4 with a particular angle of departure (AoD). In some embodiments, the planar array of configurable elements, which may be referred to as an RIS panel, can be formed of multiple co-planar RIS sub-panels. In some embodiments, the RIS can be considered as an extension of the BS antennas or a type of distributed antenna. In some embodiments, the RIS can also be considered as a type of passive relay.

While FIG. 1 has two dimensional planar array RIS 4 and shows a channel $h_i$ and a channel $g_i$, the figure does not explicitly show an elevation angle and azimuth angle of the transmission from the source 2 to RIS 4 and the elevation angle and azimuth angle of the redirected transmission from the RIS 4 to the destination 6. In the case of a linear array, there may be only one angle to be concerned about, i.e. the azimuth angle.

In wireless communications, the RIS 4 can be deployed as 1) a reflector between a transmitter and a receiver, as shown in FIG. 1, or as 2) a transmitter (integrated at the transmitter) to help implement a virtual MIMO system as the RIS helps to direct the signal from a feeding antenna.

FIGS. 2A, 2B, 3A, 3B and 3C following below provide context for the network and device that may be in the network and that may implement aspects of the present disclosure.

Figure 2A:
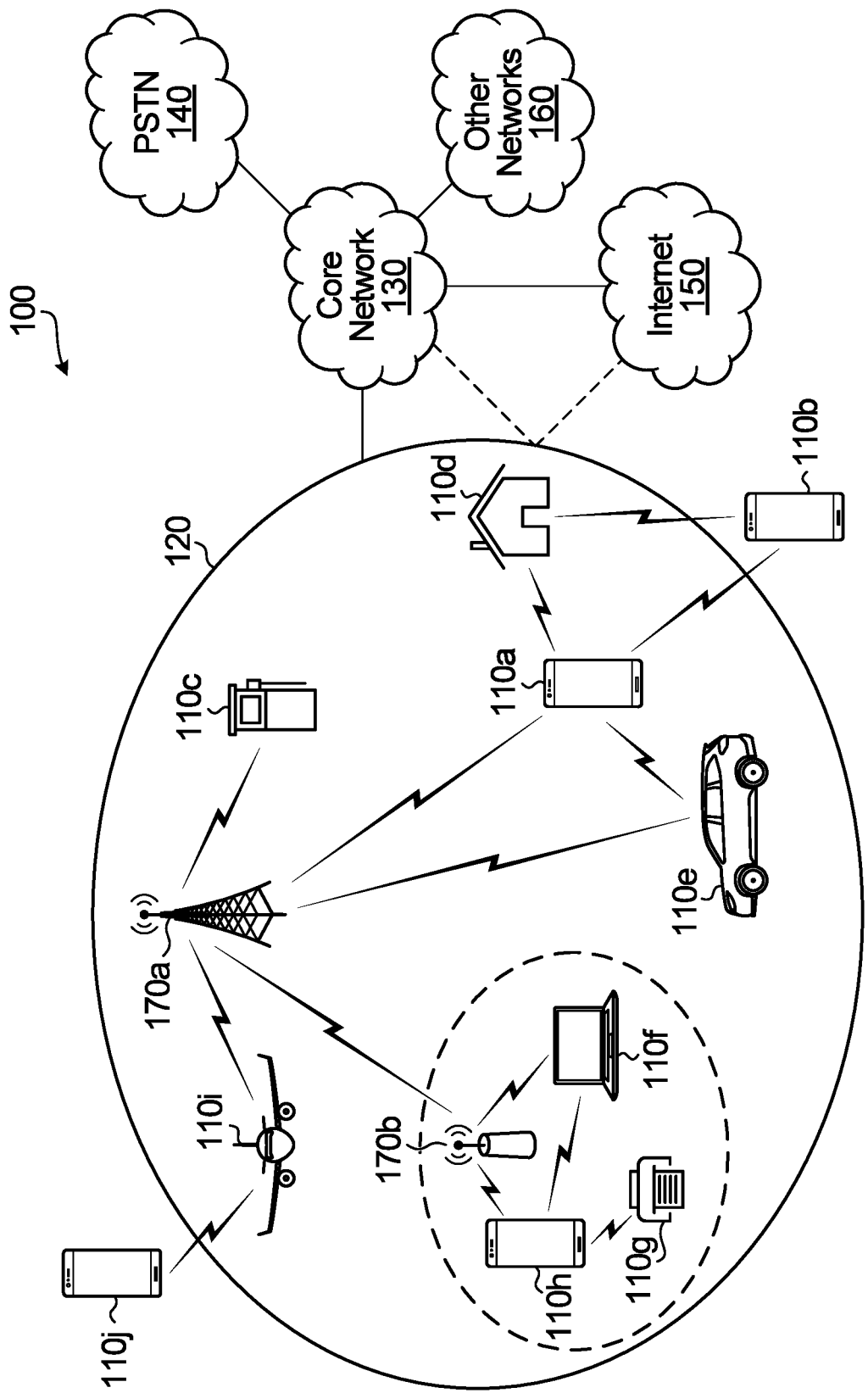
FIG. 2A is a schematic diagram of a communication system in which embodiments of the disclosure may occur.

Referring to FIG. 2A, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-120j (generically referred to as 110) may be interconnected to one another, and may also or instead be connected to one or more network nodes (170a, 170b, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2B:
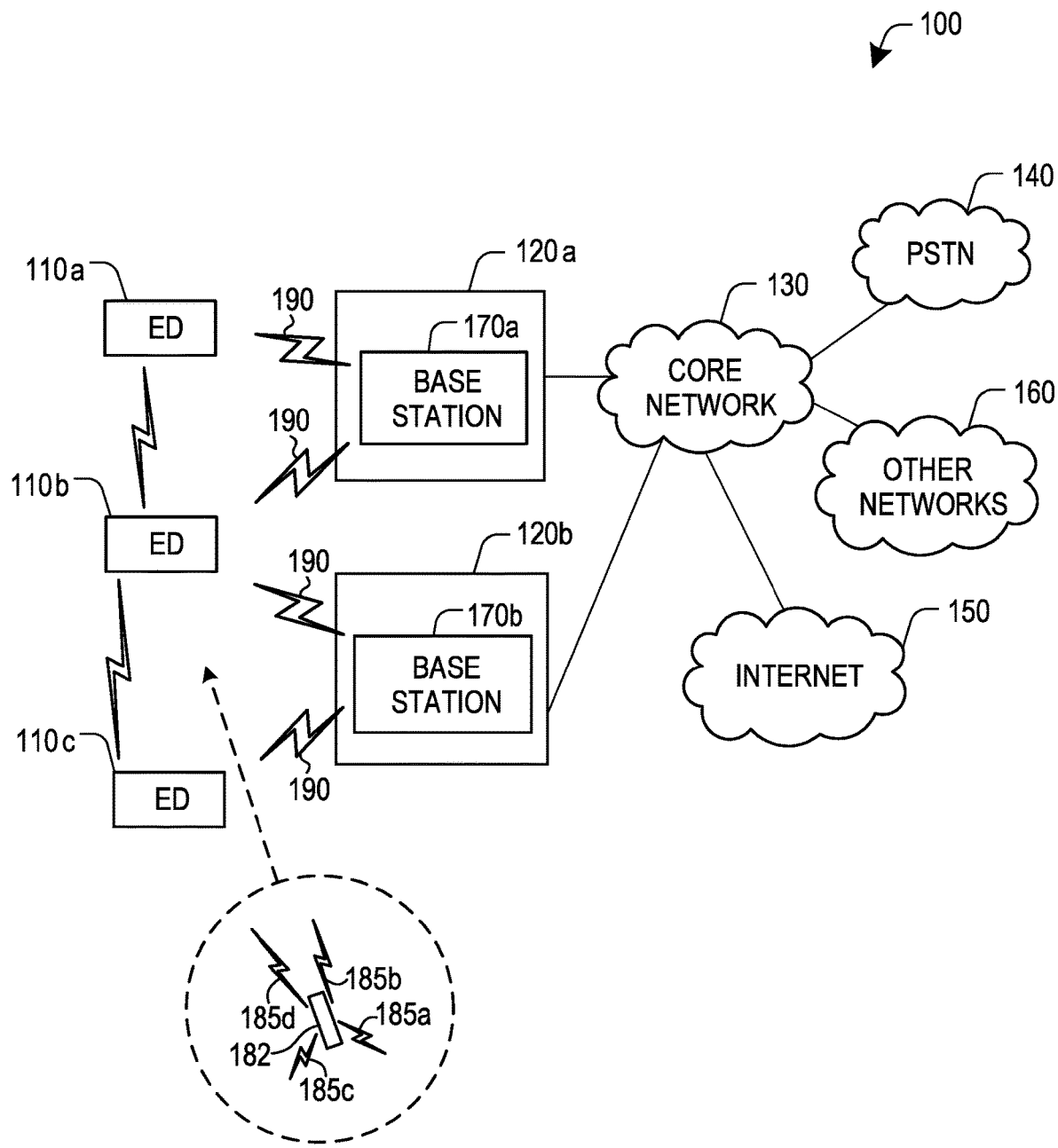
FIG. 2E is another schematic diagram of a communication system in which embodiments of the disclosure may occur.

FIG. 2B illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 2B, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 2B illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 2B, any reasonable number of these components or elements may be included in the communication system 100.

The EDs 110a-110c are configured to operate, communicate, or both, in the communication system 100. For example, the EDs 110a-110c are configured to transmit, receive, or both, via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 2B, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router.

In some examples, one or more of the base stations 170a-170b may be a terrestrial base station that is attached to the ground. For example, a terrestrial base station could be mounted on a building or tower. Alternatively, one or more of the base stations 170a-170b may be a non-terrestrial base station that is not attached to the ground. A flying base station is an example of the non-terrestrial base station. A flying base station may be implemented using communication equipment supported or carried by a flying device. Non-limiting examples of flying devices include airborne platforms (such as a blimp or an airship, for example), balloons, quadcopters and other aerial vehicles. In some implementations, a flying base station may be supported or carried by an unmanned aerial system (UAS) or an unmanned aerial vehicle (UAV), such as a drone or a quadcopter. A flying base station may be a moveable or mobile base station that can be flexibly deployed in different locations to meet network demand. A satellite base station is another example of a non-terrestrial base station. A satellite base station may be implemented using communication equipment supported or carried by a satellite. A satellite base station may also be referred to as an orbiting base station.

Any ED 110a-110c may be alternatively or additionally configured to interface, access, or communicate with any other base station 170a-170b, the internet 150, the core network 130, the PSTN 140, the other networks 160, or any combination of the preceding.

The EDs 110a-110c and base stations 170a-170b are examples of communication equipment that can be configured to implement some or all of the operations and/or embodiments described herein. In the embodiment shown in FIG. 2B, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSPUA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access operation, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more sidelink (SL) air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110a-110c may include operation for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

Also shown in FIG. 2B is a RIS 182 located within the serving area of base station 170b. A first signal 185a is shown between the base station 170b and the RIS 182 and a second signal 185b is shown between the RIS 182 and the ED 110b, illustrating how the RIS 182 might be located within the uplink or downlink channel between the base station 170b and the ED 110b. Also shown is a third signal 185c between the ED 110c and the RIS 182 and a fourth signal 185d is shown between the RIS 182 and the ED 110b, illustrating how the RIS 182 might be located within the SL channel between the ED 110c and the ED 110b.

While only one RIS 182 is shown in FIG. 2E, it is to be understood that any number of RIS could be included in a network.

In some embodiments, the signal is transmitted from a terrestrial BS to the UE or transmitted from the UE directly to the terrestrial BS and in both cases the signal is not reflected by a RIS. However, the signal may be reflected by the obstacles and reflectors such as buildings, walls and furniture. In some embodiments, the signal is communicated between the UE and a non-terrestrial BS such as a satellite, a drone and a high altitude platform. In some embodiments, the signal is communicated between a relay and a UE or a relay and a BS or between two relays. In some embodiments, the signal is transmitted between two UEs. In some embodiments, one or multiple RIS are utilized to reflect the signal from a transmitter and a receiver, where any of the transmitter and receiver includes UEs, terrestrial or non-terrestrial BS, and relays.

Figure 3A:
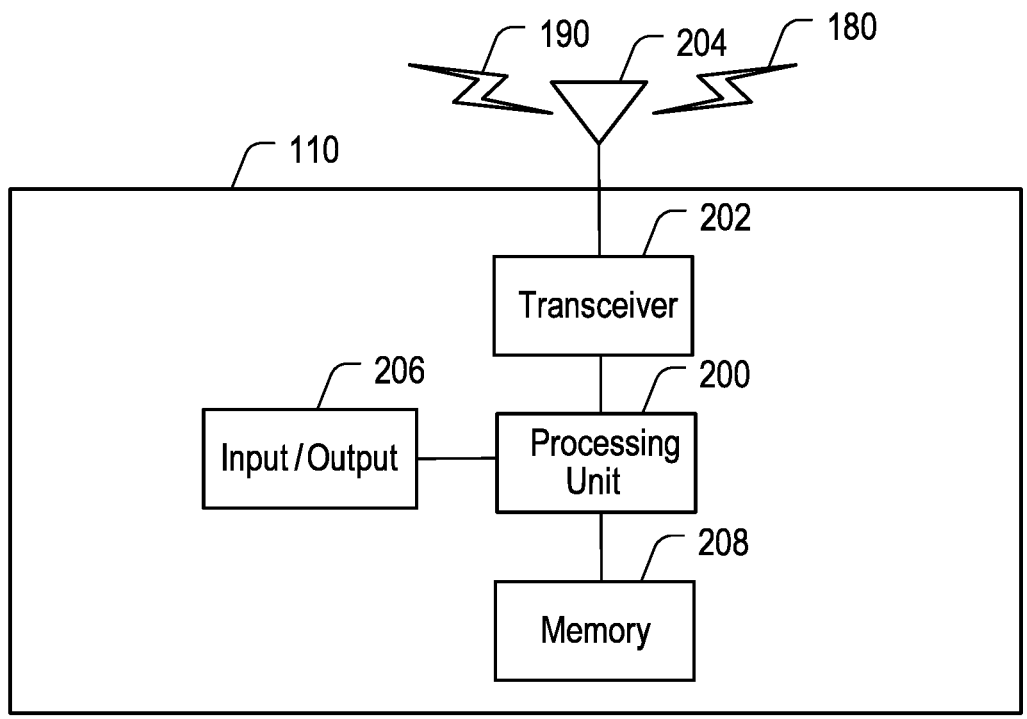
FIGS. 3A, 3E and 3C are block diagrams of an example user equipment, base station and RIS, respectively.
Figure 3B:
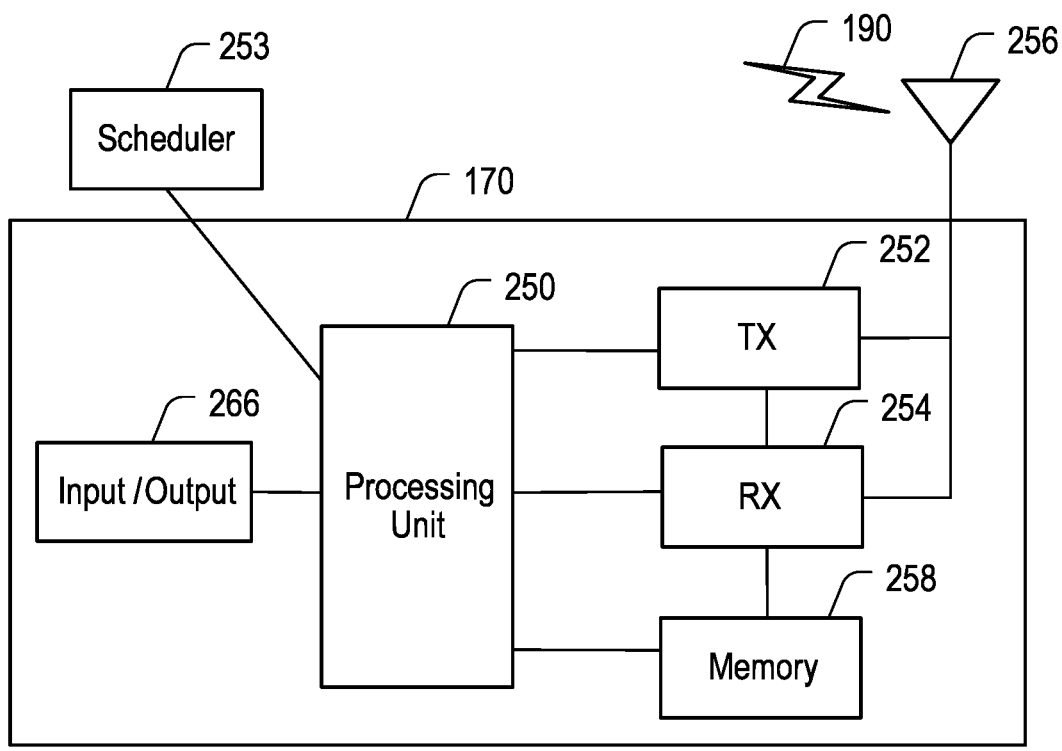

FIGS. 3A and 3B illustrate example devices that may implement the methods and teachings according to this disclosure. In particular, FIG. 3A illustrates an example ED 110, and FIG. 3B illustrates an example base station 170. These components could be used in the system 100 or in any other suitable system.

As shown in FIG. 3A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the operations and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the operations and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the operations and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 3C:
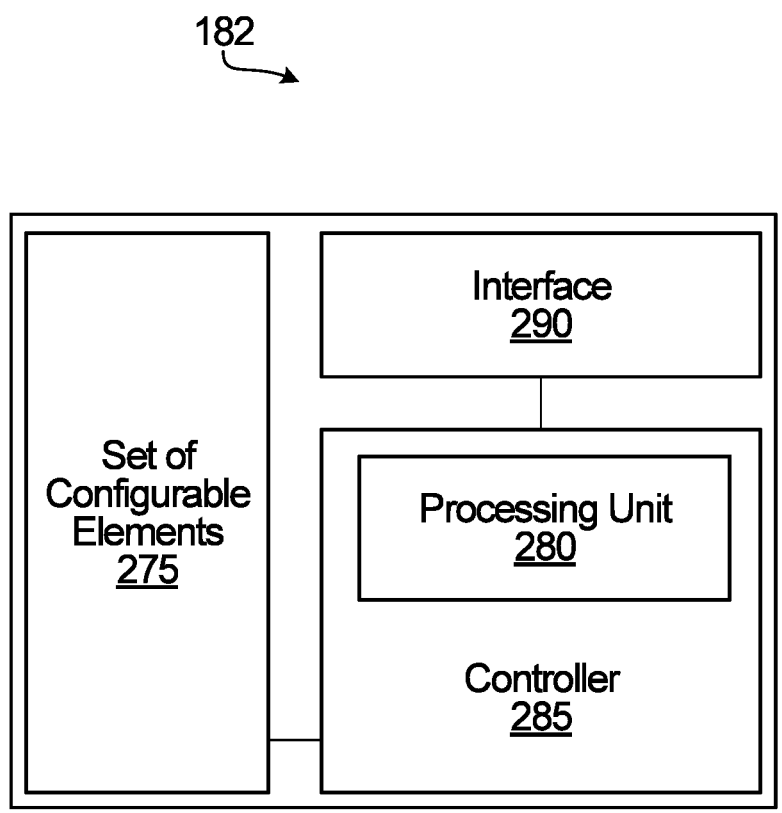

FIG. 3C illustrates an example RIS device that may implement the methods and teachings according to this disclosure. In particular, FIG. 3C illustrates an example RIS device 182. These components could be used in the system 100 or in any other suitable system. [1o6] As shown in FIG. 3C, the RIS device 182, which may also be referred to as a RIS panel, includes a controller 285 that includes at least one processing unit 280, an interface 290, and a set of configurable elements 275. The set of configurable elements are arranged in a single row or a grid or more than one row, which collectively form the reflective surface of the RIS panel. The configurable elements can be individually addressed to alter the direction of a wavefront that impinges on each element. RIS reflection properties (such as beam direction, beam width, frequency shift, amplitude, and polarization) are controlled by RF wavefront manipulation that is controllable at the element level, for example via the bias voltage at each element to change the phase of the reflected wave. This control signal forms a pattern at the RIS. To change the RIS reflective behavior, the RIS pattern needs to be changed.

Connections between the RIS and a UE can take several different forms. In some embodiments, the connection between the RIS and the UE is a reflective channel where a signal from the BS is reflected, or redirected, to the UE or a signal from the UE is reflected to the BS. In some embodiments, the connection between the RIS and the UE is a reflective connection with passive backscattering or modulation. In such embodiments a signal from the UE is reflected by the RIS, but the RIS modulates the signal by the use of a particular RIS patter. Likewise, a signal transmitted from the BS may be modulated by the RIS before it reaches the UE. In some embodiments, the connection between the RIS and the UE is a network controlled sidelink connection. This means that that the RIS may be perceived by the UE as another device like a UE, and the RIS forms a link similar to two UEs, which is scheduled by the network. In some embodiments, the connection between the RIS and the UE is an ad hoc in-band/out-of-band connection.

A RIS device, also referred to as a RIS panel, is generally considered to be the RIS and any electronics that may be used to control the configurable elements and hardware and/or software used to communication with other network nodes. However, the expressions RIS, RIS panel and RIS device may be used interchangeably in this disclosure to refer to the RIS device used in a communication system.

The processing unit 280 implements various processing operations of the RIS 182, such as receiving the configuration signal via interface 290 and providing the signal to the controller 285. The processing unit 280 could, for example, include a microprocessor, microcontroller, digital signal processor, field programmable gate array, or application specific integrated circuit. [11o] While this is a particular example of an RIS, it should be understood that the RIS may take different forms and be implemented in different manner than shown in FIG. 3C. The RIS 182 ultimately needs a set of configurable elements that can be configured as described to operate herein.

FIG. 3C illustrates an interface 290 to receive configuration information from the network. In some embodiments, the interface 290 enables a wired connection to the network. The wired connection may be to a base station or some other network-side device. In some embodiments, the wired connection is a propriety link, i.e. a link that is specific to a particular vendor or supplier of the RIS equipment. In some embodiments, the wired connection is a standardized link, e.g. a link that is standardized such that anyone using the RIS uses the same signaling processes. The wired connection may be an optical fiber connection or metal cable connection.

In some embodiments, the interface 290 enables a wireless connection to the network. In some embodiments, the interface 290 may include a transceiver that enables RF communication with the BS or with the UE. In some embodiments, the wireless connection is an in-band propriety link. In some embodiments, the wireless connection is an in-band standardized link. The transceiver may operate out of band or using other types of radio access technology (RAT), such as Wi-Fi or BLUETOOTH. In some embodiments, the transceiver is used for low rate communication and/or control signaling with the base station. In some embodiments, the transceiver is an integrated transceiver such as an LTE, 5G, or 6G transceiver for low rate communication. In some embodiments, the interface could be used to connect a transceiver or sensor to the RIS.

Examples of how the RIS can be discovered in a network, a BS-RIS link set up, a RIS-UE link identified, the RIS-UE link setup, the RIS and the RIS-UE link activated and deactivated will be described in further detail below. However, before those examples, FIGS. 4A, 4B and 4C shown come examples of how an RIS may be arranged in a telecommunication network to create a RIS assisted link between a BS and one or more UE.

As explained above, the phase shifts that occur due to the configurable elements of the RIS depend on the frequency of the incident wave in addition to the bias voltage used to control the RIS. The following description explains how such phenomena can impact a reflected signal from the RIS between a transmitter and a receiver.

Depending on the type of material used in the RIS, a range of phase shift can be obtained within a particular bias voltage range for a first frequency, but a similar range of phase shift for a second frequency may need a different bias voltage range having different start and end voltages. For example, in a particular type of RIS material, at a frequency of 121.5 GHz, almost the full range of the phase shift is obtained with the voltage range between 1.6 volt and 2.7 volt while other applied voltages cause almost a constant phase shift. However, at a frequency of 126 GHz, almost the full range of the phase shift is obtained with the voltage range between 1 volt and 1.6 volt. Hence, for this type of RIS, a different and separate range of bias voltages need to be applied at different frequencies in order to obtain the required phase shift. This is more evident when the difference between the frequencies is a large difference. Based on the differences between different types of RISs, it may be beneficial that the RIS is able to generate its own RS patterns that are used to redirect wavefronts from a transmitter to a receiver, with additional input of relevant information from the network, transmitter, and/or receiver.

Figure 4A:
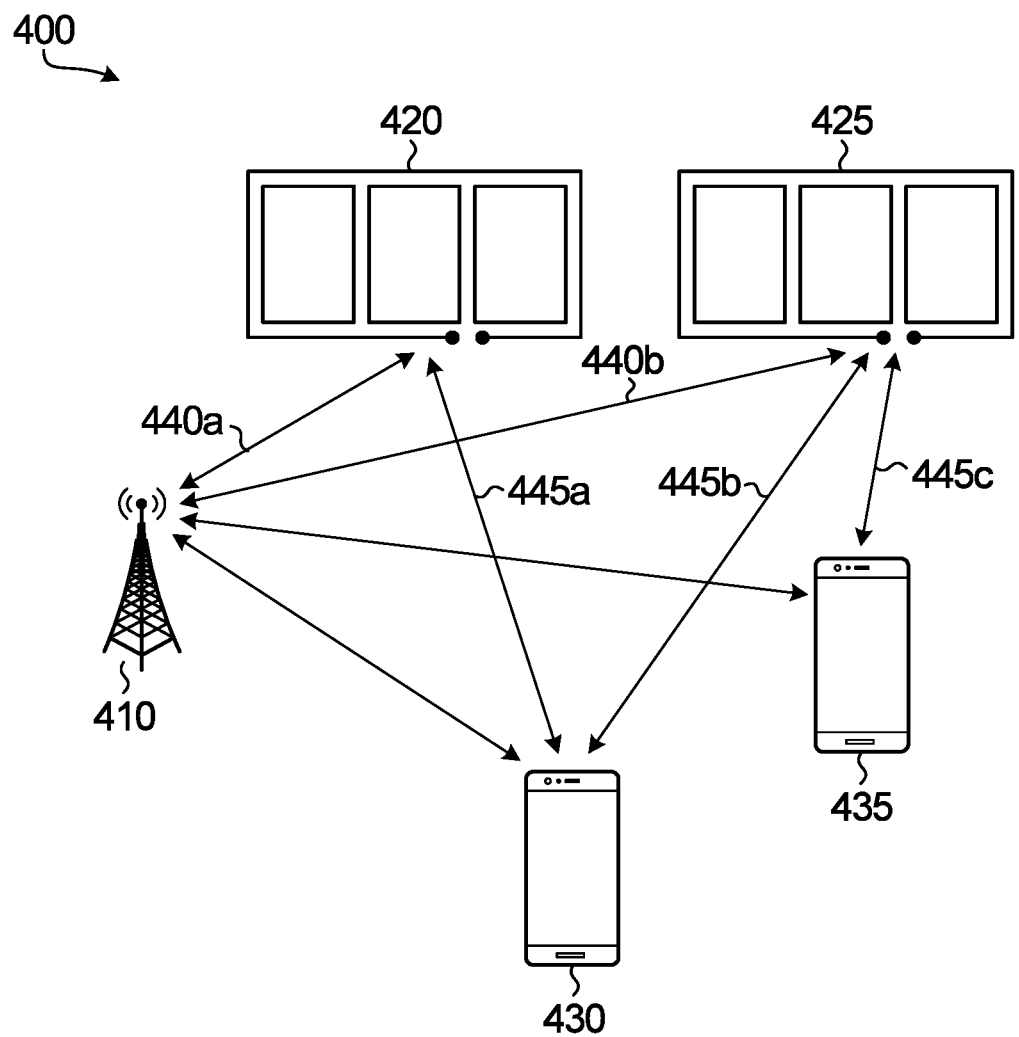
FIG. 4A is a schematic diagram of a portion of a network including a base station (BS), two reflecting intelligent surfaces (RIS) and two user equipment (UEs) according to an aspect of the application.
Figure 4B:
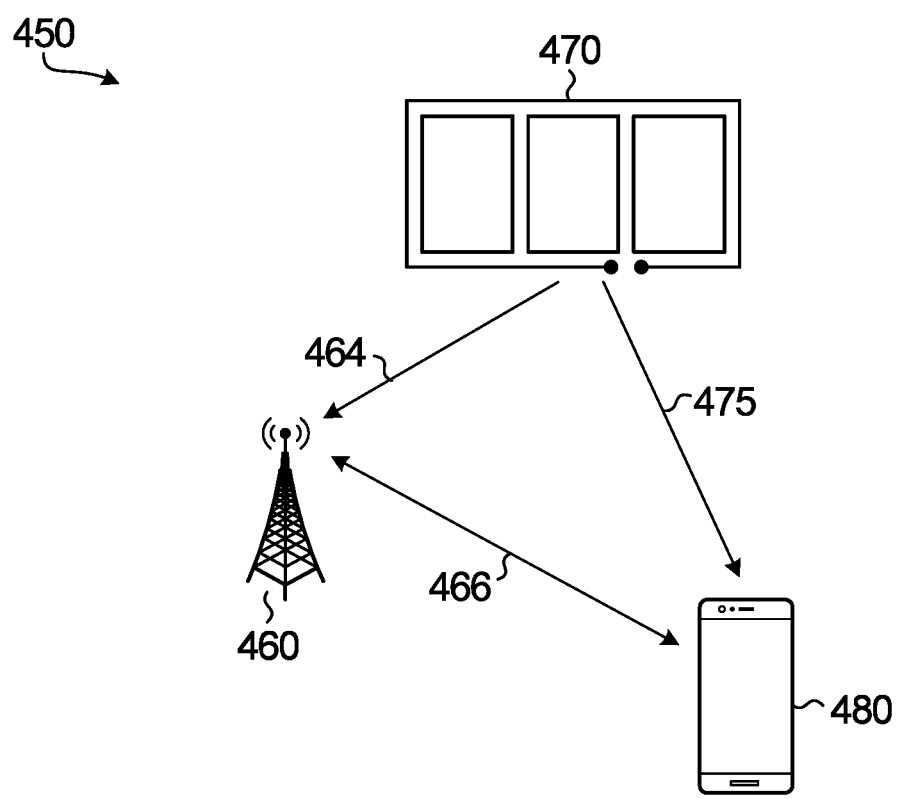
FIG. 4B is a schematic diagram of a portion of a network including a BS, a RIS and one UE according to an aspect of the application.
Figure 4C:
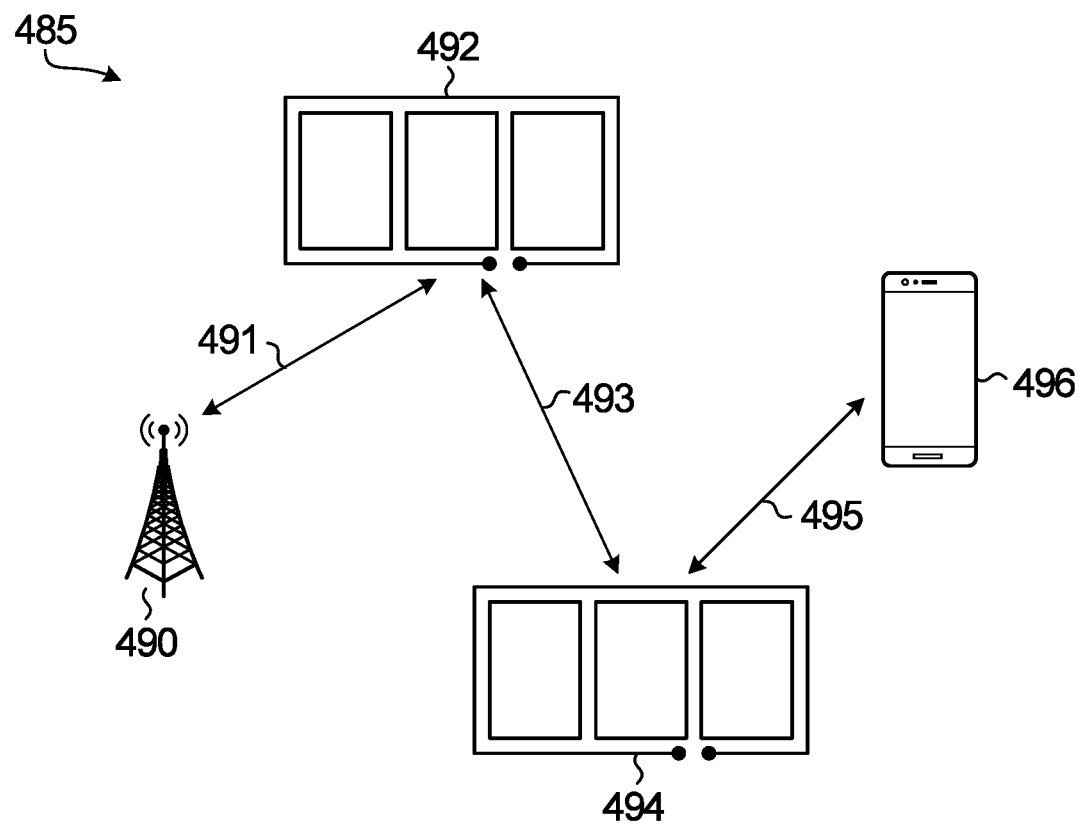
FIG. 4C is a schematic diagram of a portion of a network including a BS, two RIS and one UEs according to an aspect of the application.

FIG. 4A shows a first example of a portion of a communications network 400 that includes a base station (BS) 410, two RIS (RIS #1 420 and RIS #2 425) and two user equipment (UE #1 430 and UE #2 435). Each of RIS #1 420 and RIS #2 425 are capable of operating as an extension of antennas of the BS 410 for the purposes of transmission or reception, or both. The RIS are capable of reflecting and focusing a transmission wavefront propagating between the BS 410 and the UEs. The BS 410 is capable of communicating with the UEs via RIS. A first link 440*a*, for example, radio frequency RF link, is shown between RIS #1 420 and BS 410. A second link 440*b* is shown between RIS #2 425 and BS 410. The BS and the RIS can communicate in band, out of band or through a wired connection when communicating information about the RIS pattern that the RIS should use to reflect information, as well as other configuration information or control information, or both, that may need to be communicated between the RIS and BS.

A third link 440*b* is shown between RIS #1 420 and UE #1 430. A fourth link 445*b* is shown between RIS #2 425 and UE #1 430. A fifth link 445*c* is shown between RIS #2 425 and UE #2 435. The RIS and the UE can communicate in band, out of band or using other radio access technology (RAT) that is available to the devices when communicating information about the RIS pattern that the RIS should use to reflect data information, as well as other configuration information or control information, or both, that may need to be communicated between the RIS and UE.

The links between BS and RIS and the links between RIS and UE can share the same frequency band or occupy different frequency bands (for example different carriers or different bandwidth parts).

There is also a direct link 440*d* shown between the BS 410 and UE #1 430 and a direct link 440*c* between the BS 410 and RIS #2 435. The direct link between the BS and the UEs can be in a different frequency band than the link between the BS and UEs that occurs via the RIS.

As can be seen, the RIS #1 420 has formed a physical channel between BS 410 and UE #1 430 and RIS #2 425 has formed a physical channel between BS 410 and UE #1 430 and between BS 410 and UE #2 435. It is to be understood that an RIS can have a link with multiple UEs and with multiple BSs, even though not shown in FIG. 4A. Furthermore, while only 1 BS, 2 RIS and 2 UEs are shown in FIG. 4A, it is to be understood that this is merely an illustrative example and that there can be a single BS, RIS and UE or multiple (i.e. more than just 2) of each component could be in a communications network.

There are multiple RIS assisted communication modes that can occur between the BS, RIS and UE. Various communication modes will be described with regard to a single BS, a single USE and a single RIS that can be used to form a link between the BS and UE as shown in FIG. 4B. FIG. 4B shows a second example of a portion of a communications network 450 that includes a BS 460, a RIS 470 and a single user equipment (UE 480). The RIS 470 is capable of operating as an extension of antennas of the BS 460 for the purposes of transmission or reception. The RIS 470 is capable of reflecting and focusing a transmission wavefront propagating between the BS 460 and the UE 480. The BS 460 is capable of communicating with the UE 480 via RIS 470. A first link 464 is shown between the RIS 470 and the BS 460. The BS and the RIS can communicate in band, out of band or through a wired connection when communicating information about the RIS pattern that the RIS should use to reflect information, as well as other configuration information or control information, or both, that may need to be communicated between the RIS and BS.

A second link 475 is shown between the RIS 470 and the UE 480. The RIS and the UE can communicate in band, out of band or using other RAT that is available to the devices when communicating information about the RIS pattern that the RIS may use to reflect information, as well as other configuration information or control information, or both, that is communicated between the RIS and UE.

There is also a direct link 466 shown between the BS 460 and the UE 480. The direct link between the BS and the UE can be in a different frequency band than the link between the BS and UE that occurs via the RIS.

As can be seen, the RIS 470 has formed a physical link between the BS 460 and UE 480. It is to be understood that an RIS can have an link with multiple UEs and with multiple BSs, even though not shown in FIG. 4B. Furthermore, while only one BS, one RIS and one UE are shown in FIG. 4E, it is to be understood that this is merely an illustrative example and that multiple of each component could be in a communications network.

In some embodiments, the RIS may have a transceiver that can be used for low rate (an example of which is a microwave band below 6 GHz) communication and control signaling with either the UE or the BS.

The RIS panels may have coverage overlap with one another such that a group of users may be covered by multiple RIS. This includes coverage overlap with a coverage area of a donor BS or other BSs. A donor BS is considered a BS that transmits and receives signaling with a UE. The donor BS for the one or more RIS panels can be the same BS or multiple different BSs.

In some embodiments, RIS panels can be positioned such that they reflect signals to each other in the case of a multi-hop reflection. For example, the BS can transmit to a first RIS, which reflects to a second BS, that reflects to a UE. FIG. 4C illustrates a portion of a network including a BS 490, two RIS 492 and 494 and a single UE. A first link 491 is shown between the BS 490 and RIS #1 492. A second link 493 is shown between RIS #1 492 and RIS #2 494. A third link 495 is shown between RIS #2 494 and UE 496. The BSs and the RISs can communicate in band, out of band or through a wired connection when communicating information about the RIS pattern that the RIS should use to reflect information, as well as other configuration information or control information, or both, that may need to be communicated between the RIS and BS.

Using one or more RIS to reflect signaling between one or more BSs and one or more UEs can provided multiple benefits. In some embodiments, the use of an RIS can provide diversity enhancement by creating multiple independent communication paths for increased link reliability.

In some embodiments, the use of an RIS can be operated on a semi-static manner allowing a longer-term association of the RIS to a UE. In some embodiments, the use of an RIS can be operated on a dynamic allowing dynamic RIS selection.

To enable the use of RIS in a communication system, there are various control and signaling mechanisms that are proposed for operation.

One mechanism pertains to identifying candidate RIS that could be used by the system. In some embodiments, identifying the candidate RIS may involve RIS discovery based on sensing or reference signal (RS) based measurements. In some embodiments, identifying the candidate RIS may involve identification of candidate BS-RIS links and RIS-UE links, wherein a BS-RIS link refers to a link between the BS and the RIS and a RIS-UE link refers to a link between the RIS and the UE. In some embodiments, identifying the candidate RIS may involve network node, such as BS, oriented RIS discovery. In some embodiments, identifying the candidate RIS may involve using sensing or localization, or be based on UL RS measurement, for example a sounding reference signal (SRS). In some embodiments, identifying the candidate RIS may involve UE oriented RIS discover. In some embodiments, identifying the candidate RIS may involve UE assisted RIS panel identification with UE measurement feedback. The RIS-UE link discovery may involve the use of a RS for identifying that a RIS-UE link can be created between the RIS and the UE. This will be followed by the setup of the identified RIS-UE link that involves a subsequent channel measurement between the UE and BS or the UE and RIS. The RS used for identifying the RIS-UE link is less frequent and only for discovery of the RIS-UE link. The subsequent channel measurement used in the link setup may be performed more frequently.

When considering the identification of candidate RIS mechanism, there could be multiple manners in which this could be implemented and assisted. In a network assisted approach, the network aids in RIS-UE link identification. In some embodiments, such a network assisted approach may involve a BS informing the RISs or the UEs, or both, of a possible link based on localization information, such as position information of the RISs and the UEs. In some embodiments, such a network assisted approach may involve a BS providing a list of RIS panels in the proximity of the UEs to the UEs. In some embodiments, such a network assisted approach may involve a BS providing a list of UEs to RISs that are proximity to the UEs.

Figure 14:
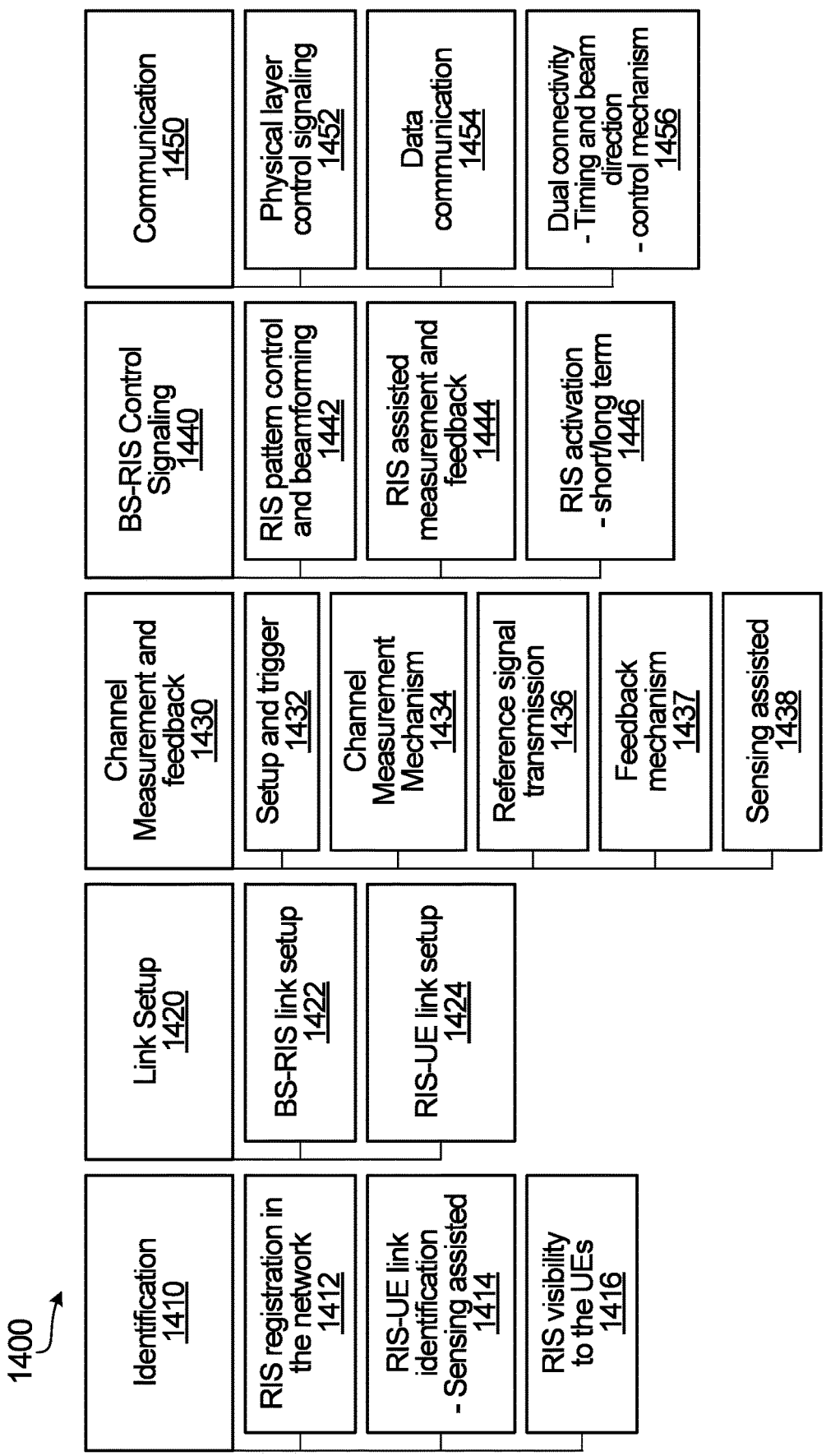
FIG. 14 is a schematic diagram of operations of a framework according to an aspect of the application.

FIG. 14 illustrates multiple operations of a RIS in a wireless communication network of an embodiment provided in the present disclosure. The operations include at least one of 1) identification 1410 of the RIS within the network, 2) link setup 1420 between a BS and a RIS and between the RIS and a UE, 3) Channel measurement and feedback 1430 that allows channel estimation to be performed, 4) RIS control signaling 1440 to configure a RIS pattern on the RIS to redirect a signal between the BS and UE and activate the RIS when the RIS is to be used and 5) communication 1450 that involves physical layer control signaling for configuring the UE when the link is activated and for transmission of data communication between the BS and UE via the RIS. Each of these operations have associated methods that can be performed by the base station, by the RIS and by the UE. Examples of such methods will be described in further detail below. In some embodiments, all of the method may be used to implement the discovery of an RIS and setting up and activating a link between the BS and UE for use as desired. However, the various methods can be used independently for an intended use whenever necessary. In some embodiments, the link between the BS and the RIS and the link between RIS and UE can share the same frequency band or occupy different frequency bands (for example different carriers or different bandwidth parts). In some embodiments, the link between the BS and the RIS may be considered and treated as a backhaul link.

Within the scope of the identification operation 1410 are different types of identification that are performed in deployment of the RIS. One feature of the identification operation 1410 pertains to RIS registration 1412 in the network. RIS registration may also be referred to as RIS discovery, RIS identification or RIS recognition and involves the RIS being identified by the network. Another feature of the identification operation 1410 pertains to identification 1414 of a RIS-UE link in the network for any UEs that may be in proximity to the RIS. Another feature of the identification operation 1610 pertains to RIS visibility with regard to the UEs 1416 in the network. Depending on whether the UE knows whether the RIS is in the link redirecting signals from the BS, or not, can affect how the RIS-UE link is identified. Example methods of the various features related to the identification operation 1410, as performed by the base station, by the RIS and by the UE, will be described in detail below.

Each of these functionalities and features thereof are described in detail below.

The present disclosure provides the identification operation 1410 below in some embodiments.

When the RIS is deployed in the network, the RIS has to be discovered, identified or recognized by the network in order to enable an RIS pattern on the RIS to be controlled and redirect a signal from the BS to one or more UE. When the RIS is operator deployed, for example when the operator is initially setting up a network and including the RIS in that setup, no signaling may be needed. Anytime RISs are added to the network subsequent to initial network setup has occurred, some level of control signaling may be needed to initialize the RIS within the network. Examples of the signaling will be described below. The initialization of the RIS may involve signaling to determine UE capabilities such as RIS size, RIS technology, reconfiguration speed and communication capabilities. Other signaling includes determining the type (wired, wireless, shared or private), speed, delay, jitter and reliability of the link between the RIS and the network. After the capability establishment, the network may configure the RIS with necessary configurations for communication to the network and the UEs and setup the RIS pattern. These may also be a function of the RIS capabilities. For example, signaling to configure the mechanism for RIS pattern settings is affected by the RIS capabilities, or configuration of the RIS-UE link discovery signal is impacted by the RIS transceiver capabilities.

From the UE perspective, the RIS may be considered in a number of different ways. For example, in some embodiments, the UE may not be aware that the UE is receiving signals that have been redirected by the RIS and as such the RIS may be "invisible" to the UE. In some embodiments, the RIS may be considered to be another UE and the UE can communicate with the RIS substantially using a sidelink type of capability. In some embodiments, the UE interacts with the RIS as it would interact with a BS. In some embodiments, the UE interacts with the RIS as it would interact with a hybrid relay. In some embodiments, the UE interacts with the RIS as a separate entity, such that the RIS is considered to be "visible" to the UE, and interacting with the entity involves using signaling that is based on agreed upon telecommunication standards.

From the BS perspective, the RIS may also be seen in a number of different ways. For example, the RIS may be considered to be part of the BS and may not be considered an independent entity. In some embodiments, the BS may interact with the RIS as the BS would interact with a UE that has a reflection capability. In some embodiments, the BS may interact with the RIS as the BS would interact with a remote radio head (RRH). In some embodiments, the BS may interact with the RIS as the BS would interact with a hybrid relay. In some embodiments, the BS may interact with the RIS by interacting with the RIS considered as a separate entity using signaling that is based on agreed upon telecommunication standards.

The identification operation 1410 in some embodiments comprises an operation 1412 of RIS Registration by the network.

An initial step in deployment of the RIS may be identification of the RIS by the network. Part of the identification of the RIS involves is forming a link between the BS and the RIS. The RIS link between the network and the RIS may be selected from a number of different types of communication media and as a result may use any of a number of different signaling mechanisms. A list of examples of the variety of communication media between the network and the RIS that is not intended to limit the disclosure, includes:

1) a wired connection such as Ethernet cable and optical fiber;
2) wireless in-band communication (that may include using the same frequency band or using different frequency bands, for example, a different carrier or bandwidth parts);
3) wireless out-of-band communication including use of unlicensed spectrum and other RAT such as Wi-Fi and Bluetooth; and
4) for signaling in a direction from the RIS to the BS, a passive communication mode such as backscattering and passive modulation. Backscattering may involve a wavefront impinging on the RIS being "modulated" to include information about the RIS. The modulation may constitute amplitude/phase/frequency manipulation of the signal by the configurable elements of the RIS, i.e. using an appropriate RIS set of patterns.

Discovery of the RIS includes signaling or messages exchanged between the RIS and the network, which may occur via one or more BS, may be performed using any of a variety of signaling methods. In some embodiments, a method for discovery of the RIS includes a proprietary type of signaling that is an agreed upon type of signaling between the BS and the RIS that does not use any existing standards.

In some embodiments, the RIS registration may include the network obtaining RIS capability information (such as, but not limited to, RIS material type or which RIS parameters can be controlled, response time, RIS control function/capability).

In some embodiments, the RIS identification may also include RIS localization. For example, the network can obtain RIS positioning information through sensing or positioning, meaning the position of the RIS can be determined based on signaling by the network and RIS to find one another. RIS positioning information can also help to determine possible BS-RIS links and RIS-US links.

Cellular networks were originally designed for wireless communication, and the rapidly increasing demand for location-based applications has drawn a considerable amount of attention to positioning research in cellular networks. Some of the more intriguing 6$^{th}$ Generation (6G) applications involve sensing environments through high-precision positioning, mapping and reconstruction, and gesture/activity recognition. Sensing will be a new 6G service, and it can be described as the act of obtaining information about a surrounding environment. It can be realized through a variety of activities and operations, and classified into the categories of RF sensing and non-RF sensing. RF sensing involves sending a RF signal and learning the environment by receiving as well as processing the reflected signals. Non-RF sensing involves exploiting pictures and videos obtained from a surrounding environment (for example via a camera).

By sending an electromagnetic wave and receiving echoes, RF sensing is able to extract information of the objects in an environment, such as existence, texture, distance, speed, shape, and orientation. In current systems, RF sensing is limited to radar, which is used to localize, detect, and track passive objects, i.e., objects that are not registered to the network. Existing RF sensing systems have various limitations. They are stand-alone and application-driven, meaning they do not interact with other RF systems. Furthermore, they only target passive objects and cannot exploit the distinct features of active objects, i.e., objects registered to the network.

In some embodiments, the signaling or messages exchanged between the RIS and the network may be new signaling types that are specific to signaling between the RIS and UE.

In some embodiments, the signaling and messages exchanged between the RIS and the network may be new signaling types. In some embodiments, a method for discovery of the RIS includes an existing signaling mechanism, such as Xn, RRC and physical downlink shared channel (PDSCH). In some embodiments, the link between the RIS and the network may be a backhaul link and be treated as such for the case of signaling on the link. In such embodiment, this may include augmenting the existing mechanisms to specifically include new RRC messages to enable signaling between the BS and the RIS.

In some embodiments, RIS discovery involves the RIS sending a signal over-the-air to be discovered by network. In some embodiments, the signal is random access channel (RACH) based if the RIS has a transceiver to send an uplink RACH signal. In some embodiment, the RIS uses a same type of RACH mechanism as a UE. The RIS is identified as a RIS as part of the RRC setup. In some embodiments, the RACH mechanism is specifically for the RIS.

Figure 15A:
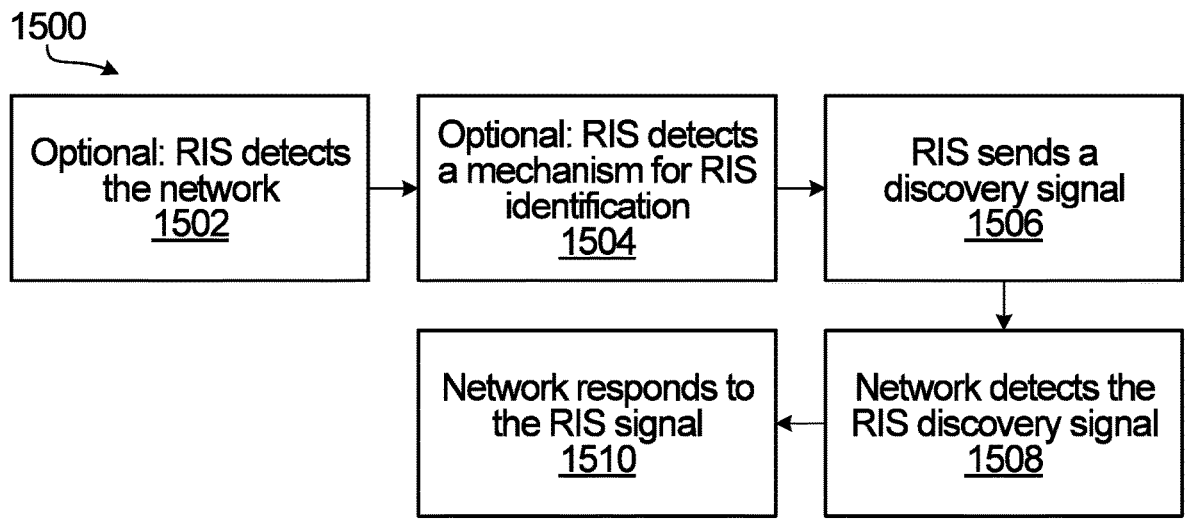
FIG. 15A is a flow diagram for RIS discovery by the network according to an aspect of the application.

FIG. 15A is a flow chart that illustrates an example of steps that may be involved in over-the-air RIS discovery 1500 by the network. Step 1502 is an optional step, that involves the RIS detecting the network. Step 1504 involves the RIS determining the mechanism for RIS identification. Step 1506 involves the RIS sending a discovery signal such as a synchronization signal. Step 1508 involves the network detecting the discovery signal sent by the RIS in step 1506. Step 1510 involves the network responding to the discovery signal.

In some embodiments, RIS discovery may be backscattering based. The RIS reflects the original signal and modulates the reflection with an RIS identifier (RIS ID). The original signal may be sent by the BS as part of RIS discovery.

In some embodiments, RIS discovery may be backhaul based discovery. For example, the RIS is connected to a wired backhaul connection and announces the relevant RIS information.

In some embodiments, RIS discovery may be manually programmed such that the RIS discovery information is manually shared with the TRP.

In some embodiments, the RIS may send a signal to be discovered by the UE. Such a signaling mechanism may be specified by a telecommunications standard and does not require configuration initiated by the BS at the RIS and/or the UE. In some embodiments, the network may configure the RIS and/or the UE for discovery.

Figure 15B:
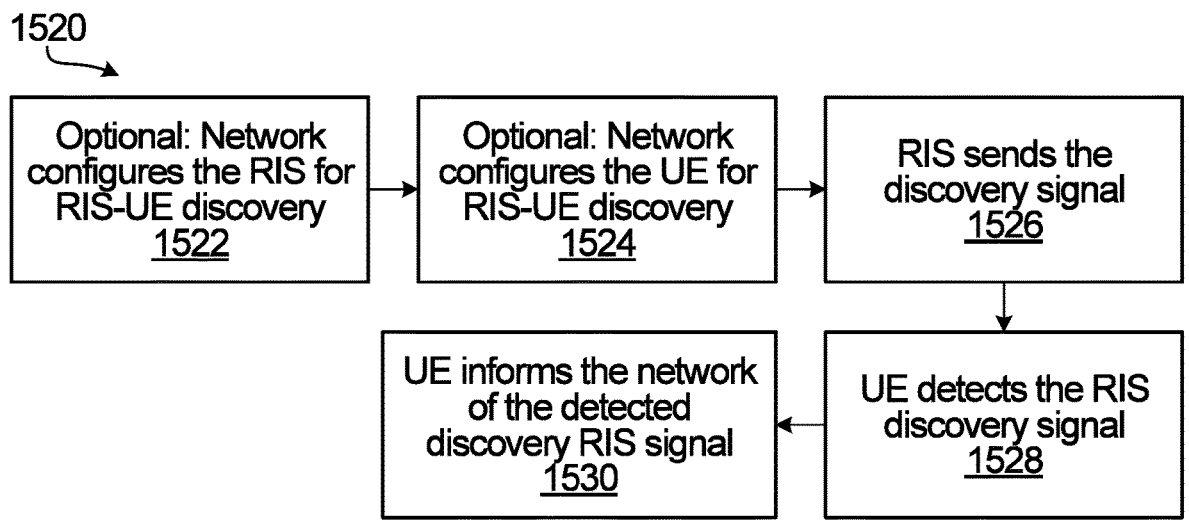
FIG. 15B is a flow diagram for RIS discovery by the UE according to an aspect of the application.

In some embodiments, if the RIS has a transceiver, the RIS can discover the RIS-UE link by directly communicating with the UE as described with regard to FIG. 15B.

In some embodiments, the RIS discovery may be a regular device-to-device (D2D) discovery. For example, the RIS uses the same UE discovery mechanism as for D2D.

In some embodiments, the RIS discovery may use a discovery mechanism that is specific to UE and RIS discovery. The mechanism that is specific to UE and RIS discovery may be enhanced by sensing tools and/or network assistance such as RIS and UE list sharing, coordination sharing or ID sharing.

In some embodiments, the RIS-UE discovery may be backscattering based. The RIS reflects a signal to the UE and modulates the reflection with the RIS ID. The original signal may be sent by the BS as part of RIS-UE discovery and reflected by the RIS. Alternatively, the signal is sent by the UE and reflected by RIS. The network detects the reflected signal and informs the RIS and/or the UE about the detected signal.

FIG. 15B is a flow chart that illustrates an example of steps that may be involved in RIS discovery by the UE 1520. Step 1522 is an optional step that involves the network configuring the RIS for RIS-UE discovery. This may involve the BS sending configuration information to the RIS that includes information identifying UEs that might be in the proximity of the RIS, RIS pattern information that might be needed by the RIS, scheduling information, etc. Step 1524 is an optional step that involves the network configuring the UE for RIS-UE discovery. This may involve the BS sending configuration information to the UE that includes information identifying RISs that might be in the proximity of the RIS and information about a discovery signal, e.g. the type of signal, scheduling information, etc. Step 1526 involves the RIS sending a discovery signal. Step 1528 involves the UE detecting the discovery signal sent by the RIS in step 1526. Step 1530 involves the UE informing the network of the detected discovery RIS signal.

Figure 15C:
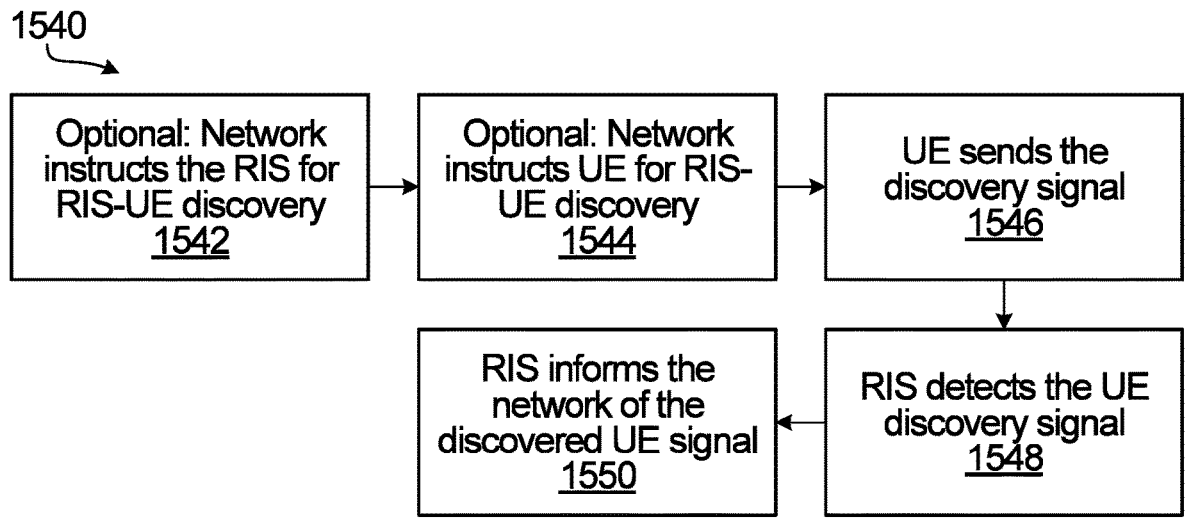
FIG. 15C is a flow diagram for UE discovery by the RIS according to an aspect of the application.

FIG. 15C is a flow chart that illustrates an example of steps that may be involved in UE discovery by the RIS 1540. Step 1542 is an optional step that involves the network configuring the RIS for RIS-UE discovery. This may involve the BS sending configuration information to the RIS that includes information identifying UEs that might be in the proximity of the RIS, RIS pattern information that might be needed by the RIS, scheduling information, etc. Step 1544 is an optional step that involves the network configuring the UE for RIS-UE discovery. This may involve the BS sending configuration information to the UE that includes information identifying RISs that might be in the proximity of the RIS and information about a discovery signal, i.e. the type of signal, scheduling information, etc. Step 1546 involves the UE sending a discovery signal. Step 1548 involves the RIS detecting the discovery signal sent by the UE in step 1546. Step 1550 involves the RIS informing the network of the detected discovery RIS signal.

Once the RIS is deployed into the network, the network may be notified of the entry of the RIS into the network using initial access signaling. In some embodiments, this may be part of a "plug and play" functionality of the RIS, that allows the RIS to be deployed such that the setup is substantially automatic from the perspective of the user deploying the RIS. The initial access signaling may be an existing mechanism or an initial access mechanism specific to the RIS. An example of an initial access mechanism specific to the RIS may be RIS specific RACH sequences and RIS specific RACH channel resource allocation. In some embodiments, network nodes may be programmed with the necessary information to work with the RIS and thus skip the registration step.

After the RIS is identified, or discovered, by the network, the RIS has to be registered and fully configured by identifying links between the RIS and UE before the RIS can be used to communicate with one or more UEs. This may involve identifying links between the RIS and one or more UEs, i.e. identifying RIS-UE links The identification operation 1410 in some embodiments comprises a RIS-UE link identification 1414.

After the RIS is integrated into the network, for proper operation of the RIS to redirect signaling between the BS and the UE, a RIS-UE link needs to be discovered. The link between RIS and UE can share the same frequency band or occupy different frequency bands (carrier or bandwidth part). RIS-UE link discovery may also be referred to as RIS-UE link determination or RIS-UE link identification. Furthermore, discovery of the RIS-UE link may be a precursor to performing RIS-UE link setup.

In a communication system that does not necessarily use a RIS, BS-UE link identification by the network and UE sidelink identification between UEs is supported by existing standards. This RIS-UE link identification operation can identify a possible RIS and UE association, which can be used for a transmission link determination during scheduling. RIS-UE link identification can be done by sensing and localization technologies or through the detection of a reference signal by the UE by using a DL reference signal (such as SSB or CSI-RS) or by the BS using an UL reference signal (such as RACH or SRS). In such scenarios, network identification of the UE is performed through synchronization and occurs following broadcast signaling. For cell discovery, a reference signal may be transmitted to the UE to identify the cell, for example, a channel state information reference signal (CSI-RS). UE identification by the network may use an initial access mechanism and physical random access channel (PRACH). The underlying communications standard (such as 6G or New Radio (NR) standard) also provides a signaling mechanism for sidelink discovery. In some embodiments a mechanism like the sidelink discovery could be used when the RIS is to be treated as a discrete network element.

The identification operation 1410 in some embodiments comprises an operation 516 for with regard to RIS Visibility to the UE.

Depending on the how the UE perceives the RIS, RIS-UE link identification can occur utilizing any of a number of different methods. In some embodiments, the RIS may be considered to be invisible to the UE, i.e. the UE simply considered the RIS as part of the network, not necessarily as a discrete node. When the RIS-UE link is for DL signaling, the RIS reflects the synchronization signal (SSB/PBCH). In an example, the RIS substantially performs like a remote radio head (RRH) from the network. The UE does not realize that the synchronization signal is reflected by the RIS. Reference signal measurement performed using particular ports or configurations, which may include CSI-RS measurement, can be used to determine whether the UE receives the original signal directly from the BS or its reflected version by the RIS. For example, if a signal is coming directly from a BS in a different direction than the reflected signal from the RIS, and particular configurations allow for receiving signals from different directions, then one direction can be associated with a signal coming directly from a BS and another direction can be associated with a signal reflected signal from the RIS. Another example, is to receive two copies of the RS in every direction. For a first copy the RIS is enabled for reflection and for the second copy, the RIS is disabled. A successful reception of only both copies of the RS indicates reception of the direct transmission from the transmitter to the receiver, while a successful reception of only the first copy in one direction would indicate the reception of the reflected copy. When an uplink reference signal, such as a sounding reference signal (SRS), is used, the UE sends the SRS and the RIS detects the SRS or the RIS reflects the SRS and the BS detects the reflected signal to detect the possible link. Similar mechanisms such as those in the above examples are applicable.

In some embodiments, the RIS may be considered to be visible to the UE, i.e. the UE is made aware of the RIS and considers the RIS as a discrete node. Various methodologies will now be described where the RIS is treated in this manner by the UE.

In some embodiments, the RIS may be treated by the UE as a discrete network component, similar to another UE, such that the RIS-UE link could substantially be treated as a link between two devices where sidelink transmission could be used. When treating the RIS-UE link as sidelink, a device to device (D2D) discovery mechanism, or an enhanced mechanism, with or without the assistance of the BS, sensory information and/or other communication mechanisms or frequency bands may be used to discover the RIS. In such scenarios the RIS could be equipped with a transceiver to be able to perform D2D discovery and link setup. When a link between the RIS and UE is based on SL, the SL and Uu link (the link between the BS and the UE or between the BS and RIS) can occupy different carriers and/or different bandwidth parts.

In some embodiments, the RIS may be treated like a small BS by the UE. When treated as a small BS, the RIS may send or reflect a synchronization and/or measurement signal to the UE coverage area, such as SSB/PBCH and/or CSI-RS, which the UE can detect and measure. This may be done using an incorporated transceiver in the RIS or through the beam reflection capabilities of the RIS reflecting the original signal transmitted by a neighboring transmitter.

In some embodiments, the RIS-UE link may be determined using RIS specific discovery, i.e. a discovery mechanism that would be used specifically for discovering the RIS in a communication system, as opposed to discovery a UE, or a relay, etc. RIS specific discovery may use specific signaling that is specified in a telecommunications standard to enable UE-RIS link discovery. Such signaling mechanism may be originated at any of the BS, UE and RIS and be detected by any other of the BS, UE and RIS, depending on the underlying RIS capability, the telecommunications standard support for the devices and signaling mechanism and the configuration signaling for the devices and signaling mechanism. As an example, the RIS may reflect a set of signals in different directions while the original signal is transmitted by a BS toward the RIS and the UE detects and measures the original signal to find the RIS and the corresponding direction. In another example, the UE sends the identifying signal as configured by the BS and the RIS detects it to identify the UE and the corresponding direction.

In some embodiments, the RIS-UE link determination may be network assisted. In some embodiments with network assistance, the UE is notified with information about the RIS, such as a signal that will be transmitted by the BS and reflected by the RIS to allow the UE to identify the RIS based on receiving the signal and/or the location of the RIS. In some embodiments with network assistance, the RIS is informed by the network regarding UEs that may be in proximity of the RIS to which the RIS can form a link. When informing the RIS, the network may also inform the UE about the RIS in the proximity of the UE.

In some embodiments the RIS-UE link determination may be sensing assisted. In some embodiments with sensing assistance, the RIS and the UE can use RF based sensors or non-RF based sensors to detect each other. The integrated sensing mechanism can be used to directly or indirectly identify the link. An example for direct determination includes detecting RF sensing signals (within the same band and/or RAT or other bands or other RATs) emitted by the other node (RIS emission and UE detection or UE emission and RIS detection). Another example for direct determination includes detection of a RF sensing signal emitted by one node, reflected by the other node and detected by the original emitting node. A further example for direct determination includes using a camera to detect the presence of the other node. An example for indirect sensing is detecting the presence of the other node using a camera. For example, the UE camera may capture an image that includes the RIS and use pattern recognition to identify the RIS or detect a quick response (QR) code embedded in the RIS. Alternatively, the RIS may emit an infrared beam which can be detected by the UE for RIS identification and direction setting. In some embodiments, when sensing assistance is being used for RIS-UE link determination, additional information may be provided by the network, such as network knowledge of where the UE is currently located, UE orientation, RIS location and orientation, a map of the area to identify possible link blockage, UE and RIS capabilities, such as sensing capabilities that can include one or more of a camera, a gyroscope, a compass, and lidar. This additional information may be useful to the RIS in helping to determining where UEs are and therefore aid in the RIS-UE link determination. For example, if the RIS knows at least generally where the UE is, the UE knows where to start reflecting a signal from the BS, by using a particular RIS pattern.

In some embodiments the RIS-UE link determination may be performed using other mechanisms. Other mechanisms that could be used to identify the link include the UE and RIS detecting each other using other RATs such as a BLUETOOTH identifier (ID) or Wi-Fi beacons. If other RATs are used, then the UE and RIS need to be configured with radios capable of operating in the appropriate manner, i.e. Bluetooth radios, Wi-Fi radios, etc. These other RATs may be used in a substantially normal operating manner for establishing a link between two devices communicating via the respective RAT. In some embodiments, the RIS periodically sends a Wi-Fi beacon, and the BS informs the UEs about the service set ID (SSID) carried by the beacon. The UE then identifies the RIS within the vicinity of the UE by detecting the beacon and associated SSID. The UE and RIS may use the underlying Wi-Fi connection to establish the link. Alternatively, the UE informs the BS about the detection of the SSID and the link between RIS and UE is then established by the BS. The UE may not need to know the SSID is associated with a RIS and UE just detects the SSID and informs the BS about its detection.

FIGS. 11A to 11G provide example flow charts for different methods that may be used for RIS-UE link identification described above.

Figure 11A:
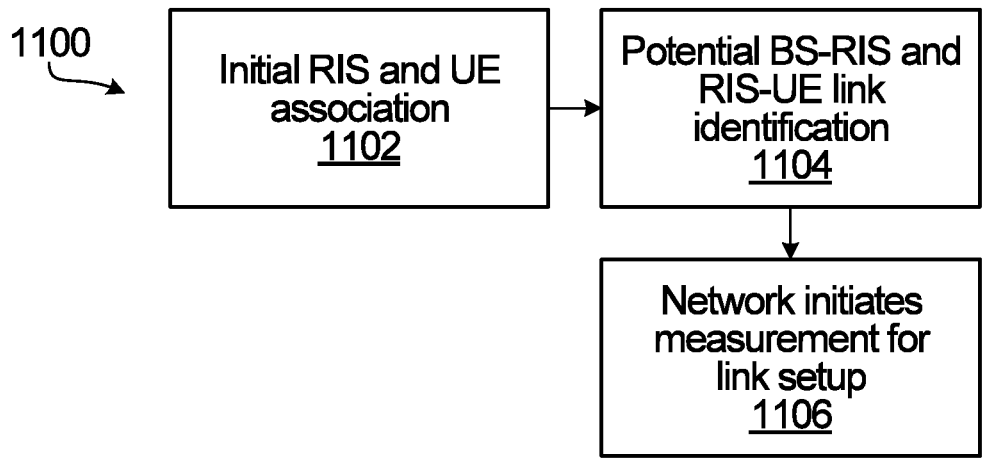
FIGS. 11A to 11G are flow diagrams illustrating different example methods for implementing identification of RIS-UE links according to aspects of the application.

FIG. 11A is a flow chart that illustrates an example of steps that may be involved in RIS-UE link identification 1100 that involves BS oriented discovery. Step 1102 involves performing an initial RIS and UE association. This may involve the BS performing a comparison of information stored locally, for example, in the BS memory. For example, a list of UEs and their positions may be compared with a list of RISs and their positions to determine which RISs are in proximity to which UEs. Step 1104 involves the BS identifying a potential BS-RIS link and a potential RIS-UE link based on the comparison performed in step 1102. Step 1106 involves the network initiating a channel measurement, for example that may be used for channel estimation to determine channel quality, as part of link setup. This channel measurement will be described below.

In a measurement-based approach to identification of candidate RIS, a BS, UE or RIS performs measurement to determine RIS-UE link quality. In some embodiments, RIS measurement may be performed for per hop link quality. In some embodiments, a BS or UE performs an end-to-end channel measurement. In some embodiments, a UE can feedback measurement results to the BS. When the UE feeds back measurement results to the BS, a RIS may receive the feedback information, if the RIS has a receiver capable of doing so, and the RIS can use this feedback information, in determining a RIS pattern that should be used to reflect a signal to the UE or BS, depending on the direction of the signal. The RIS may need to receive configuration information from BS to be able to receive the feedback information.

In a measurement-based approach to identification of candidate RIS, the identification may be assisted by sensing information. In some embodiments, a RIS is able to sense a UE or a UE is able to sense a RIS using communication based sensing or other types of sensors. In some embodiments, when a RIS senses the UE, if the RIS does not have access to the UE identity, the network can match the sensed UE with an active UE list, and notifies the RIS.

Figure 11B:
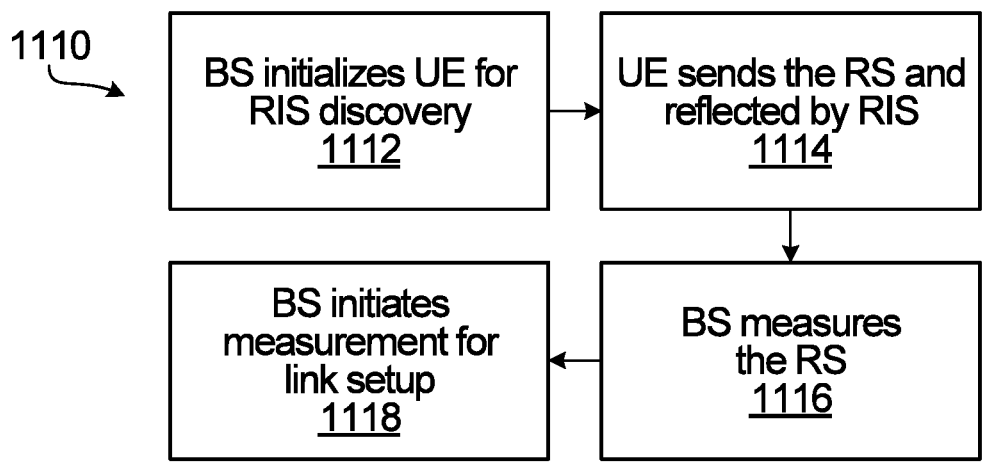

FIG. 11B is a flow chart that illustrates an example of steps that may be involved in RIS-UE link identification 1110 that involves the BS performing channel measurement of a reference signal transmitted by the UE. Step 1112 involves the BS configuring the UE for RIS discovery. This step may involve the BS sending configuration information identifying a type of RS the UE should send that will be redirected by the RIS. In this step, the BS may also send scheduling information of when the UE should send the RS. Therefore, when the UE sends the RS, the BS can identify that the RS was reflected by the RIS. Step 1114 involves the UE sending the RS, which the RIS reflects to the BS. Step 1116 involves the BS measuring the RS. Step 1118 involves the BS initiating a channel measurement that may be used for channel estimation, as part of link setup. Examples of channel measurement methods will be described below.

Figure 11C:
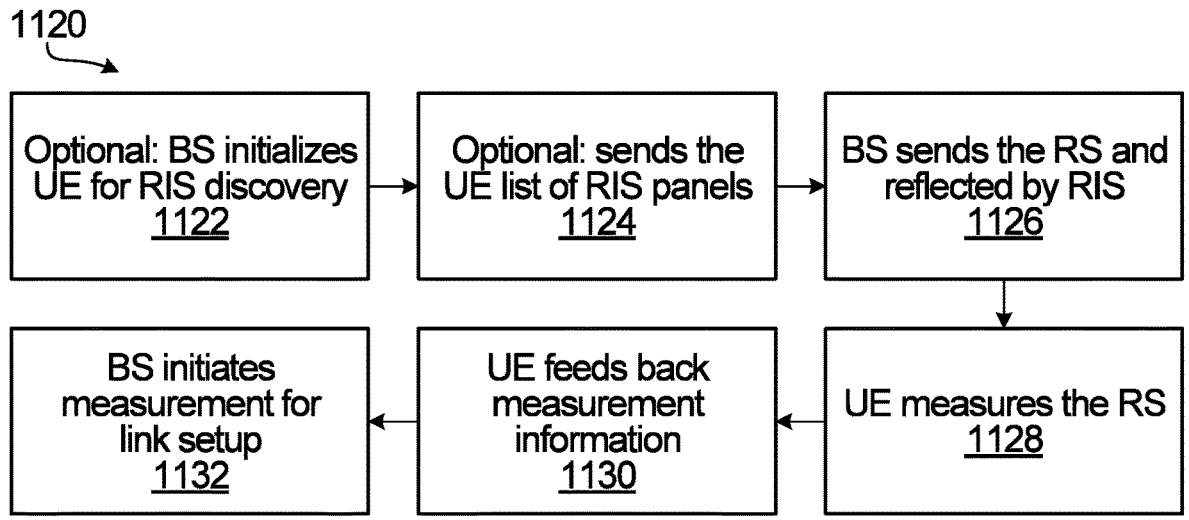

FIG. 11C is a flow chart that illustrates an example of steps that may be involved in RIS-UE link identification 1120 that involves the UE performing channel measurement of a reference signal transmitted by the BS. Step 1122 is an optional step that involves the BS configuring the UE for RIS discovery. This step may involve the BS sending configuration information identifying a type of RS the BS will send that will be redirected by the RIS and scheduling information of when the BS will send the RS. Therefore, when the BS sends the RS, the UE can identify that the RS was reflected by the RIS. Step 1124 is another optional step that involves the BS sending the UE a list of RIS panels in the proximity of the UE so that the UE will know which RIS it may be receiving a reflected signal from. Step 1126 involves the BS sending a RS, which the RIS redirects to the UE. Step 1128 involves the UE measuring the RS. Step 1130 involves the UE feeding back measurement information to the BS. Step 1132 involves the BS initiating a channel measurement that may be used for channel estimation, as part of link setup. Examples of channel measurement methods will be described below.

Figure 11D:
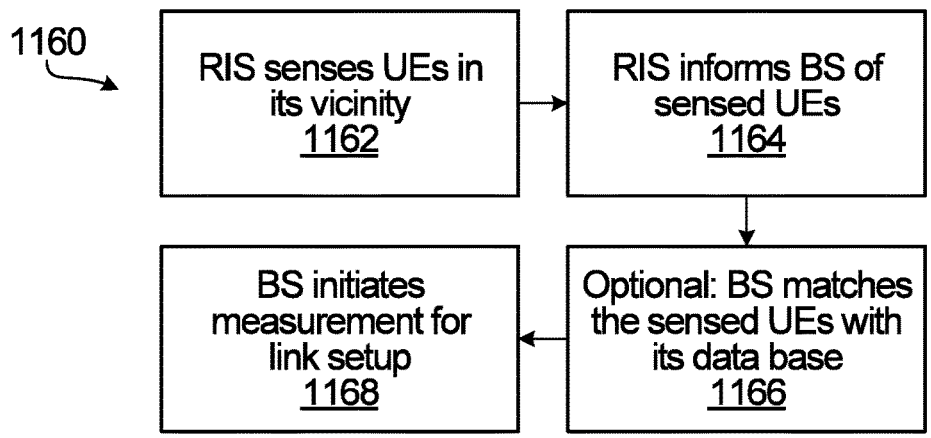

FIG. 11D is a flow chart that illustrates an example of steps that may be involved in RIS-UE link identification RIS 1160 that involves RIS assisted UE discovery based on sensing. Step 1162 involves the RIS sensing of any UEs in the vicinity of the RIS. This sensing can be RF based or non-RF based. RF based sensing may use in band measurement by one node (BS, UE or RIS) and detection with or without the involvement of the other node (BS, UE or RIS). Examples are when the sensing uses one node sending a sensing signal and the other node detecting the sensing signal, when a node sends the sensing signal and the same node or a different node measures a reflection of the sensing signal or when the node measures a reflection of the sensing signal sent from a non-cooperating node. Sensing may use other RF based mechanisms such as backscattering, Bluetooth or Wi-Fi. It may also use other sensors such as GPS, a camera, and Lidar. Step 1164 involves the RIS informing the BS of the sensed UEs. Step 1166 is an optional step that involves the BS matching the sensed UEs with a list of UEs stored in the BS. Step 1168 involves the BS initiating a channel measurement that may be used for channel estimation, as part of link setup. Examples of channel measurement methods will be described below.

Figure 11E:
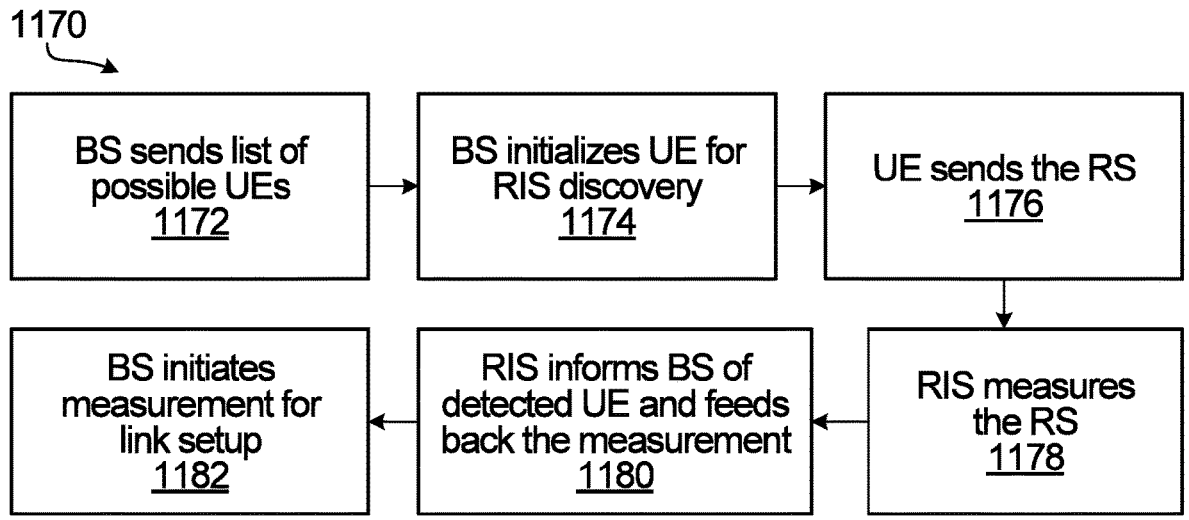

FIG. 11E is a flow chart that illustrates an example of steps that may be involved in RIS-UE link identification 1170 that involves UE assisted RIS discovery. Step 1172 involves the BS sending the RIS a list of UEs in the proximity of the RIS that are possible UEs with which the RIS could form a link. Step 1174 involves the BS configuring the UE for RIS discovery. This step may involve the BS sending configuration information identifying a type of RS that the UE should send that will be detected by RIS and scheduling information for when the UE should send the RS. Therefore, when the UE sends the RS, the RIS can identify which UE sent the RS. Step 1176 involves the UE sending a RS. Step 1178 involves the RIS measuring the RS sent by the UE. Step 1180 involves the RIS informing the BS of detected UEs and feeding back the measurement based on the measured RS. Step 1182 involves the BS initiating a measurement that may be used for channel estimation, as part of link setup. Examples of channel measurement methods will be described below.

Figure 11F:
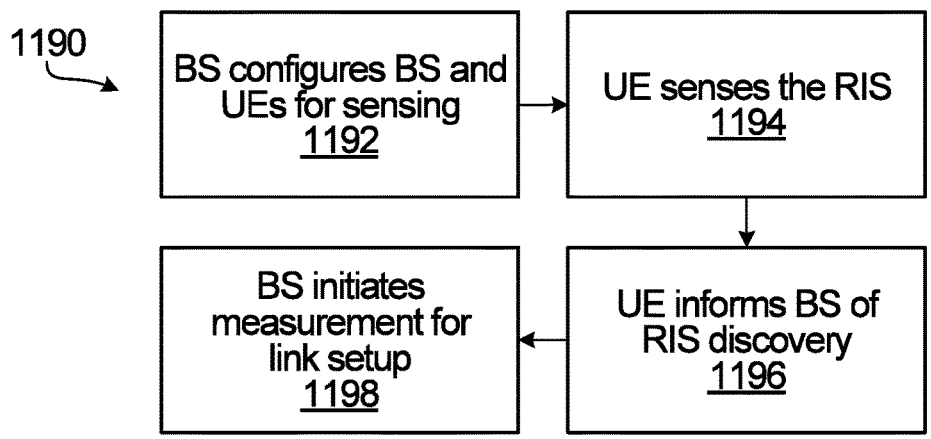

FIG. 11F is a flow chart that illustrates an example of steps that may be involved in RIS-UE link identification 1190 that involves RIS assisted UE discovery based on sensing. Step 1192 involves the BS configuring the BS and the UE for sensing. This step may involve the BS sending configuration information identifying a type of sensing signal the UE should use to sense the RIS and scheduling information of when the UE should attempt to sense the RS. Step 1194 involves the UE sensing the RIS. Step 1196 involves the UE feeding back notification of the RIS detection by the UE based on the UE sensing. Step 1198 involves the BS initiating a measurement that may be used for channel estimation, as part of link setup. Examples of channel measurement methods will be described below.

In a measurement-based approach to identification of candidate RIS, a RIS may backscatter a signal transmitted by BS or the UE by including some modulation identification information to the signal.

Figure 11G:
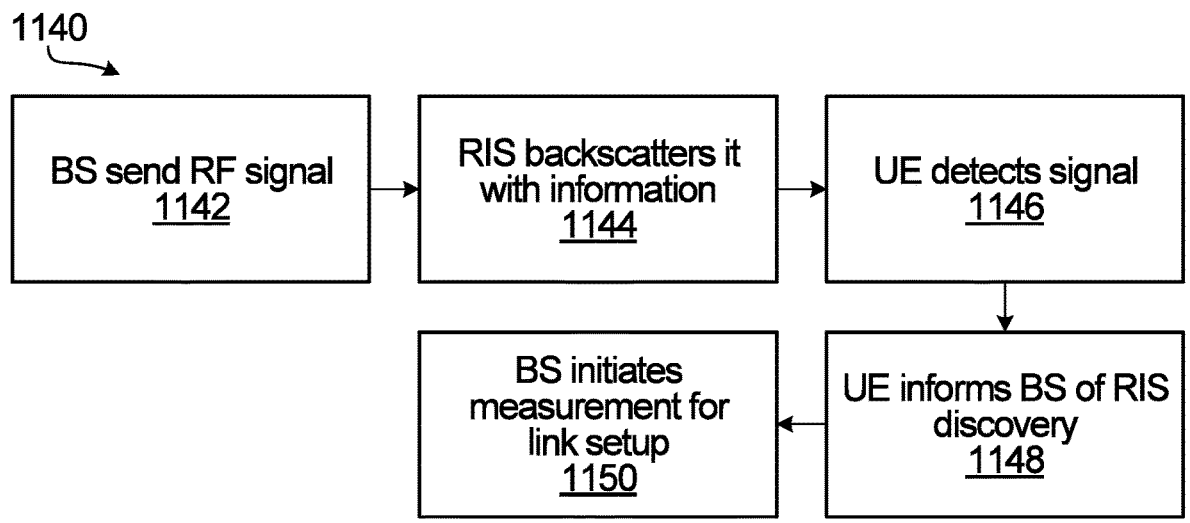

FIG. 11G is a flow chart that illustrates an example of steps that may be involved in RIS-UE link identification 1140 that involves RIS backscattering. Before the BS sends an RF signal that will be backscattered or modulated by the RIS, the RIS needs to configure the elements of the RIS panel with an appropriate RIS pattern. There are several ways this can be achieved. In some embodiments, the BS sends configuration information to the RIS for configuring the RIS pattern. In some embodiments, the RIS pattern is selected by the RIS, for example from a list of possible patterns that may be specified by a communications standard. In some embodiments, the pattern is associated with at least one of a RIS manufacturer, a RIS serial ID, or a RIS model number. Step 1142 involves the BS sending an RF signal. Step 1144 involves the RIS backscattering the RF signal by modulating the RF signal with information as the RF signal is reflected by the RIS. Step 1146 involves the UE detecting the RF signal. Step 1148 involves the UE feeding back notification to the BS of RIS discovery by the UE based on the detected backscattered signal. Step 1150 involves the BS initiating a measurement that may be used for channel estimation, as part of link setup. Examples of channel measurement methods will be described below.

Another mechanism pertains to setting up a cooperative RIS link. In some embodiments this mechanism sets up signaling to maintain the link between the RIS and UE. In some embodiments, setting up the cooperative RIS link is controlled by the network. This may involve the network identifying the link and configuring both the RIS and the UE. In some embodiments, the network sending configuration may include radio resource control (RRC) messaging that includes settings for CSI measurement and configuration information for implementing feedback. In some embodiments, the network shares raw or processed CSI information for RIS pattern control. This may include providing the RIS a RIS pattern or information to allow the RIS to generate the RIS pattern.

Referring back to FIG. 14, within the scope of the link setup operation 1420, there are two features shown. One feature of the link setup operation 1420 pertains to BS-RIS link setup 1422. Another operation of the link setup operation 1420 pertains to RIS-UE link setup 1424. Example methods related to the link setup 1420 operation, as performed by the base station, by the RIS and by the UE, will be described in detail below.

After the RIS is deployed in the network, the RIS can set up the BS-RIS link and the RIS-UE link. Setting up the BS-RIS link involves the network configuring the RIS to establish a link capable of exchanging control information in order to enable the network to allow the BS to send signaling for configurating the RIS to interact with the UE, and optionally to exchange other information that may be relevant to setting up the UE-RIS link. For example, if the RIS is using the initial access mechanism to access the network, the BS may follow up with some signaling, possibly using RRC signaling, to setup the link. Alternatively, the BS may use backhaul Xn or Integrated Access Backhaul (IAB) signaling, or other mechanisms, to establish this BS-RIS link.

The link setup operation 520 in some embodiments comprises a BS-RIS link setup operation 1422.

Unless the BS is pre-programmed with all the necessary mechanisms to work with the RIS using a channel and signaling mechanism that is vendor specific, the RIS and the BS need to setup the link between one another. In some embodiments, when the RIS is using the initial access mechanism to access the network, the RIS may follow up the initial access to the network with signaling to setup the link with the BS. In some embodiments, the signaling may use RRC signaling. In some embodiments, the RIS may use backhaul Xn or IAB signaling or other mechanisms to establish this link. Examples of methods for setting up the BS-RS link will be described below.

Several different types of configuration and control signaling messages that are used between the BS and the RIS are described below. In some embodiments, the signaling may be used for performing a capability information exchange. The RIS and BS may exchange information about at least one of the capabilities of the RIS (including the RIS reconfiguration speed), a required working bandwidth, location information pertaining to the RIS, data capacity and delay of the BS-RIS control link, and sensing capabilities. The data capacity and delay of BS-RIS control link may refer to the speed at which control information can be received and processed at the RIS and the overall delay for the transmission and processing those control messages, for example, if low frequency (LF) or high frequency (HF) or other links are used for the control information signaling between BS and RIS. Examples of capabilities of the RIS include, but are not limited to, frequency band, working bandwidth, phase control range, reconfiguration speed, size, linearity or reciprocity properties of the RIS.

Part of the BS-RIS set up involves the configuration of the RIS pattern used by the RIS to redirect a signal from either the BS or the UE. In some embodiments, control signaling includes a RIS pattern control mechanism. The BS and RIS agree on the RIS pattern control scheme. The RIS pattern is controlled under the direction of the network and is based on factors such as the underlying channel condition, the RIS-UE pairing, scheduling decision or serving BS, if more than one BS serves the UEs through the same RIS panel. The RIS pattern being controlled under the direction of the network means, for example, that the network provides configuration information for the RIS to generate the RIS pattern that is used to redirect a signal from the BS or from the UE to the UE or to the BS. The RIS may or may not have access to all the configuration information and as such different modes for controlling the RIS pattern may be used.

In some embodiments, the RIS pattern is fully controlled meaning that the RIS pattern is fully determined by the network. This may involve expressing RIS pattern information such as bias voltage for each element of the RIS panel or a phase shift (absolute or differential) for each element of the RIS panel to generate the RIS pattern. The RIS pattern information may be absolute RIS pattern information, e.g., the bias voltage or phase shift information for each configurable element of the RIS panel or be an alternative version of the information, maybe an index to a predefine RIS pattern known to the RIS that could be used to reduce overhead as compared to the absolute RIS pattern information. As the network is providing the RIS pattern information to the RIS, the RIS does not need to know any information about the channel, such as for example the CSI, and the UE that the BS is serving. The RIS receives the RIS pattern information, biases the configuration elements of the RIS panel based on the RIS pattern and any signal sent by the BS will be redirected by the RIS panel based on the configured RIS pattern. As the network is providing the RIS pattern information, the network controlled BS that is communicating with the RIS should be aware of detailed CSI (with the resolution up to element or element group) and also have knowledge of the control mechanism of the RIS panel. The detailed CSI can be determined by channel measurement that will be described in examples below as referenced in FIGS. 12A to 12C. Knowledge of the control mechanism of the RIS panel may be provided, for example, by the RIS as RIS capability information.

In some embodiments, the RIS pattern is partially controlled by the network. The BS provides the RIS configuration information that may include one or more of beam shape, beam direction and/or beam width of the impinging and/or reflecting beams at the RIS and the RIS can then determine a phase shift for each configurable element to achieve a desired RIS pattern. The direction may be expressed in absolute or relative terms with respect to other beam directions or previous RIS patterns, for example a few degrees of update in a particular direction. The RIS does not need to know CSI other than the particular beam direction signaled to it. The BS in such a case, does not need to know exactly how to implement the RIS pattern on the RIS panel. This mode allows a unified signaling between the BS and the RIS for different RIS panels. Also, this mode allows for self-calibration of the RIS without involving the BS.

In some embodiments, the RIS pattern is controlled by the RIS using RIS self-pattern optimization. This control mode is for RIS panels having a higher complexity, where the RIS has access to the CSI for both the BS-RIS link and the RIS-UE link (or alternatively the end to end BS-UE channel) and the RIS-UE link setup information. In some embodiments, the CSI knowledge may be acquired by the RIS itself through measurement or sensing, or both. In some embodiments, the CSI knowledge may be shared to the RIS by the UE, or the BS, or both. The active RIS-UE link is configured by the BS and the RIS optimizes the RIS pattern for serving the UE. For measurement purposes, the RIS may determine its own beam sweeping patterns as instructed by the BS.

In some embodiments, the RIS pattern is controlled using a hybrid mode. The RIS uses self-pattern optimization for the measurement functionality. However, for data communication, partial control is adopted where the RIS is instructed to use the RIS pattern with respect to the RIS patterns selected for measurement. As an example, the BS instructs the RIS to select N (an integer) different RIS patterns for N different instances of CSI-RS reflection. The RIS optimizes the N patterns in part based on the instructed number and/or based on the sensed information of the location of UEs or walls. Only the RIS needs to know the actual patterns. The RIS then uses the selected N different RIS patterns to redirect N copies of a CSI-RS from the BS on the BS-RIS link. The UE measures all or some of the CSI-RS that are redirected by the RIS in the direction of the UE and reports measurement results back to the BS. The BS then selects one of the RIS patterns and informs the RIS to use the selected pattern from the N measurement patterns, or a combination of several of the RIS patterns. In some embodiments, the RIS can perform initial beam forming or beam detection as an initial part of RIS-UE beamforming setup. Further beam turning can be performed by BS control. For example, the RIS may have some basic sensing capability and can determine beam directions for the UE that are close to the RIS. The RIS can share the determined beam direction information with the BS to help beamforming for further communication from the BS to the UE via reflection off the RIS.

After the BS-RIS link has been set up, a link may also be set up between the RIS and the UE. Setting up the RIS-UE link involves measurement of the link between the RIS and the UE, for example to perform channel estimation of the link.

The link setup operation 1420 in some embodiments comprises a UE-RIS link setup operation 1424.

In some embodiments, the RIS may be considered to be "invisible" to the UE, i.e. the UE does not necessarily know the RIS is in the link, so that the UE assumes the signal is received directly from the BS. In some embodiments, when the RIS is "invisible" to the UE, the UE-RIS link setup may involve channel measurement of the RS-UE link. In some embodiments, after the UE has determined a channel measurement, the UE sends feedback information regarding the channel measurement from the UE to the RIS, from the UE directly to the BS or from the UE to the BS via reflection off of the RIS. Since the RIS is invisible to the UE, the UE does not know which node receives its feedback and may use the beam direction as instructed by the BS or to the same direction it receives the measurement RS. Examples of channel measurement are described below with reference to FIG. 12A to 12C.

The UE-RIS link setup can be uplink based or downlink based depending on whether the UE sends the RS or the UE receives the RS. The setup can be independent of whichever device, the BS or the UE, is on the other end of the measurement link from the transmitting device. In downlink based measurement, the UE can feedback the measurement to the UE.

When the RIS is visible to the UE, i.e. the UE knows that the RIS is in the vicinity and reflecting a signal from the BS, the UE may receive information about the RIS from the BS. For example, the UE may receive information including the RIS ID, or where the RIS is located, so that the UE can determine a direction that it will receive a reflected signal from the RIS and an identification of a type of signal that the UE should expect to receive redirected from the RIS to properly identify the receive signal as being reflect by the RIS. Information about the location of the RIS may be absolute location information such as longitude/latitude/altitude/orientation or relative location information in respect to some other location that is known by the UE. In some embodiments, the RIS may use at least one of RIS specific SSB, RIS specific scrambling sequences for control channel, data channel or reference channel, RIS frequency band and bandwidth, and RIS specific reference signal structure (such as RIS specific patterns or RIS specific reference signal sequences). In some embodiments, the UE may optionally be able to make a direct link to the RIS using in-band or out-of-band communication. In some embodiments, the UE may use sidelink to communicate with RIS, or even use other RATs, such as Wi-Fi or BLUETOOTH.

In some embodiments, the RIS panel may be divided into sub-panels based on configuration information from the BS, where each sub-panel may serve a different UE or set of UEs. The sub-panels may be physically or logically differentiated. In some embodiments, the RIS may be comprised of multiple smaller panels that are each controllable separately. In some embodiments, the RIS comprises one panel and the BS instructs the RIS to apply independent patterns to different subsets of RIS elements. If the RIS pattern is fully controlled by the network, this phenomenon is transparent to the RIS. However, for partially controlled or autonomous RIS panels, the RIS is aware of the fact that different sub-panels use independent RIS patterns. Therefore, multiple RIS-UE links can be set up for a single RIS for which the RIS is divided into multiple sub-panels. In the following description, the RIS pattern for each sub-panel is referred to individually as the RIS may change the pattern of one sub-panel without changing the rest. In such a case, the RIS panel is effectively divided into multiple smaller coplanar panels.

The link setup involves having to perform channel measurement to establish the links. Referring back to FIG. 14, within the scope of the channel measurement and feedback operation 1430, which comprises at least one of the five operations shown. A first feature pertains to setting up and triggering 1432 of channel measurements. The second feature pertains to a channel measurement mechanism 1434, for example on a per hop basis or on an end-to-end basis. The third feature pertains to reference signal transmission 1436. The fourth feature pertains to a feedback mechanism 1437. The fifth feature pertains to a sensing assisted operation 1438. Example methods related to the channel measurement and feedback operation 1430, as performed by the base station, by the RIS and by the UE, will be described in detail below.

In order to effectively perform communication between the UE and the BS via the RIS, the BS, the UE and/or the RIS, need knowledge of the channel, for example the CSI, to establish and maintain a link. In some embodiment, the BS, the UE and/or the RIS have access to partial CSI, for example the UE is only aware of a particular beam that should be used to best communicate with the BS. A measurement of a channel measurement RS, which is sent by either the BS or the UE, can be performed on a per hop basis or an end-to-end basis when determining the CSI. For end-to-end channel measurement, the BS sends the RS to the UE, or the UE sends the RS to the BS, and in each situation the RIS reflects the RS. In some embodiments, the RIS can measure the RS, as well as reflecting the RS to either the UE or BS.

The channel measurement and feedback operation 1430 in some embodiments comprises a setup and trigger operation 1432.

In some embodiments, sensing can be used to trigger a measurement. The RIS link may help the UE when there is an adequate quality channel between the RIS and the UE. This may assume that an adequate quality RIS link to the BS already exists. The measurement process may be suspended if an adequate quality channel is not expected. For example, RF sensing of certain sensing signals or synchronization signals may be used to trigger channel measurement and feedback for the RIS-UE link. Alternatively, non-RF based sensing using a camera or an infrared detector can be used to trigger the measurement. Alternatively, having access to the exact location and/or orientation of the UE and the RIS (based on GPS, a gyroscope, a compass and/or other RF-based, or non-RF based sensing), measurement may only be triggered if the UE is within a certain region and/or certain orientation range of the RIS.

The channel measurement and feedback operation 1430 in some embodiments comprises a channel measurement mechanism 1434.

In some embodiments, the RIS uses multiple different RIS patterns to enable channel measurement of a RIS-UE link. The use of multiple different RIS patterns allows multiple channel measurements to be made in different directions, at least one measurement based on each RIS pattern. For example, the RIS may not know exactly where the UE is located, so the RIS may have RIS patterns that can redirect a signal from the BS in several different directions in the area the UE is expected to be. By determining a channel measurement for each RIS pattern, a best RS measurement result at the UE, that is fed back to the BS, may indicate the proper direction of the UE and thus the proper RIS pattern to use for the RIS-UE link. In some embodiments, the measurement method involves beam sweeping. For a single RIS reflection between the BS and UE in which there are two hops, BS to RIS and RIS to UE, two beams and a reflection pattern are used to perform each channel measurement. A first beam is used at the BS, for either transmitting or receiving a RS, a second beam is used at the UE, for either receiving or transmitting a RS, and the RIS pattern used at the RIS which redirects the impinging beams. When the BS and the RIS are at fixed locations, the BS-RIS link is fixed and can be common for UEs in a certain proximity to the RIS. In such a scenario, beam sweeping can then be used between the UE and the RIS. Performing beam sweeping at the RIS for end-to-end transmission uses transmission of multiple RS from the transmitter (when either the BS or the UE is considered the transmitter depending on DL or UL transmission direction) to the RIS and reflection by the RIS in different directions using different RIS patterns. The receiver (again either the BS or the UE depending on DL or UL transmission direction) then measures the RS and finds a preferred beam-pattern pair between the UE and the RIS. The beam-pattern pair combined with a beam direction at the BS forms an information set that can be referred to as a beam-pattern triplet.

The channel measurement and feedback operation 1430 in some embodiments comprises a reference signal transmission operation 1436.

In some embodiments, when the RIS is capable of receiving or transmitting RS the channel can be measured on a per hop basis. As an example, to measure the channel between the UE and the RIS, the UE sends a reference signal, such as SRS, configured by the network, and the RIS receives and measures the RS. In such a scenario, the RIS may have receive elements that are part of the configurable elements of the RIS and can detect the RS sent by the UE. In some embodiments, the RIS is capable of synchronizing reception at the RIS with the UE transmission by receiving and detecting synchronization signals in terms of SSB or RS. The resulting measurement may be passed to the network to allow the BS to perform RIS pattern optimization, or be kept at the RIS so the RIS can perform RIS pattern optimization.

The channel measurement and feedback operation 1430 in some embodiments comprises a feedback mechanism 1437.

The process of measurement and feedback may rely on sensing data to determine when such information is worthwhile gathering. The sensing information may include localization of the UE such as information that indicates where the UE is located in relation to the RIS or the BS, or both.

Figure 12A:
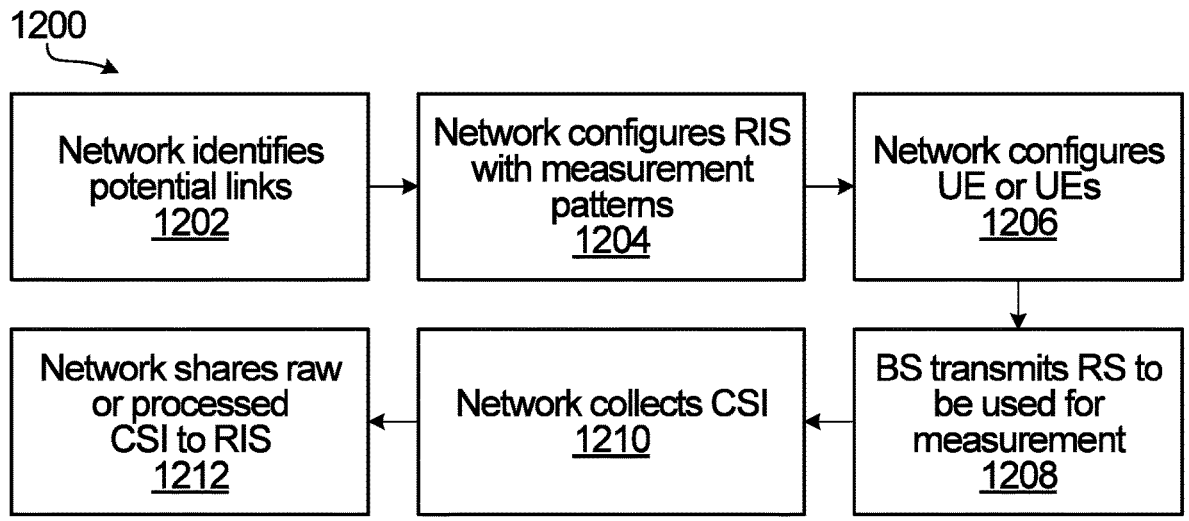
FIG. 12A to 12C are flow diagrams illustrating different example methods for implementing set up of RIS-UE links according to aspects of the application.
Figure 12B:
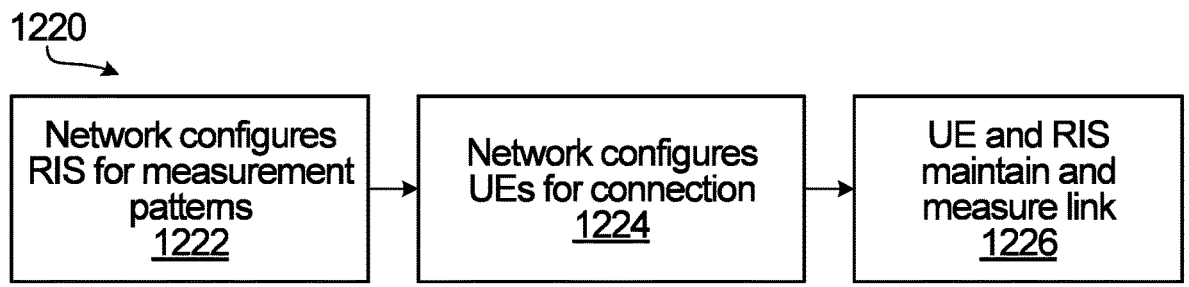
Figure 12C:
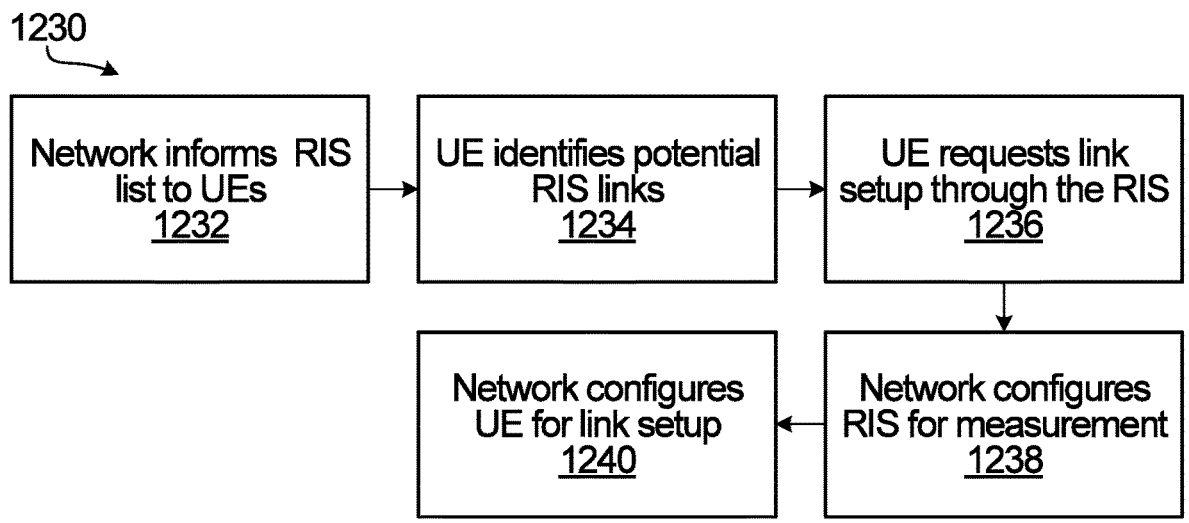

FIGS. 12A to 12C provide example flow charts for different methods that may be used for RIS-UE link setup described above.

FIG. 12A is a flow chart that illustrates an example of steps that may be involved in setting up a RIS-UE link 1200 wherein the set up is controlled by the network. Step 1202 involves the network identifying potential RIS-UE links. This may involve the BS referring to a list of RIS-UE links that were previously identified, for example as in the flow charts of FIG. 11A to 11G. Step 1204 involves the network configuring the RIS with RIS patterns that the RIS can use as part of measuring the channel between the RIS and UE. Step 1206 involves the network configuring one or more UEs with information relevant to channel measurement, such as the type of RS being used by the network for the measurement and when the RS may be transmitted. Step 1208 involves a BS controlled by the network transmitting the RS that is to be reflected by the RIS and used for channel measurement. Step 1210 involves the network collecting channel state information (CSI). In some embodiments, this may be CSI measurement information directly fed back by the UE, or reflected by the RIS, or fed back to the RIS from the UE and then the RIS feeds back the information to the network. Step 1212 involves the network sharing CSI information with the RIS that can be used by the RIS for RIS pattern control.

In some embodiments, the RIS pattern is fully controlled meaning that the RIS pattern is fully determined by the network. This may involve expressing RIS pattern information such as bias voltage for each element of the RIS panel or a phase shift (absolute or differential) for each element of the RIS panel to generate the RIS pattern. The RIS pattern information may be absolute RIS pattern information, i.e. the bias voltage or phase shift information for each configurable element of the RIS panel or be an alternative version of the information, maybe an index to a predefine RIS pattern known to the RIS that could be used to reduce overhead as compared to the absolute RIS pattern information. As the network is providing the RIS pattern information to the RIS, the RIS does not need to know any information about the channel, such as for example the CSI, and the UE that the BS is serving. The RIS receives the RIS pattern information, configures the RIS pattern and any signal sent by the BS will be redirected by the RIS panel based on the configured RIS pattern. As the network is providing the RIS pattern information, the network controlled BS that is communicating with the RIS should be aware of detailed CSI (with the resolution up to element or element group) and also have knowledge of the control mechanism of the RIS panel. Knowledge of the control mechanism of the RIS panel may be provided, for example, by the RIS as RIS capability information.

In some embodiments, the RIS pattern is partially controlled by the network. The BS provides the RIS configuration information that may include one or more of beam shape, beam direction and/or beam width of the impinging and/or reflecting beams at the RIS and the RIS can them determine a phase shift for each configurable element to achieve a desired RIS pattern. The direction may be expressed in absolute or relative terms with respect to other beam directions or previous RIS patterns, e.g. a few degrees of update in a particular direction. The RIS does not need to know CSI other than the particular beam direction signaled to it. The BS in such a case, does not need to know exactly how to implement the RIS pattern on the RIS panel. This mode allows a unified signaling between the BS and the RIS for different RIS panels. Also, this mode allows for self-calibration of the RIS without involving the BS.

In some embodiments, the RIS pattern is controlled by the RIS using RIS self-pattern optimization. This control mode is for RIS panels having a higher complexity, where the RIS has access to the CSI for both the BS-RIS link and the RIS-UE link (or alternatively the end to end BS-UE channel) and the RIS-UE link setup information. In some embodiments, the CSI knowledge may be acquired by the RIS itself through measurement or sensing, or both. In some embodiments, the CSI knowledge may be shared to the RIS by the UE, or the BS, or both. The active RIS-UE link is configured by the BS and the RIS optimizes the RIS pattern for serving the UE. For measurement purposes, the RIS may determine its own beam sweeping patterns as instructed by the BS.

In some embodiments, the RIS pattern is controlled using a hybrid mode. The RIS uses self-pattern optimization for the measurement functionality. However, for data communication, partial control is adopted where the RIS is instructed to use the RIS pattern with respect to the RIS patterns selected for measurement. As an example, the BS configures the RIS to have six different RIS patterns for six different instances of CSI-RS reflection. The RIS then chooses six different RIS patterns to redirect a CSI-RS from the BS on the BS-RIS link. The UE measures all or some of the CSI-RS that are redirected by the RIS in the direction of the UE and reports measurement results back to the BS. The BS then selects one of the RIS patterns and informs the RIS to use the selected pattern from the six measurement patterns, or a combination of several of the RIS patterns.

In some embodiments, being controlled by the network means the cooperative RIS link is determined by network. This may involve the network notifying the RIS and one or more UEs about a possible connection via RRC, group cast or broadcast messaging. The one or more UEs and RIS can then use their link, under network instruction, to maintain and measure the channel. In some embodiments, the UE is aware of the RIS within the link. In some embodiments, the UE does not know the RIS is in the link and only sends/receives signaling towards a beam direction that has been configured by the network. In some embodiments, the network provides a UE specific beam direction to one or more of the UEs. In some embodiments, the network provides a group specific beam direction based on CSI-RS that e used by all the UEs that the group specific beam direction is provided to.

FIG. 12B is a flow chart that illustrates an example of steps that may be involved in setting up a RIS-UE link 1220 wherein the set up is determined by the network. Step 1222 involves the network configuring the RIS with RIS patterns that the RIS can use as part of measuring the channel between the RIS and UE. Step 1224 involves the network configuring one or more UEs with information relevant to channel measurement, such as the type of RS being used by the network for the measurement and when the RS may be transmitted. Step 1226 involves the UE and the RIS maintaining a link with the network and performing channel measurement of the link.

In some embodiments, while being controlled by the network, RIS control is assisted by UE. For example, the UE can send a request to the network for a link to be setup. When setting up a cooperative RIS link, signaling amongst the network, RIS, and UE may use one or more of RRC configuration, group signaling, or broadcast signaling. The network may then send a list of RIS in proximity to the UE. After the UE receives the list of RIS, the UE can identify potential RIS links for communication. In some embodiments, the UE request may be provided to the network via the RIS and sends a request for setting up a link between the UE and one or multiple RIS panels. In some embodiments, the UE request may be provided to the network through reflection by the RIS or sent by the UE to the RIS through a side link and the RIS then relays it to the network.

In some embodiments, being controlled by the network means being assisted by UE. For example, the UE can send a request to the network for a link to be setup. When setting up a cooperative RIS link, signaling amongst the network, RIS, and UE may use one or more of RRC configuration, group signaling, or broadcast signaling. The network may then send a list of RIS in proximity to the UE. After the UE receives the list of RIS, the UE can identify potential RIS links for communication. In some embodiments, the UE request may be provided to the network via the RIS.

FIG. 12C is a flow chart that illustrates an example of steps that may be involved in setting up a RIS-UE link 1230 wherein the set up is assisted by UE. Step 1232 involves the network informing the UE of one or more RIS in proximity to the RIS. Step 1234 involves the UE identifying potential RIS-UE links based on the information provided in step 1232, i.e. if there is a RIS near the UE, a RIS-UE link may be possible. Step 1236 involves the UE sending the BS a request for setting up a link via the RIS. Step 1238 involves the network configuring the RIS for channel measurement with RIS patterns that the RIS can use as part of measuring the channel between the RIS and UE. Step 1240 involves the network configuring one or more UEs with information relevant to channel measurement, such as the type of RS being used by the network for the channel measurement and when the RS may be transmitted.

The channel measurement and feedback operation 1430 in some embodiments comprises a sensing assistance operation 1438.

In some embodiments, sensing can improve measurement performance and aid in reducing overhead. In some embodiments, the RIS-UE link has a strong line-of-sight (LOS) component, meaning that the RIS and the UE are substantially in view of each other without significant obstruction. With sensing, the beam direction may be available and have a desired accuracy, which eliminates a need for CSI measurement or can reduce overhead related to CSI measurement. For example, an infrared beam may be used to detect the RIS-UE link and set the beam direction. In some embodiments, sensing information such as orientation and location information of the UE and the RIS, or infrared detection information, a CSI-RS beam sweeping range may be reduced and more targeted toward the direction identified by a sensing mechanism when a more accurate beam direction is desired, as compared to the beam direction achieved by sensing without use of the CSI-RS, or if there is a calibration mismatch between the sensing information and beamforming capabilities of the RIS.

Referring back to FIG. 14, within the scope of the RIS control signaling operation 1440, there are three features shown. The first feature pertains to RIS pattern control 1442. The second feature pertains to RIS assisted measurement operation 1444. The third feature pertains to RIS activation 1446. Example methods related to the RIS control signaling operation 1440, as performed by the base station, by the RIS and by the UE, will be described in detail below.

Embodiments of this disclosure propose reconfigurable and controllable RIS panels where the network is capable of configuring the RIS and hence effectively expanding network antennas in the form of the RIS panel. To enable configuring and controlling of the RIS panels control signaling is exchanged between the BS and the RIS. In some embodiments, the control mechanism and signaling utilize a vendor specific signaling method, i.e. control signaling that is not standardized or required to be used by more than the vendor or those using the vendor's equipment. In some embodiments, the control signaling utilizes a standardized mechanism to enable deployment of different types of RIS panels that have different levels of capabilities and designs, for example RISs with or without RF transceivers, RIS with or without other RAT radios, RIS that can generate their own RIS patterns and RIS that are manufactured from different types of materials.

The RIS control signaling operation 1440 in some embodiments comprises a RIS pattern control and beamforming operation 1442.

In some embodiments, RIS panels are capable of controlling their own RIS patterns and hence a resulting beam direction, shape and width of a wavefront that is reflected by the RIS. Signaling that may aid in configuring the RIS pattern, or generating the RIS pattern, or both, may use different levels of BS and RIS involvement, for example the BS may generate the RIS pattern and provide that RIS pattern to configure the elements of the RIS panel. In some embodiments, the BS may provide the RIS with channel measurement information and other information used to generate the RIS, and the RIS can generate the RIS pattern to be used by the RIS. In some embodiments, signaling mechanisms are agreed upon during the BS-RIS link setup. In some embodiments, the signaling mechanisms may be based upon how the RIS pattern is controlled. In some embodiments, how the RIS pattern is controlled may be dependent upon the RIS capabilities and can therefore be determined, at least in part, on the RIS reporting the RIS capability to the BS. In some embodiments, the signaling mechanisms are used to determine the UE, BS and RIS behaviors during UE-RIS link discovery, measurement and data reflection periods or control reflection periods, or both.

The RIS control signaling operation 1440 in some embodiments comprises a RIS assisted measurement and feedback operation 1444.

Depending on whether the channel measurement is performed end-to-end or on a per hop basis, the involvement of the RIS, and as a result the control signaling, may be different.

In some embodiments, the RIS performs end-to-end channel measurements. The RIS may have a list of stored RIS patterns that can be used for redirecting a signal impinging on the RIS when performing channel measurement. The list of patterns may be added to the RIS at the time of manufacture, when being deployed in the network, or provided by the network during initial access or periodically updated. Each RIS pattern may be associated with a different reflection pattern and is used at the same time that the corresponding RS is transmitted by a BS or a UE. In some embodiments, the BS may provide the RIS an identification of particular RIS patterns that the RIS stored in memory and the timing associated with performing the measurement. The timing associated with performing the measurement may include scheduling information of when the BS will transmit a RS that the RIS needs to redirect to the UE. In some embodiments, the BS may provide the RIS with RIS patterns that the RIS should configure the elements of the RIS panel and the timing associated with performing the measurement.

In some embodiments, the RIS performs per-hop channel measurements, i.e. RIS-UE channel measurements or BS-RIS channel measurement, when the RIS is configured with the capability to be able to measure a reference signal transmitted by the BS or UE at the RIS. The RIS is notified of channel measurement timing and the sequence of the RS sent towards the RIS. The measurement process may involve beam sweeping at the transmitter side, which means the RIS will measure different instances of RS of the UE transmitting on different beams. Beam sweeping may involve the RIS using different beams to receive the different instances of the RS sent in the RIS direction, i.e. sweeping beams across the range of directions. In some embodiments, the RIS reports results of the channel measurement made by the RIS back to the network, or to the UE, or both. The results of the channel measurement may be used by the UE and BS for determining beam forming information to be used at those devices. The results of the channel measurement may be used for generating RIS patterns to provide a best signal to the UE or BS when redirected by the RIS.

In some embodiments, the RIS performs RIS pilot transmission, which includes the RIS having a transmission capability to be able to transmit a RS, for use in the channel measurement process. The RIS knows the timing and sequence of the RS that the RIS will be transmitting. In some embodiments, the RIS may use beam sweeping when transmitting the RS to provide multiple RS in the direction of the UE. In some embodiments, at the receiving side, the BS or the UE may use beam sweeping to detect the RS signal transmitted by the RIS.

The RIS control signaling operation 1440 in some embodiments comprises a RIS activation operation 1446.

Once the BS-RIS links and the RIS-UE links are step up, the RIS can be used in the BS-UE link to redirect transmission of signals from the BS to the UE or from the UE to the BS. In order to redirect signaling, the RIS is configured with at least scheduling information pertaining to when a signal from a transmitter is being sent to the receiver and which receiver the signal is being sent to, so that the RIS knows which RIS pattern to use to redirect the signal in the correct direction. The RIS, the BS-RIS link and the UE-RIS link may each be activated or deactivated based on instructions from the network. Such instructions may take the form of higher layer signaling or messaging such as DCI or UCI or media access control (MAC) control element (CE). Activating and deactivating the RIS can be used for power saving and reduction of signaling overhead.

The activation and deactivation of the RIS, the BS-RIS link and the UE-RIS link can be performed on a dynamic basis, which may be considered a short-term basis. Performing activation or deactivation on a dynamic basis refers to activation or deactivation on a scheduling time interval and is based on short term channel and traffic conditions. As a part of RIS-UE link set-up the potential RIS-UE links are identified. The BS can further determine which RIS-UE links need further channel acquisition, sounding and measurements. This determination may minimize unnecessary measurement efforts for RIS and UE. This can be done based on UE specific RIS selection.

The activation and deactivation of the RIS, the BS-RIS link and the UE-RIS link can be performed on a semi-static basis, which may be considered a long-term basis that is of the duration of multiple transmission time intervals (TTIs) (much slower than scheduling decision frequency determined by TTI) and the activation/deactivation decision is made based on the statistical properties of the wireless channel, UE distribution and/or traffic.

Another mechanism pertains to cooperative RIS activation and cooperative RIS deactivation. In some embodiments, cooperative RIS activation/deactivation involves activation and deactivation signaling for the RIS and the UE. In some embodiments, cooperative RIS activation/deactivation involves an individual BS-RIS link or RIS-UE link being activated or deactivated. In some embodiments, cooperative RIS activation/deactivation involves a combined BS-RIS link and RIS-UE link being activated or deactivated. In some embodiments, cooperative RIS activation and cooperative RIS deactivation uses signaling for activating or deactivating an individual BS-RIS link or RIS-UE or a combined BS-RIS and RIS-UE link. In some embodiments, cooperative RIS activation and cooperative RIS deactivation enables being able to turn on and turn off the entire link. In some embodiments, cooperative RIS activation and cooperative RIS deactivation enables being able to add or removing UE specific links. In some embodiments, cooperative RIS activation and cooperative RIS deactivation enables reduction of interference and reduction of power consumption. In some embodiments, using cooperative RIS activation and cooperative RIS deactivation may reduce CSI-RS measurement overhead and feedback overhead.

In some embodiments, decisions regarding when to activate or deactivate a link may depend on factors such as, but not limited to, current channel quality, UE distribution, and scheduling decisions, for example if there is no signaling for a particular UE, then the BS may deactivate a link to that UE from the RS.

From the UE perspective, signaling to activate or deactivate a link may involve using a higher layer signaling to activate one or more RIS-UE links. The RIS used in the RIS-UE link can be dynamically scheduled. Part of the activation mechanism involves performing channel measurement of the RI-UE link. In some embodiments, CSI-RS for only active links is measured and fed back to the BS.

Figure 13A:
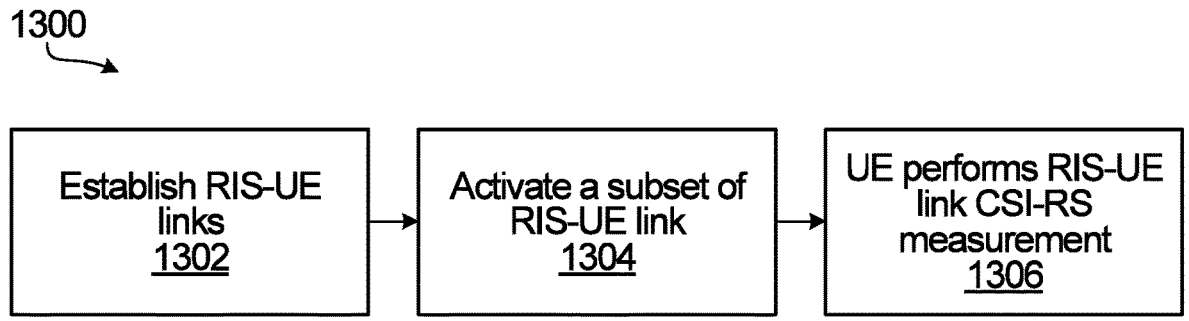
FIG. 13A to 13C are flow diagrams illustrating different example methods for activating RIS-UE links according to aspects of the application.

FIG. 13A is a flow chart that illustrates an example of steps that may be involved in setting up and activating a RIS-UE link 1300. Step 1302 involves establishing one or more RIS-UE links. This may be performed by methods such as those described in FIGS. 11A to 11G Step 1304 involves the BS sending a message to activate a subset of existing RIS-UE links associated with the RIS. Step 1306 involves the UE performing CSI measurement for the activated RIS-UE link determining the CSI may be performed for either DL (i.e. using CSI-RS transmitted from the BS) or UL (i.e. using SRS transmitted from the UE) scenarios. This may be performed by methods such as those described in FIGS. 12A to 12C.

The RIS can be a fast RIS or a slow RIS, in terms of how fast the RIS pattern can be updated with respect to the time frame for scheduling transmissions. Slow RIS panels cannot easily change the RIS pattern in a dynamic manner, i.e. updating the RIS pattern fast enough to allow the pattern to effectively be received by the desired receiver, and therefore are better for use for a long term link activation or deactivation. The slow RIS panels enable a UE-RIS link to only one UE or one group of UEs that have similar beam patterns, i.e. they are generally along a same beam path. In some embodiments, the BS notifies the RIS regarding the active UE-RIS link. In some embodiments, the BS configures the RIS beamformer for the target UE. Fast RIS panels can change the RIS pattern in a dynamic manner, i.e. updating the RIS pattern fast enough to allow the pattern to effectively be received by the desired receiver, and therefore the RIS panels can support multiple active links with UEs that are not collocated or along the same directional path. The RIS may retain CSI and/or RIS patterns for multiple active links. The RIS patterns can then be dynamically changed to reflect a desire signal in the direction of the scheduled UE.

Figure 13B:
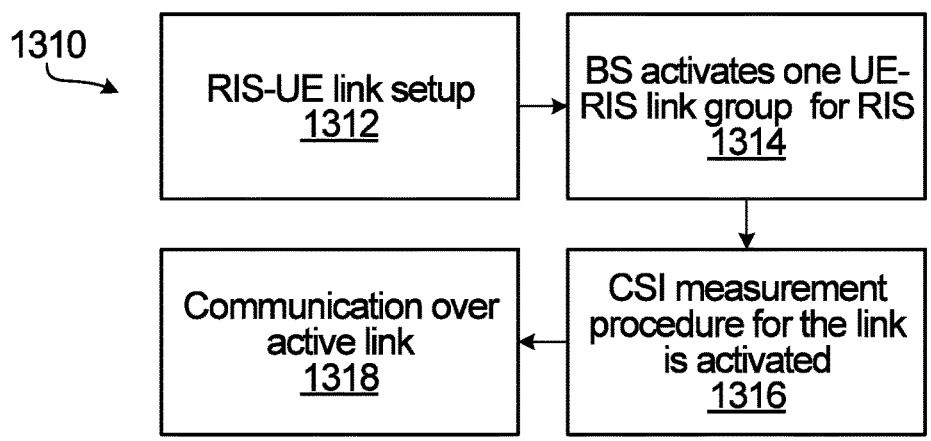

FIG. 13B is a flow chart that illustrates an example of steps that may be involved in setting up and activating a RIS-UE link 1310. Step 1312 involves setting up a RIS-UE link. This may be performed by methods such as those described in FIGS. 11A to 11G. Step 1314 involves the BS sending a message to activate one RIS-UE link associated with the RIS. Step 1316 involves performing CSI measurement for the activated RIS-UE link. This may be performed by methods such as those described in FIGS. 12A to 12C. Step 1318 involves communications occurring over the BS-RIS and RIS-UE links at a scheduled time.

Figure 13C:
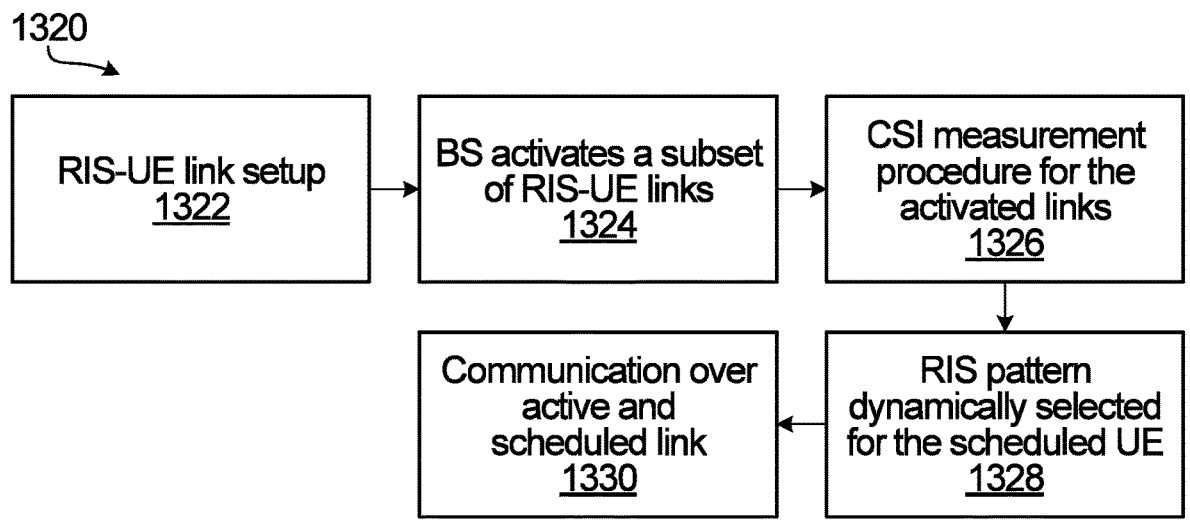

FIG. 13C is a flow chart that illustrates an example of steps that may be involved in setting up and activating a RIS-UE link 1320. When the RIS has multiple RIS-UE links that are activated, the RIS can dynamically change the RIS pattern to redirect signaling from a first UE to a second UE based upon receiving the appropriate control signaling from the BS. Step 1322 involves setting up a RIS-UE link. This may be performed by methods such as described in FIGS. 11A to 11G. Step 1324 involves the BS sending a message to the RIS and/or to the impacted UEs to activate a subset of existing RIS-UE links associated with the RIS. Step 1326 involves performing CSI measurement for the activated subset of RIS-UE links. This may be performed by methods such as those described in FIGS. 12A to 12C. Step 1328 involves the appropriate RIS pattern being dynamically selected for a scheduled UE. The RIS pattern may be selected by the RIS or the BS. Step 1330 involves signaling occurring over the BS-RIS and RIS-UE links at the appropriate time for the schedule UE. At a subsequently scheduled time, the RIS pattern can be dynamically selected for a different schedule UE.

In some embodiments, when there are no active RIS-UE links for a particular RIS, the RIS may be deactivated to same power or avoid undue interference. In some embodiments, this may result in deactivation of the BS-RIS link as well.

In some embodiments, when there are no RIS-UE links for a particular RIS, the RIS may be deactivated to save power at the RIS or to avoid undue interference with other signaling. In some embodiments, deactivation of the RIS results in deactivation of the BS-RIS link as well.

Depending on the mechanism and reconfiguration speed used by the RIS panels to perform beamforming and measurement, the RIS may be synchronized with the network at different levels of precision. Synchronization for RS reception by the RS, which is used for example when performing channel measurement, may need more accurate timing as compared to long term beamforming, which is used for example when the RIS is configured for data reflection. Therefore, RIS panels that can be updated fast (for example, meaning the RIS panels are able to reconfigure the RIS pattern at a fraction of a scheduling internal and/or a transmission time interval (TTI)) and that can be accurately synchronized are capable of beam switching and activation at an appropriate scheduling level and for measurement. RIS panels that can be updated more slowly (for example, meaning the RIS panels are not able to reconfigure RIS patterns on the order of a scheduling time interval), but that can be accurately synchronized, are capable of measurement and long term beam switching and activation. RIS panels that cannot be accurately synchronized are generally capable of long term beam switching and activation.

In some embodiments, the RIS may use an internal transceiver or a global positioning signal (GPS) for over-the-air synchronization. In some embodiments, the RIS may use a clock signal at the backhaul link for maintaining synchronization with the network.

Referring back to FIG. 14, within the scope of the communication operation 1450, there are three features shown. The first feature pertains to physical layer control signaling 1452. The second feature pertains to data communications 1454. The third feature pertains to dual connectivity 1456. Example methods related to the communication operation 1450, as performed by the base station, by the RIS and by the UE, will be described in detail below.

A goal of utilizing RIS is to improve communication throughput and reliability in the network by enhancing the signal-to-interference+noise-ratio (SINR) of the wireless channel, increasing the channel rank or channel diversity, or combinations thereof. The RIS may be utilized to reflect the data signal only or may be utilized to reflect both control and data.

The communication operation 1450 in some embodiments comprises a physical layer control mechanism 1452.

Once the BS-RIS links and the RIS-UE links are step up and the RIS is to be used in the BS-UE link to redirect transmission of signals from the BS to the UE or from the UE to the BS, the UE also needs to be configured for either transmitting to the BS or receiving from the BS. In some embodiments, scheduling information is determined by the BS, for example, by a scheduler in the BS or associated with the BS.

In some embodiments, the scheduling information for the UE is sent by the BS and reflected by the RIS to the UE. In some embodiments, the RIS is used to reflect downlink control signaling from one or more BS to a single UE or to multiple UEs. In some embodiments, the RIS is used to reflect the uplink control signaling from a single UE or from multiple UEs to one or more BS. For RIS panels that are capable of updating their RIS patterns more slowly than a scheduling time interval and TTI, the RIS may only serve UEs within the same general beam direction with data and control signaling. RIS panels that are capable of updating their RIS patterns more frequently, as compared to the TTI, can be used to serve multiple UEs that are located in different directions from one another. In some embodiments, physical layer control signaling and direct link signaling for control signaling is used between the BS and UEs.

In some embodiments, the scheduling information is sent directly by the BS to the UE through other channels, for example at low frequency (LF), an example of which is a microwave band below 6 GHz.

In some embodiments, the scheduling information can be sent to the RIS, which detects the scheduling formation and then the RIS and communicates with the UE by a RIS-UE sidelink. In some embodiments, the RIS may arrange a sidelink communication channel with the UE. The RIS may include a transceiver that allows the RIS to use in-band or out-of-band signaling or using other types of radio access technology (RAT), such as Wi-Fi or Bluetooth.

The communication operation 1450 in some embodiments comprises a data communication operation 1454.

Once the RIS and UE are configured for signaling that uses the RIS to redirect a signal, the link is ready for data signaling to occur on the BS to UE link via the activated RIS panel. In some embodiments, the RIS when properly configured and when capable of support appropriate timing accuracy can reflect the data between the BS and the UE. This is performed by the RIS using a proper RIS pattern and proper beamforming at the TRP or the UE, or both.

In some embodiments, the data may be accompanied by a demodulating RS, such as, for example, a demodulating reference signal (DMRS).

The communication operation 1450 in some embodiments comprises a dual connectivity operation 1456.

In some embodiments, the UE is connected to the BS through multiple links, for example a direct link between the BS and UE or a secondary link reflected by at least one other RIS, or both.

When more than two links are used, synchronization between the signaling on the two or more links can become an important issue. For example, in a DL scenario, the UE can perceive multiple links using different beam direction and timing within a difference of the propagation time of two or more signals. In some embodiments, the propagation time difference can be compensated by the BS. For example, the BS may delay a direct link transmission to arrive at a time close to when a reflect link transmission may arrive at the UE.

From the perspective of the UE, the UE may or may not know that it is receiving from, or transmitting to, the RIS. This may be referred to in this document as the "visibility" of the RIS to the UE. If the RIS is referred to as "invisible" to the UE, the UE may consider the RIS to be a remote radio head (RRH). In such scenarios, the RIS may only perform reflective connection with the UE.

As part of configuring the UE when the RIS is invisible to the UE, an initial step involves RIS-UE link discovery.

The RIS-UE link discovery involves performing one or more of synchronization, using the random access channel (RACH) or channel state information reference signal (CSI-RS) beam sweeping to discover a signal that is reflected by the RIS in the direction of the UE. In some embodiments, the RACH can be directly detected by the RIS.

In some embodiments, the RIS-UE link discovery uses sensing assisted discovery. Sensing assisted discovery may or may not involve beam sweeping.

Once the RIS-UE link has been successfully identified, a subsequent step involves channel measurement of the RIS-UE link. A DL based channel measurement may involve beam sweeping by the UE to detect reference signals that are transmitted by the BS and reflected by the RIS. After the UE measures the channel, the UE may feedback channel measurement results to the network in UL control channel. Based on the channel measurement performed by the UE, the UE may select a UE-side beam with the preferred channel measurement result for receiving further signalling from the RIS.

Data signaling reflection by the RIS may occur whether or not the RIS has a transceiver that is capable of transmitting or receiving a reference signal (RF) signal that is used for performing channel measurement as part of RIS discovery, RIS-UE link identification, and RIS-UE link setup. A UE-side beam used for UL/DL control can be selected independent of the UE-side beam selected for data.

Data and Control reflection by the RIS may occur whether or not the RIS has a transceiver that is capable of transmitting or receiving a RS that is used for performing channel measurement as part of RIS discovery, RIS-UE link identification, and RIS-UE link setup. A UE-side beam used for UL/DL control can be selected in accordance with the RIS-UE link measurement. In some embodiments, the RIS may use beam sweeping to reflect the control channel (reflecting the control channel signal on a beam that sweeps a range of directions) to and from multiple UEs, control channel signaling may be repeated for different beam directions at the RIS in both UL and DL directions. For each RIS pattern at the RIS covering one or a group of users, DL control channel is sent to those users by the BS and reflected by the RIS or UL control channel is sent by the users and reflected by the RIS and sent to the BS. If the exact timing of the RIS beam sweeping is not known by the users, the content of control channel should be repeated.

If the RIS is referred to as "partially visible" to the UE such as when the UE can decode some data transmitted by the RIS (e.g. when the RIS is using backscattering) for link discovery. However, the UE may not be able to distinguish whether the UE is receiving a reflected beam from the RIS or from a direct link from a RRH.

As part of configuring the UE when the RIS is partially invisible to the UE, the UE may be unaware of the RIS and detect the RIS as an RRH. An initial step involves RIS-UE link discovery. The RIS-UE link discovery may be augmented by transmitting signaling from that RIS that provides the UE with at least some information about the RIS, such as an identifier of the RIS (RIS ID), a RIS frequency range, beam direction information that can allow the UE to know which direction a signal reflected by the RIS, in the direction of the UE, is coming from, and the synchronization and/or RS pattern that is reflected by the RIS.

Once the RIS-UE link has been successfully identified, a subsequent step involves channel measurement of the RIS-UE link. A DL based channel measurement may involve beam sweeping by the UE to detect reference signals that are transmitted by the BS and reflected by the RIS. After the UE measures the channel, the UE may feedback channel measurement results to the network in an UL control channel. Based on the channel measurement performed by the UE, the UE may select a UE-side beam with the preferred channel measurement result for receiving further signalling from the RIS.

Data signaling reflection by the RIS may occur whether or not the RIS has a transceiver that is capable of transmitting or receiving a reference signal (RF) signal that is used for performing channel measurement as part of RIS discovery, RIS-UE link identification, and RIS-UE link setup. A UE-side beam used for UL/DL control can be selected independent of the UE-side beam selected for data.

Data and Control reflection by the RIS may occur whether or not the RIS has a transceiver that is capable of transmitting or receiving a RS that is used for performing channel measurement as part of RIS discovery, RIS-UE link identification, and RIS-UE link setup. A UE-side beam used for UL/DL control can be selected in accordance with the RIS-UE link measurement. In some embodiments, the RIS may use beam sweeping to reflect the control channel (reflecting the control channel signal on a beam that sweeps a range of directions) to and from multiple UEs, control channel signaling may be repeated for different beam directions at the RIS in both UL and DL directions. For each RIS pattern at the RIS covering one or a group of users, DL control channel is sent to those users by the BS and reflected by the RIS or UL control channel is sent by the users and reflected by the RIS and sent to the BS. If the exact timing of the RIS beam sweeping is not known by the users, the content of control channel should be repeated.

In some embodiments, to facilitate the data communication, the control channel content for the data to be reflected by the RIS, is setup in accordance with the information associated with the RIS discovery process such as the RIS ID, which may be transmitted or backscattered by the RIS.

If the RIS is referred to as "fully visible" to the UE, the UE is fully aware that the RIS is part of the connection being used to reflect a signal to the UE and is able to distinguish a signal reflected by the RIS with other signals that are detected by the UE.

When the UE is aware of the RIS, the UE detects the RIS as a reflecting device.

An initial step involves RIS-UE link discovery. The RIS-UE link discovery may be augmented by signaling from RIS, either in-band or out-of-band. The RIS-UE link discovery may be augmented by signalling form the RIS that provides the UE information about the RIS, such as beam direction information that can allow the UE to know which direction a signal reflected by the RIS, in the direction of the UE, is coming from.

Once the RIS-UE link has been successfully identified, a subsequent step involves channel measurement of the RIS-UE link. A DL based channel measurement may involve beam sweeping by the UE to detect reference signals that are transmitted by the BS and reflected by the RIS. After the UE measures the channel, the UE may feedback channel measurement results to the network in UL control channel. Based on the channel measurement performed by the UE, the UE may select a UE-side beam with the preferred channel measurement result for receiving further signalling from the RIS. In some embodiments, the channel measurement is augmented by information received during the discovery phase, such as UE location information or RIS pattern information. In some embodiments, the channel measurement is augmented by sensing. In some embodiments, the channel measurement is augmented by information exchanged between the RIS and the UE.

Data signaling reflection by the RIS may occur whether or not the RIS has a transceiver that is capable of transmitting or receiving a reference signal (RF) signal that is used for performing channel measurement as part of RIS discovery, RIS-UE link identification, and RIS-UE link setup. A UE-side beam used for UL/DL control can be selected independent of the UE-side beam selected for data.

Data and Control reflection by the RIS may occur whether or not the RIS has a transceiver that is capable of transmitting or receiving a RS a that is used for performing channel measurement as part of RIS discovery, RIS-UE link identification, and RIS-UE link setup. A UE-side beam used for UL/DL control can be selected in accordance with the RIS-UE link measurement. In some embodiments, the RIS may use beam sweeping to reflect the control channel (reflecting the control channel signal on a beam that sweeps a range of directions) to and from multiple UEs, control channel signaling may be repeated for different beam directions at the RIS in both UL and DL directions. For each RIS pattern at the RIS covering one or a group of users, DL control channel is sent to those users by the BS and reflected by the RIS or UL control channel is sent by the users and reflected by the RIS and sent to the BS. If the exact timing of the RIS beam sweeping is not known by the users, the content of control channel should be repeated.

In some embodiments, control channel information related to RIS, such as RIS pattern information or information that identifies UEs that might be in proximity to the RIS, can be configured during the RIS discovery process. Example: RIS panel location for each RIS ID is configured. RIS ID is backscattered by the RIS.

In some embodiments, control channel information related to RIS can be exchanged directly between UE and RIS.

In some embodiments, methods for communication between the UE and RIS are provided that can be used regardless of whether the RIS is invisible, partially visible or fully visible to the UE.

From the UE perspective, methods are provided herein, in particular examples that are included below, to incorporate different RIS deployment schemes regardless of whether the RIS is visible or invisible to the UE.

Various embodiments provide signaling methods for configuring the RIS and UE for channel measurement, configuring and scheduling UL and DL control channels for the RIS and UE, and configuring and performing UL/DL data transmission over the RIS assisted link between the RIS and UE.

In some embodiments, capabilities of the RIS, such as, but not limited to, speed of configurability of the RIS pattern, may affect how control signaling is performed. For example, RIS that are capable of reconfiguring the RIS pattern used to reflect a signal with a speed faster than the scheduling duration (TTI) may be capable of DL/UL control signaling repetition, i.e. repeated transmission of the DL/UL control signaling in multiple directions, possibly using beam sweeping. Also, RIS that are capable of reconfiguring the RIS pattern used to reflect a signal with a speed faster than the scheduling duration (TTI) may be capable of using time division multiple access (TDMA) for multiplexing signals to one or more RIS panels. In some embodiments, a wide beam or an independent link can be used for control signaling for RIS panels with a lower speed of configurability of the RIS pattern.

In some embodiments, capabilities of the RIS, including speed of configurability of the RIS pattern may affect how control signaling is performed with regard to configuring and performing channel measurement. For example, the RIS capabilities may affect UE beam selection and signaling to and from the UE when the RIS is used to reflect a signal to or from the UE and for RIS assisted channel measurement.

RIS can have differing levels of capability, operability and functionality. Some RIS have lower capability, such as only being capable of adjusting the configurable elements of the RIS panel based on explicit configuration by the network, but not have a transceiver for transmitting or receiving RF signaling. The RIS panel configuration can be signaled over-the-air or through a wired connection. The lower capability RIS can be used for reflecting reference signals, such as CSI-RS transmitted by the BS or SRS transmitted by the UE, used by the BS or UE for end-to-end channel measurement. The channel measurement may generate channel state information (CSI) for the end-to-end-link. The lower capability RIS can be used for reflecting data signals as well.

Some RIS have higher RIS capability that enable the RIS to perform one or more of: CSI-RS acquisition that may include CSI-RS/SRS detection and/or CSI-RS transmission; feedback channel detection; RIS beam adjustment by selecting a RIS pattern; and direct RIS-UE communication that may include CSI exchange and/or relay of control signaling.

The capability of the RIS can have an impact on the types of signaling that the RIS can transmit, receive and reflect, such as signaling for channel measurement signals (RS), control signaling for both UL and DL, and data communication signaling.

There are different modes in which the RIS can be operated when used in a BS-UE link. In one mode, the RIS is substantially used for data reflection. Data transmission occurs on a data channel on a link between the BS and the UE via a RIS. A control and feedback (feedback that may be for example ACK/NACK) channel occurs on link between the BS and the UE without the RIS. A channel for transmitting a RS for channel measurement of the BS-UE link or UE-RIS link occurs on a link between the BS and the UE via the RIS or from the UE to the RIS. A measurement feedback message for channel measurement feedback occurs from the UE to the BS without the RIS. Referring to FIG. 4E, as an example, a link from the BS to the RIS to the UE are links 464 and 475 and a link between the BS and US is link 466.

In another mode, the RIS is used for data reflection and the RIS has a transceiver so that the RIS can perform channel measurement. Data transmission occurs on a data channel on a link between the BS and the UE via a RIS. A control and feedback (ACK/NACK) channel occurs on link between the BS and the UE without the RIS. A channel for transmitting a RS for channel measurement of the BS-RIS link occurs from the BS to the RIS and for channel measurement of the RIS-UE link from the RIS to the UE. A measurement feedback message for the channel measurement feedback occurs on a link from the UE to the BS without the RIS.

In another mode, the RIS is used for data reflection as data communication occurs on a data channel over a link from the BS to the UE via the RIS. The links from the BS to the RIS and from the RIS to the UE (i.e. from the BS to the US via the RIS) can also be used for a control and feedback (ACK/NACK) channel. A channel for transmitting a RS for channel measurement of the link occurs on the links from the BS to the UE via the RIS or on the same link but from the UE to the BS via the RIS. A measurement feedback message for the channel measurement feedback occurs on the link from the UE to the BS without the RIS or on the link from the UE to the BS via the RIS.

In another mode, the RIS is substantially used for data reflection as data communication occurs on a data channel over a link from the BS to the UE via the RIS and the RIS has a transceiver so that the RIS can perform channel measurement. The links from the BS to the RIS and from the RIS to the UE can also be used for a control channel. A control and feedback (ACK/NACK) channel occurs from the BS to the UE without the RIS. A channel for transmitting a RS for channel measurement of the BS-UE link occurs from the BS to the UE via the RIS or on the same link but from the UE to the BS via the RIS. A measurement feedback channel for the channel measurement feedback occurs on the link from the UE to the BS without the RIS or on the link from the UE to the BS via the RIS.

In some embodiments, the UE receives first beam direction configuration information. The first beam direction configuration information indicates a beam direction for a first link for the UE to communicate with the BS. The UE also receives second beam direction configuration information. The second beam direction configuration information indicates a beam direction for a second link to communicate with the BS. The first link is a different type of link from the second link in some examples. The first beam direction may have a different direction than the second beam direction. In some examples, the first link is established between the UE and the BS via a reflective intelligent surface (RIS). Referring to FIG. 4B, as an example, a link from the BS to the UE via the RIS includes links 464 and 475. The second link is established between the UE and the BS without a RIS. Referring to FIG. 4E, as an example, a link from the BS to the UE with the RIS includes link 466. Alternatively, neither of the first and second links refers to a RIS in some examples. In such examples, the first link and the second links are established for communications between the UE and the BS without the RIS.

In some embodiments, the BS transmits first beam direction configuration information. The first beam direction configuration information indicates a beam direction for use by a UE for a first link to communicate with the BS. In some embodiments, the first link is established between the BS and the UE via a RIS.

The BS also transmits second beam direction configuration information The second beam direction configuration information indicates a beam direction for use by the UE for a second link to communicate with the BS, wherein the second link is established between the BS and the UE without the RIS.

For use by each of the BS and UE, the first link may be used for at least one of: a data channel; a control channel; a feedback channel; a measurement channel; or a report channel. The second link may be used for at least one of: a data channel; a control channel; a feedback channel; a measurement channel; or a report channel.

The signaling to the UE and/or the RIS (if RIS is in a link between the BS and UE) may include information pertaining to the direction of the beam that is transmitted, received or reflected for any of the links. The beam direction can be for any signal or physical channel such as data, reference or synchronization signals or control information. The beam direction for each signal may be independently signaled or combined in one signaling message. Multiple signals and channels may utilize the same beam or different beams.

Figure 16A:
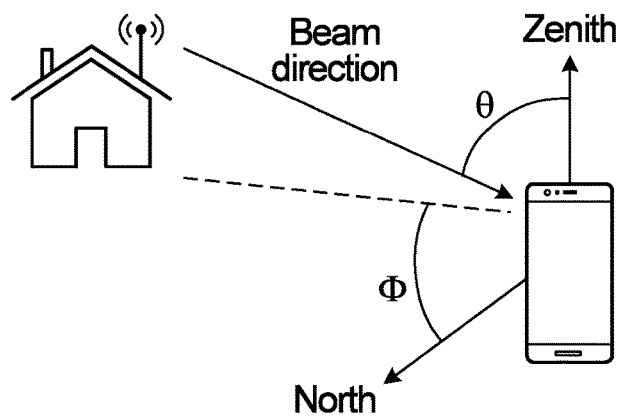
FIGS. 16A and 16B are schematic diagrams illustrating how absolute beam direction may be represented for providing beam direction information to a UE.
Figure 16B:
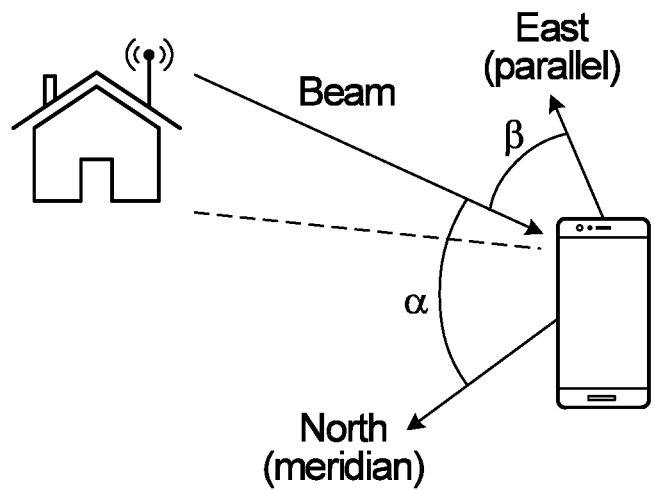

In some embodiments, the signaling to the UE includes information pertaining to the beam direction for a signal (such as SSB, CSI-RS, SRS) or a physical channel (such as PDCCH, PDSCH, PUSCH, PUCCH, PRACH) in any of the directions (for example UL, DL, SL) from the UE perspective. In some embodiments, the beam direction may be expressed in an absolute direction with respect to earth coordinates (azimuth with respect to true or magnetic north, and elevation or inclination with respect to zenith) in a spherical presentation. An example of absolute direction with respect to earth coordinates is shown in FIG. 16A. The dashed line in FIG. 16A is a projection of the beam on the horizontal plane. In some embodiments, the direction may be expressed as inclination with respect to two coordinates such as the meridian and parallel coordinates. In some embodiments, such as for rural terrestrial deployment, the angle with respect to north is signaled and the elevation or inclination angle with respect to zenith is not signaled. In some embodiments, the angular direction is expressed with respect to an orientation of the UE or a direction in which the UE is moving. An example of absolute direction with respect to an orientation of the UE or a direction in which the UE is moving (in this case parallel to an East direction) is shown in FIG. 16B. The dashed line in FIG. 16B is a projection of the beam on the horizontal plane.

In some embodiments, the beam direction at a RIS, with respect to a transmitter and/or a receiver, can be expressed in terms of the absolute angular direction, where the transmitter and the receiver can be any of UEs, terrestrial or non-terrestrial BS, and relays. The direction signaling may be expressed in the form of azimuth/elevation coordinates (or equivalents) or in the form of inclination with respect to two coordinates or with reference to the RIS orientation.

Figure 16C:
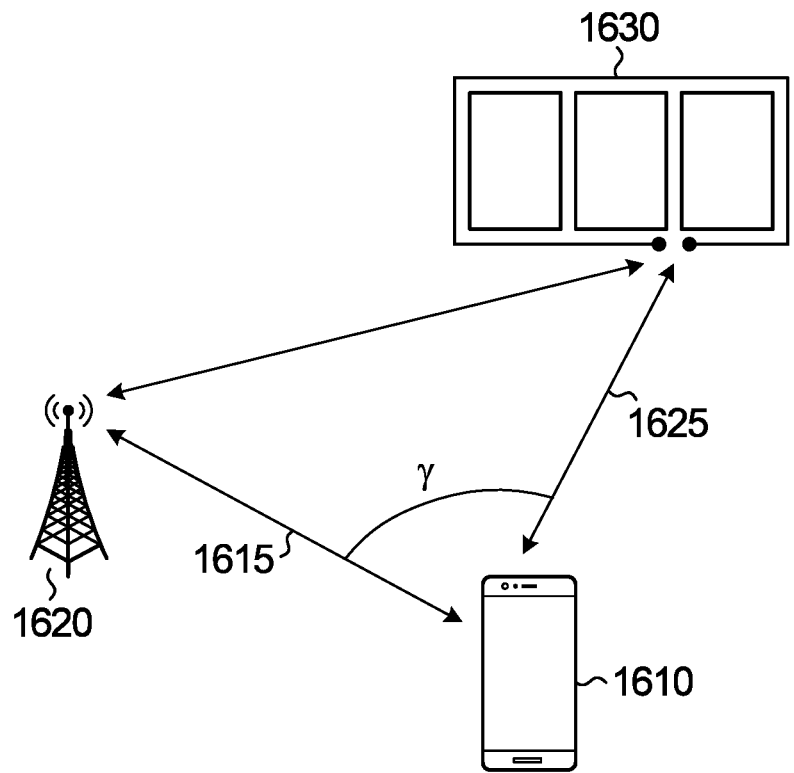
FIG. 16C is a schematic diagram illustrating how relative beam direction may be represented for providing beam direction information to a UE.

In some embodiments, the beam direction of a signal or channel (here referred to as target direction) may be signaled relative to a reference beam (here referred to as reference direction). The reference beam may be optimized using beam refinement. Therefore, any refinement to the reference beam is also applied to the target beam direction. The reference beam may be the direction of any other signal or channel or with respect to other RF or non-RF beams used for other purposes such as sensing. Examples of a sensing direction is a direction of an infra-red link or a direction of emission or reception of a sensing signal. FIG. 16C illustrates an example of when a UE 1610 knows the direction of a DL control channel beam 1615 from a BS 1620 and can then express a DL and UL data channel beam 1625 as being y degrees to the right of the DL control channel beam 1615 coming from RIS 1630 after reflection.

The reference direction may utilize a non-UE specific broadcast signal or a multicast signal, or a UE specific (or UE group specific) signal such as CSI-RS, or SRS.

Expressing the beam direction relative to a reference beam direction may use any of the following modes of signaling:

- a target beam direction that is the same as a reference direction;
- explicit signaling of an angular difference between the target direction projected on the azimuth and/or elevation coordinates, or any other coordinates;
- explicit signaling of an absolute angular difference between the target direction and one or more reference directions; or
- implicit signaling of a weighted combination of two or more reference directions.

In some embodiments, the RIS is used for data reflection, i.e. the RIS is not used for reflecting control information and is not used for channel measurement. The RIS is only capable of applying a RIS pattern configured by the network.

In some embodiments, the RIS pattern configured on the RIS panel can be explicitly provided with configuration information so that the RIS does not need to generate the RIS pattern, it simply uses the provided configuration information to configure the RIS pattern.

In some embodiments, the RIS pattern configured on the RIS panel can be implicitly provided to the RIS in the form of CSI and scheduling information provided by the network.

Since the RIS is not configured to perform channel measurement, the BS can transmit CSI-RS to the UE, or the UE can transmit SRS to the BS. The receiving device (UE or BS, respectively) can then measure the reference signal to perform the channel measurement. In some embodiments, the RIS can redirect or modulate the measurement CSI-RS or SRS, for example by performing beam sweeping. In this case, a series of RIS patterns capable of reflecting the signal to/from multiple directions are used, each for a different instance of the RS. For example, in DL, CSI-RS is sent by the BS for K different copies and using K different patterns each copy is reflected towards a different direction. This can be used to ensure users located in different directions are able to measure the CSI-RS. In UL, using beam sweeping, and K different RIS patterns, SRS from different users are reflected to the BS.

In some embodiments, there is a direct BS-UE link for control channel information exchange between the BS and UE. This direct link provides an independent beam direction as compared to the data reflection communication link via the RIS. Control channels for both UL/DL can use the direct link.

Figure 5:
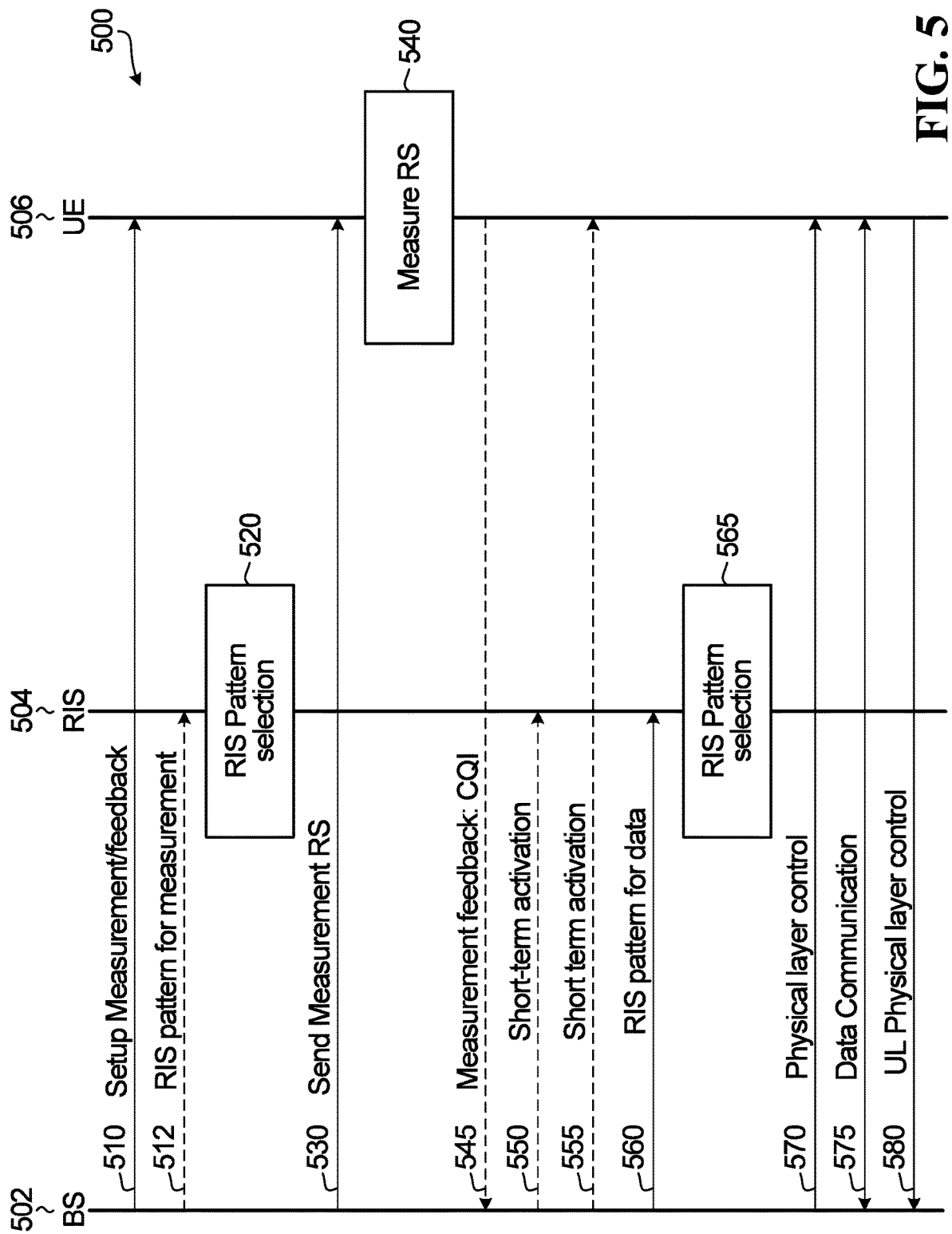
FIG. 5 is a flow diagram illustrating signaling between a BS, a RIS and a UE for RIS and UE configuration and data transmission between the BS and UE wherein the RIS is used for data reflection according to an aspect of the application.

FIG. 5 is a signal flow diagram 500 that shows an example signaling diagram for signaling between a BS 502, a RIS 504, and a UE 506 where the RIS 504 is controlled by the BS 502. The signal flow diagram 500 incorporates some of the above described functionalities. The signal flow diagram 500 shows signaling that may occur subsequent to RIS discovery and BS-RIS links being identified and set up.

Signaling lines 510 and 555 indicate higher layer configuration information sent from the BS 502 to the UE 506 that may be sent by direct link, not reflected by the RIS.

Signaling lines 515, 550 and 560 indicate signaling commands from the BS 502 to the RIS 504. These commands can be transmitted over the air or through a wired connection. If they occur over the air then the RIS 504 are assumed to have a transceiver or sensor for receiving from the BS 502 or UE 506 and for transmitting to the BS 502 or UE 506. In some embodiments, the commands may use a standardized mechanism designed for RIS control. In some embodiments, the commands may use new or existing mechanisms such as RRC or Xn.

Signaling lines 530 and 575 show the signals that are reflected by the RIS 504 between the BS 502 and the UE 506.

Signaling lines 545, 570 and 580 show feedback information that is direct link uplink physical layer control signaling that is not reflected by the RIS 504. However, in some embodiments, the uplink physical layer control signaling could be reflected by the RIS 504.

The BS 502 sends a message 510 to the UE 506 that provides configuration information for setting up channel measurement. This message may include information that enables the UE to know at least one of what type of RS may be received and when, that the RS is associate with which RIS, in this case the RIS 504, the RS sequence, RS time/frequency patterns, RS timing and corresponding port and signal beam direction, such as quasi-colocation (QCL) information. The configuration does not need to identify that the RIS is in the link between the UE and BS. The configuration may also include feedback configuration information that enables how feedback could be provided to the BS, i.e. the time/frequency resource that could be used for sending the feedback, the scrambling sequence for feedback information and the type of information to be sent as feedback information.

Message 512 is an optional message that may be sent by the BS 502 to the RIS 504 that provides RIS pattern information to the RIS 504 to be able to reflect a signal to the UE 506. This message may be information specific to the RIS 504 to set the RIS pattern without having to generate the RIS pattern or it may be general information that identifies location information for the UE 506 to allow the RIS 504 to generate the RIS pattern itself. There may be RIS patterns stored at the RIS in addition to any that might be provided in message 512.

At step 520 the RIS 504 selects an RIS pattern from a group of RIS patterns stored at the RIS, so that the RIS 504 can reflect a measurement reference signal to the appropriate UE, in this case UE 506.

Message 530 is a reference signal sent by the BS 502 to the UE 506, which is reflected by the RIS 504 using the selected RIS pattern selected as 520. At step 540, the UE 506 measures the RS redirected from the RIS 504.

Message 545 is an optional message that is a report from the UE 506 to the BS 502 to acknowledge that the UE 506 has detected the RIS 504. Message 545 may include channel quality information (CQI) or channel state information (CSI). The information provided in message 545 may be used by the BS 502 to determine a RIS pattern that the RIS 504 should use for data reflection. While one RIS 504 is shown, it is to be understood that there could be more than one RIS being discovered by the UE 506 and reported back to the BS 502. Furthermore, while a downlink measurement process is shown involving the BS sending a RS for the UE to measure and report feedback, it should be understood that an UL measurement process could be performed in which the UE is configured and scheduled to transmit a RS that the BS can measure and determine CQI or CSI.

Messages 550 and 555 are optional messages that may be used to activate the RIS-assisted connection and UE configuration. Message 550 may be sent by the BS 502 to the RIS 504 to activate the RIS 504 for a short term duration. When activating or deactivating the RIS or RIS-UE link on a dynamic basis, this may be considered a short-term activation or short-term deactivation. Message 555 may be sent by the BS 502 to the UE 506 to activate the UE 506 for a short term duration.

Message 560 is sent by the BS 502 to the RIS 504 that provides pattern information to the RIS 504 to be able to reflect a signal to the UE 506. At step 565, the RIS 504 selects an RIS pattern from a group of RIS patterns stored at the RIS 504, so that the RIS 504 can reflect a signal to the appropriate UE, in this case UE 506.

Message 570 is sent by the BS 502 to the UE 506 that includes physical layer control information that is used to identify a scheduled data transmission to the UE 506. Message 550 is sent on a direct link between the BS 502 and the UE 506. Data 575 is data that occurs between the UE 506 and the BS 502 in either UL or DL directions that is reflected off the RIS 504.

Message 580 is an example of UL physical layer control information sent by the UE 506 to the BS 502 over a direct link between the BS and UE, without using a RIS to reflect the signal.

The steps shown in FIG. 5 allow the RIS-UE links to be detected, setup, activated and data sent over the RIS assisted connection. While the flow signaling diagram 500 shows a complete series of steps that may be used for the RIS-UE link to be detected, setup, and activated, data sent over the RIS assisted connection and the RIS assisted connection to be disconnected, it should be understood that individual steps, or combinations of steps, may be considered independently from the entire method.

In some embodiments, the RIS is used for data reflection and the RIS is capable of CSI/CQI acquisition through RS transmission/reception as will be described below with reference to FIG. 6.

In terms of the RIS being able to aid in performing channel measurement, in some embodiments, the RIS can measure CSI-RS that has been transmitted by the BS and measure SRS that has been transmitted by the UEs. The measurement may be made by the RIS using detection elements that are part of the RIS panel that can receive and detect a signal, as opposed to only reflecting the signal impinging the surface.

In some embodiments, the RIS can transmit a reference signal, such as some form of CSI-RS, and the CSI-RS is measured by the BS for channel measurement of the BS-RIS link or measured by the UE for channel measurement of the RIS-UE link. If the RIS is going to be transmitting a reference signal to be measured by the BS or UE, this assumes that the RIS has at least some transmission elements that are part of the RIS panel that can transmit a signal, as opposed to only reflecting the signal impinging the surface.

In some embodiments, the RIS shares CSI with the BS and then the BS instructs the RIS with the RIS pattern to be used to configure the elements of the RIS panel. The RIS does not need to generate the RIS pattern, it simply uses the provided configuration information to configure the RIS pattern.

In some embodiments, the RIS pattern configured on the RIS panel can be implicitly provided to the RIS in the form of CSI and scheduling information provided by the network.

Since the RIS is not configured to perform channel measurement, the BS can transmit CSI-RS to the UE or the UE can transmit SRS to the BS. The receiving device (UE or BS, respectively) can then measure the reference signal to perform the channel measurement. In some embodiments, the RIS can redirect or modulate the measurement CSI-RS or SRS, for example by performing beam sweeping. In this case, a series of RIS patterns capable of reflecting the signal to/from multiple directions are used, each for a different instance of the RS. For example, in DL, CSI-RS is sent by the BS for K different copies and using K different patterns each copy is reflected towards a different direction. This can be used to ensure users located in different directions are able to measure the CSI-RS. In UL, using beam sweeping, and K different RIS patterns, SRS from different users are reflected to the BS.

In some embodiments, there is a direct BS-UE link for control channel information exchange between the BS and UE for example link 466 in FIG. 4B. This direct link provides an independent beam direction as compared to the data reflection communication link via the RIS. Control channels for both UL/DL can use the direct link.

Figure 6:
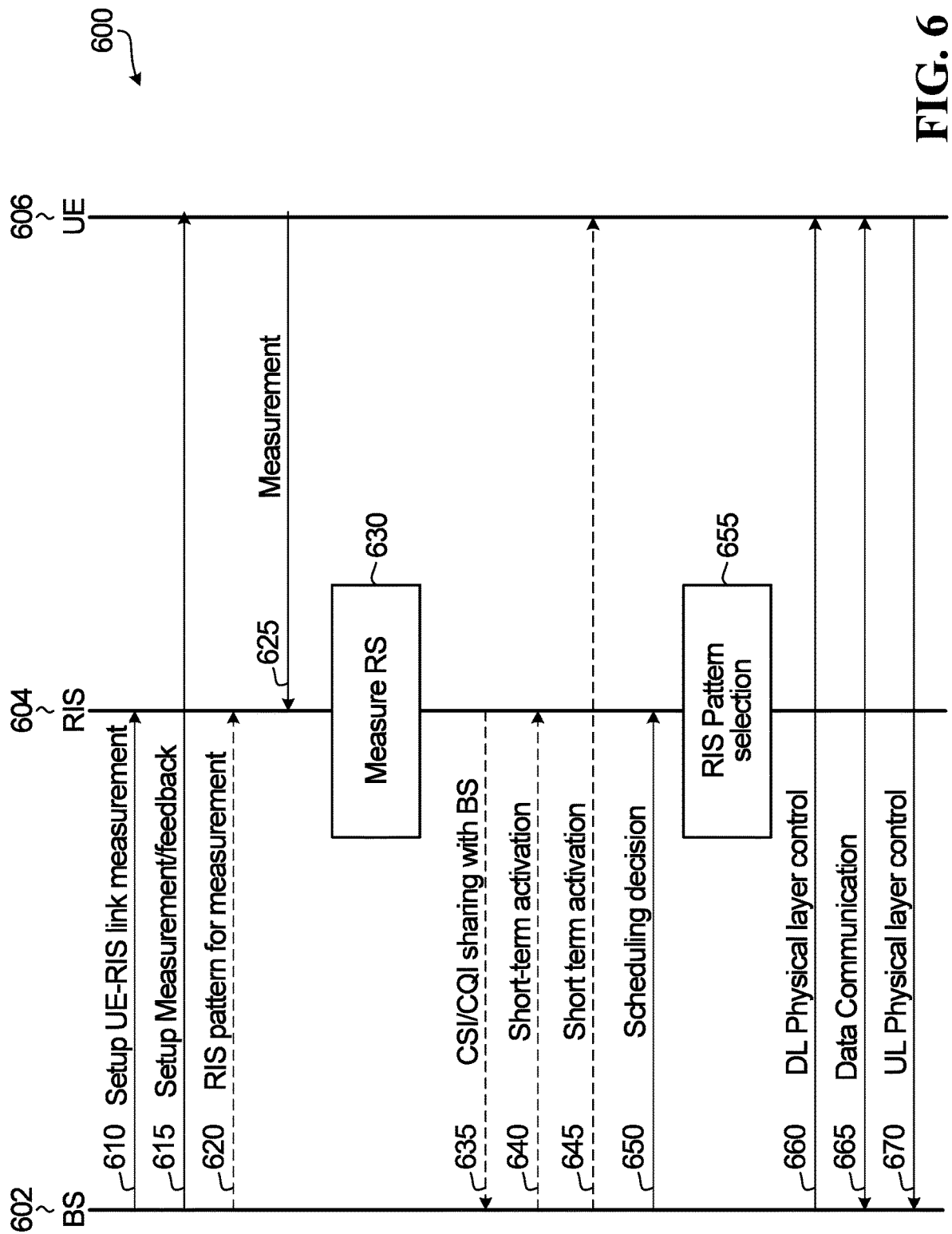
FIG. 6 is a flow diagram illustrating signaling between a BS, a RIS and a UE for RIS and UE configuration and data transmission between the BS and UE wherein the RIS is used for data reflection and the RIS has a transceiver for transmitting and receiving a RS signal according to an aspect of the application.

FIG. 6 is a signal flow diagram 600 that shows an example signaling diagram for signaling between a BS 602, a RIS 604, and a UE 606 where the RIS 604 is controlled by the BS 602. The signal flow diagram 600 incorporates some of the above described functionalities. The signal flow diagram 600 shows signaling that may occur subsequent to RIS discovery and BS-RIS links being identified and set up.

Signaling lines 615 and 645 indicate higher layer configuration information sent from the BS 602 to the UE 606 that may be sent by direct link, which may or may not be reflected by the RIS.

Signaling line 625 indicates a reference signal sent from the UE 606 to the RIS 604, which the RIS 604 can detect and measure.

Signaling lines 610, 620, 635, 640, and 650 indicate signaling commands from the BS 602 to the RIS 604. These commands can be transmitted over-the-air or through a wired connection. If they occur over-the-air then the RIS 604 is assumed to have a transceiver or sensor for receiving from the BS 602 and UE 605 and transmitting to the BS 602 or UE 606. In some embodiments, the commands may use a standardized mechanism designed for RIS control. In some embodiments, the commands may use new or existing mechanisms such as RRC or Xn.

Signaling line 665 show the signals that are reflected by the RIS 604 between the BS 602 and the UE 606.

Signaling lines 660 and 670 show uplink physical layer control signaling feedback information on a direct link that is not reflected by the RIS 604. However, in some embodiments, the uplink physical layer control signaling could be reflected by the RIS 604.

The BS 602 sends a message 610 to the RIS 604 that provides configuration information for setting up the UE-RIS link. This configuration information may include information that identifies UEs that send those RS that are in proximity of the RIS 604 that the RIS 604 may need to measure their RS and reflect their signaling in the direction thereof, for example the identification of UE 606.

The BS 602 sends a message 615 to the UE 606 that provides configuration information for setting up channel measurement. This message may include information that enables the UE 606 to know at least one of what type of RS may be received and when, that the RS is associate with which RIS, in this case the RIS 604, the RS sequence, RS time/frequency patterns, RS timing and corresponding port and beam direction, such as quasi-colocation (QCL) information. The configuration does not need to identify that the RIS is in the link between the BS and the US. The configuration may also include feedback configuration information that enables how feedback could be provided to the BS, i.e. the time/frequency resource that could be used for sending the feedback, a scrambling sequence for feedback information, and the type of information to be sent as feedback information.

Message 620 is an optional message that is sent by the BS 602 to the RIS 604 that provides pattern information for channel measurement to the RIS 604. This message may be information specific to the RIS 604 to set the pattern without having to generate the pattern or it may be general information that identifies location information for the UE 606 to allow the RIS 604 to generate the RIS pattern itself. In some embodiments, this configuration information may include information for multiple RIS patterns.

Message 625 is a RS that is sent by the UE 606 to the RIS 604 to be measured by the RIS 604. At the 630, the RIS 604 measures the RS sent by the UE 606.

Following measurement of the RS, the RIS 604 sends 635 channel state information (CSI) or channel quality information (CQI) resulting from the measurement to the BS 602. The information provided in message 635 may be used by the BS 602 to determine a RIS pattern that the RIS 604 should use for data reflection.

Messages 640 and 645 are optional messages that may be used to activate the RIS-assisted connection and UE configuration. Message 640 may be sent by the BS 602 to the RIS 604 to activate the RIS 604 for a short term duration. Message 645 may be sent by the BS 602 to the UE 606 to activate the UE 606 for a short term duration.

Message 650 is sent by the BS 602 to the RIS 604 that provides scheduling information to the RIS 604 regarding when the RIS should configure the RIS pattern to reference a signal to a desired UE, in this case UE 606. At step 655 the RIS 604 selects an RIS pattern from a group of RIS patterns that are stored or received at the RIS, based at least on part on the scheduling information from message 650, so that the RIS 604 can reflect a signal to the appropriate UE, in this case UE 606.

Message 660 is sent by the BS 602 to the UE 606 that includes physical layer control information that is used to identify a scheduled data transmission to the UE 606. Message 660 is sent on a direct link between the BS 602 and the UE 606. Data 665 is data that occurs between the UE 606 and the BS 602 in either UL or DL directions that is reflected off the RIS 604.

Message 670 is an example of UL physical layer control information sent by the UE 606 to the BS 602 over a direct link.

The steps shown in FIG. 6 allow the RIS-UE links to be detected, setup, activated and data sent over the RIS assisted connection. While the flow signaling diagram 600 shows a complete series of steps that may be used for the RIS-UE link to be detected, setup, and activated, data sent over the RIS assisted connection and the RIS assisted connection to be disconnected, it should be understood that individual steps, or combinations of steps, may be considered independently from the entire method.

While SRS based measurement by the RIS is shown in FIG. 6, it is to be understood that if the RIS has transmitter element and can transmit a RS, the RS transmits the RS, the UE measures the RS and provided a channel measurement feedback message to the BS.

In some embodiments, the RIS is used for data reflection and the RIS is only capable of configuring a RIS pattern configured by the network, either explicitly or implicitly configured.

In some embodiments, the RIS pattern configured on the RIS panel is explicitly provided configured so that the RIS does not generate the RIS pattern, it simply uses the provided configuration information to configure the RIS pattern.

In some embodiments, the RIS pattern configured on the RIS panel is implicitly provided to the RIS in the form of CSI and scheduling information provided by the network.

Since the RIS is not configured to perform channel measurement, the BS can transmit CSI-RS to the UE or the UE can transmit SRS to the BS. The receiving device (UE or BS, respectively) can then measure the reference signal to perform the channel measurement. In some embodiments, the RIS can redirect or modulate the CSI-RS or SRS being used for channel measurement, for example by performing beam sweeping. In this case, a series of RIS patterns capable of reflecting the signal to/from multiple directions are used, each for a different instance of the RS. For example, in DL, CSI-RS is sent by the BS for K different copies and using K different patterns each copy is reflected towards a different direction. This can be used to ensure users located in different directions are able to measure the CSI-RS. In UL, using beam sweeping, and K different RIS patterns, SRS from different users are reflected to the BS.

In some embodiments, there is a control channel information exchange between the BS and UE via the RIS by the RIS reflecting signaling based on an appropriately configured RIS pattern at the scheduled time.

When the control channel occurs over the RIS assisted link between the BS and UE, for a RIS that is capable of being reconfigured slowly (less frequently than the scheduling time) the RIS can support a single UE-RIS link. The RIS is assigned to a single UE, or a group of UEs generally along a same path that can be served by signal reflect be a same RIS pattern, for longer than scheduling timing (e.g. TTI). The RIS reflects UL and DL control signaling with the same pattern as DL/UL data.

When the control channel occurs over the RIS assisted link between the BS and UE, for a RIS that is capable of being reconfigured faster than the scheduling time, the RIS can support multiple UE-RIS links that can be updated in coordination with the scheduled UEs.

In some embodiments, for a fast RIS, the control channel can be reflected by the RIS in the form of a wide beam reflection while the data to the respective UEs can be reflected using narrow beams using time divisional multiplexing (TDM) scheduling of the narrow beams.

In some embodiments, for a fast RIS, TDM scheduling can be used for control channel opportunities of the links using narrow beams similar to those used for data reflection. In such embodiments, each user has a portion of time for DL/UL control channel signaling.

In some embodiments, for a fast RIS, TDM scheduled control channel signaling can use beam sweeping. For example, for DL, the RIS reflects control channel in the direction of all the UEs as the beam is swept across a range of directions that include the UEs. For UL, the UE may perform multiple transmissions of control channel signaling at scheduled times and the RIS beam sweeps across a range of directions that include the UEs.

In some embodiments, the RIS panel is capable of detecting RIS-reflected control signaling in both directions. In such embodiments the RIS has direct access to DL and/or UL control channel signaling. As a result, it may not be necessary for the RIS to share CSI information with the RIS as the RIS has access to the information. This may reduce signaling overhead as this information does not need to be signaled to the RIS.

Figure 7:
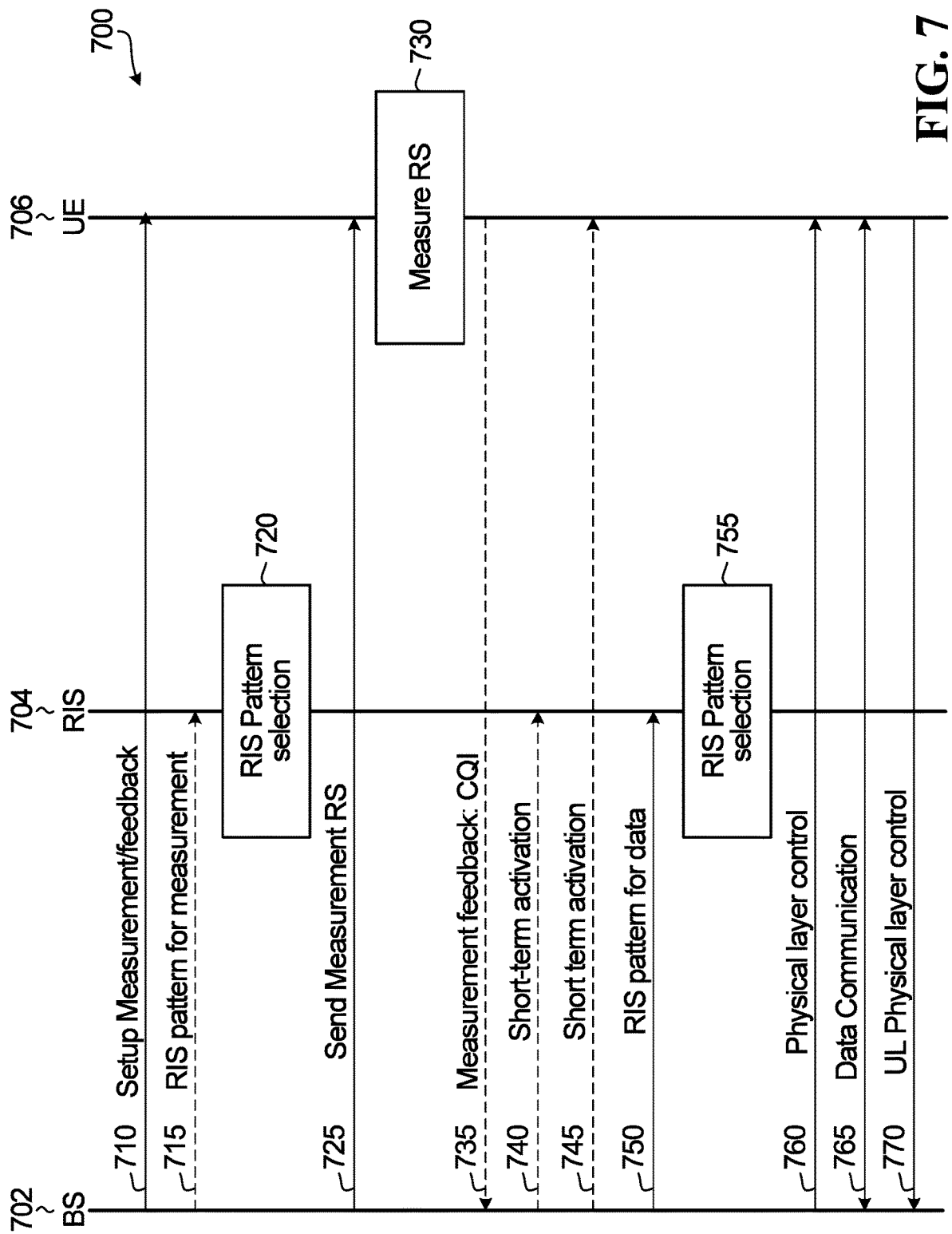
FIG. 7 is a flow diagram illustrating signaling between a BS, a RIS and a UE for RIS and UE configuration and data transmission between the BS and UE wherein the RIS is used for data and control signaling reflection according to an aspect of the application.

FIG. 7 is a signal flow diagram 700 that shows an example signaling diagram for signaling between a BS 702, a RIS 704, and a UE 706 where the RIS 704 is controlled by the BS 702. The signal flow diagram 700 incorporates some of the above described functionalities. The signal flow diagram 700 shows signaling that may occur subsequent to RIS discovery and BS-RIS links being identified and set up.

Signaling lines 710 and 745 indicate higher layer configuration information sent from the BS 502 to the UE 506 that may be sent by direct link, not reflected by the RIS, or through a link reflected by a RIS panel.

Signaling lines 715, 740, and 750 indicate signaling commands from the BS 702 to the RIS 704. These commands can be transmitted over-the-air or through a wired connection. If they occur over-the-air then the RIS 704 are assumed to have a transceiver or sensor for receiving from the BS 702 or UE 706 and for transmitting to the BS 702 or UE 706. In some embodiments, the commands may use a standardized mechanism designed for RIS control. In some embodiments, the commands may use new or existing mechanisms such as RRC or Xn.

Signaling lines 725, 735, 760, 765, and 770 show the signals that are reflected by the RIS 704 between the BS 702 and the UE 706.

The BS 702 sends a message 710 to the UE 706 that provides configuration information for setting up channel measurement. This message may include information that enables the UE to know at least one of what type of RS may be received and when, that the RS is associate with which RIS, in this case the RIS 704, the RS sequence, RS time/frequency patterns, RS timing and corresponding port and beam direction, such as QCL information. The configuration does not need to identify that the RIS is in the link between the BS and the US. The configuration may also include feedback configuration information that enables how feedback could be provided to the BS, i.e. the time/frequency resource that could be used for sending the feedback, a scrambling sequence for feedback information, and the type of information to be sent as feedback information.

Message 715 is an optional message that may be sent by the BS 702 to the RIS 704 that provides RIS pattern information to the RIS 704 to be able to reflect a signal to the UE 706. This message may be information specific to the RIS 704 to set the RIS pattern without having to generate the RIS pattern or it may be general information that identifies location information for the UE 706 to allow the RIS 704 to generate the RIS pattern itself.

At step 720, the RIS 704 selects an RIS pattern from a group of RIS patterns stored at the RIS 704, so that the RIS 704 can reflect a signal to the appropriate UE, in this case UE 706.

Message 725 is a reference signal sent by the BS 702 to the UE 706, which is reflected by the RIS 704 that is using the selected RIS pattern. At the 730, the UE 706 measures the RS redirected from the RIS 704.

Following measurement of the RS, message 735 is an optional message in which the UE 706 sends 735 channel state information (CSI) or channel quality information (CQI) to the BS 702. The information provided in message 735 may be used by the BS 702 to determine a RIS pattern that the RIS 704 should use for data reflection. Message 735 is sent by the UE 706 and is reflected by the RIS 704 to the BS 702. While one RIS 704 is shown, it is to be understood that there could be more than one RIS being discovered by the UE 706 and reported back to the BS 702. Furthermore, while a downlink measurement process is shown involving the BS sending a RS for the UE to measure and report feedback, it should be understood that an UL measurement process could be performed in which the UE is configured and scheduled to transmit a RS that the BS can measure and determine CQI or CSI.

Messages 740 and 745 are optional messages that may be used to activate the RIS-assisted connection and UE configuration. Message 740 may be sent by the BS 702 to the RIS 704 to activate the RIS 704 for a short term duration.

Message 745 may be sent by the BS 702 to the UE 706 to activate the UE 706 for a short term duration.

Message 750 is sent by the BS 502 to the RIS 504 that provides RIS pattern information to the RIS 504 to be able to reflect a signal to the UE 506. At step 755, the RIS 704 selects an RIS pattern from a group of RIS patterns stored at the RIS, so that the RIS 704 can reflect a signal to the appropriate UE, in this case UE 706.

Message 760 is sent by the BS 702 to the UE 706 that includes physical layer control information that is used to identify a scheduled data transmission to the UE 706. Message 760 is sent by the BS 702 and is reflected by the RIS 704 to the UE 706. Data 765 is data that occurs between the UE 706 and the BS 702 in either UL or DL directions that is reflected by the RIS 704.

Message 770 is an example of UL physical layer control information sent by the UE 706 to the BS 702 that is reflected by the RIS 704.

The steps shown in FIG. 7 allow the RIS-UE links to be detected, setup, activated and data sent over the RIS assisted connection. While the flow signaling diagram 700 shows a complete series of steps that may be used for the RIS-UE link to be detected, setup, and activated, data sent over the RIS assisted connection and the RIS assisted connection to be disconnected, it should be understood that individual steps, or combinations of steps, may be considered independently from the entire method.

Figure 8:
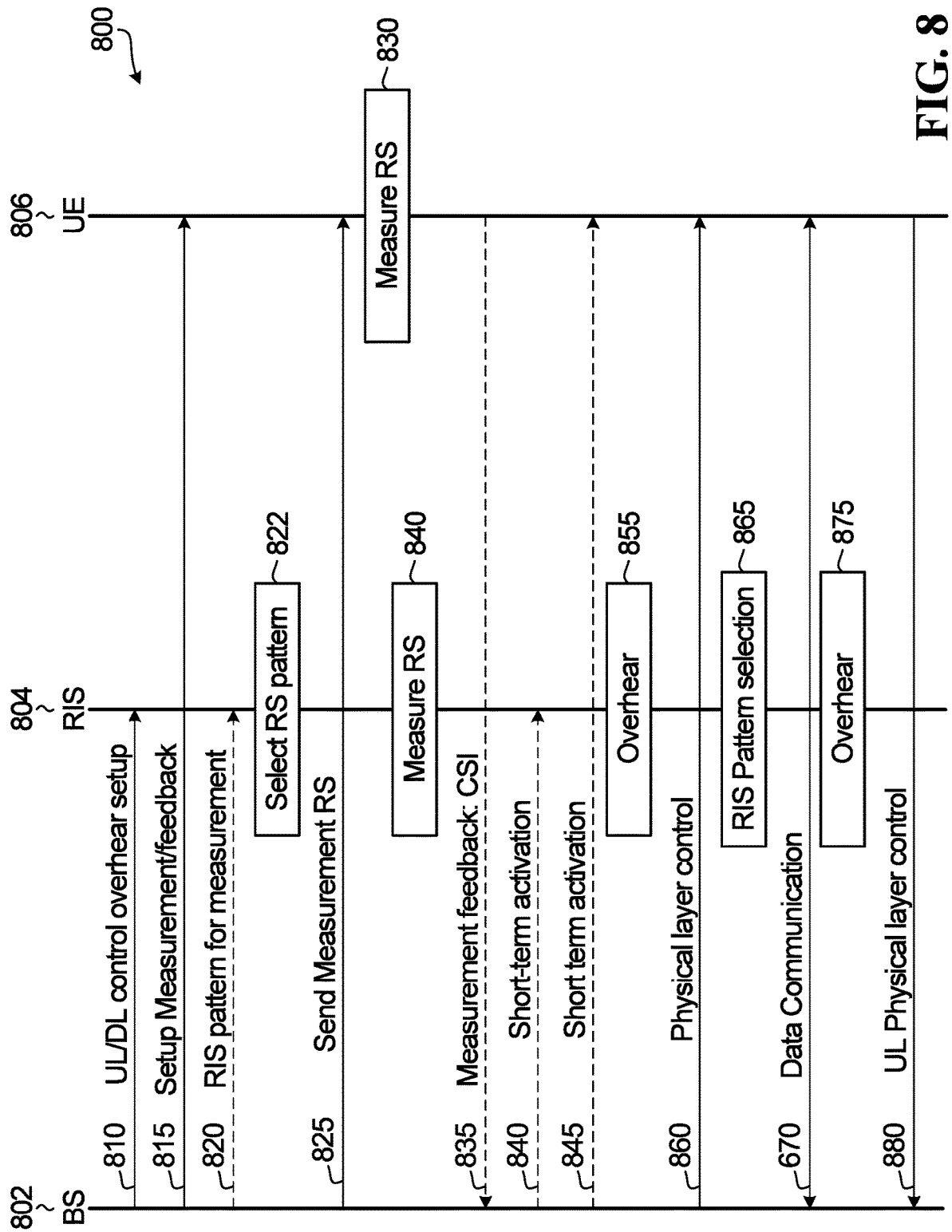
FIG. 8 is a flow diagram illustrating signaling between a BS, a RIS and a UE for RIS and UE configuration and data transmission between the BS and UE wherein the RIS is used for data and control signaling reflection and the RIS can detect a signal it is reflecting according to an aspect of the application.

FIG. 8 is a signal flow diagram 800 that shows an example signaling diagram for signaling between a BS 802, a RIS 804, and a UE 806 where the RIS 804 is controlled by the BS 702. The signal flow diagram 800 incorporates some of the above described functionalities. The signal flow diagram 800 shows signaling that may occur subsequent to RIS discovery and BS-RIS links being identified and set up.

Signaling lines 815 and 850 indicate higher layer configuration information sent from the BS 802 to the UE 806 that may be sent by direct link, not reflected by the RIS or through a link reflected by a RIS.

Signaling lines 810, 820 and 845 indicate signaling commands from the BS 802 to the RIS 804. These commands can be transmitted over-the-air or through a wired connection. If they occur over-the-air then the RIS 804 are assumed to have a transceiver or sensor for receiving from the BS 802 and reflecting on the configurable elements for transmitting to the BS 802. In some embodiments, the commands may use a standardized mechanism designed for RIS control. In some embodiments, the commands may use new or existing mechanisms such as RRC or Xn.

Signaling lines 825, 835, 860, 870, and 880 show the signals that are reflected by RIS 804 between the BS 802 and the UE 806.

The BS 802 sends a message 810 to the RIS 804 that provides configuration information for setting up the RIS to detect RIS-reflected control signaling from either the BS 802 or UE 806. This is referred to as "overhear" in FIG. 8, as the RIS is detecting a signal that is not necessarily intended for the RIS. This message may include information that enables the RIS to know what type of RS may be transmitted by the BS or by the UE as part of the channel measurement process, and when the RS may be transmitted.

The BS 802 sends a message 815 to the UE 806 that provides configuration information for setting up channel measurement. This message may include information that enables the UE to know at least one of what type of RS may be received and when, that the RS is associate with which RIS, in this case the RIS 804, the RS sequence, RS time/frequency patterns, RS timing and corresponding port and beam direction, such as QCL information. The configuration does not need to identify that the RIS is in the link between the BS and the US. The configuration may also include feedback configuration information that enables how feedback could be provided to the BS, i.e. the time/frequency resource that could be used for sending the feedback, the scrambling sequence for feedback information, and the type of information to be sent as feedback information.

Message 820 is an optional message that may be sent by the BS 802 to the RIS 804 that provides RIS pattern information to the RIS 804 to be able to reflect a signal to the UE 806. This message may be information specific to the RIS 804 to set the RIS pattern without having to generate the RIS pattern or it may be general information that identifies location information for the UE 806 to allow the RIS 804 to generate the RIS pattern itself.

At step 822 the RIS 804 selects an RIS pattern from a group of RIS patterns stored at the RIS 804, so that the RIS 804 can reflect a signal to the appropriate UE 806.

Message 825 is a reference signal sent by the BS 802 to the UE 806, which is reflected by the RIS 804 that is using the selected RIS pattern. At the 830, the UE 806 measures the RS redirected from the RIS 804.

Following measurement of the RS, message 835 is an optional message in which the UE 806 sends 835 channel state information (CSI) or channel quality information (CQI) to the BS 802. The information provided in message 835 may be used by the BS 802 to determine a RIS pattern that the RIS 804 should use for data reflection. Message 835 is sent by the UE 806 and is reflected by the RIS 804 to the BS 802. As the RIS 804 was configured for setting up the RIS to detect RIS-reflected control signaling with message 810, the RIS is able to detect 840 the CSI or CQI sent by the UE 806, while also reflecting the CSI or CQI to the BS 802.

While one RIS 804 is shown, it is to be understood that there could be more than one RIS being discovered by the UE 806 and reported back to the BS 802. Furthermore, while a downlink measurement process is shown involving the BS sending a RS for the UE to measure and report feedback and the RIS detecting that as well as reflecting the feedback message, it should be understood that an UL measurement process could be performed in which the UE is configured and scheduled to transmit a RS that both the BS and the RIS can measure and determine CQI or CSI.

Messages 845 and 850 are optional messages that may be used to activate the RIS-assisted connection and UE configuration. Message 850 may be sent by the BS 802 to the RIS 804 to activate the RIS 804 for a short term duration. Message 860 may be sent by the BS 702 to the UE 806 to activate the UE 806 for a short term duration.

Message 860 is sent by the BS 802 to the UE 806 that includes physical layer control information that is used to identify a scheduled data transmission to the UE 806. Message 860 is sent by the BS 802 and is reflected by the RIS 804 to the UE 806. As the RIS 804 was configured for setting up the RIS to detect RIS-reflected control signaling with message 810, the RIS is able to detect 855 the physical layer control information sent by the BS 802, while also reflecting the physical layer control information to the UE 806.

At step 865, the RIS 804 selects an RIS pattern from a group of RIS patterns stored at the RIS 804, so that the RIS 804 can reflect a signal to the appropriate UE, in this case UE 806. This selection may be based at least in part on CSI or CQI feedback detected by the RIS 804 at step 840 and/or physical layer control signaling detected by the RIS 804 at step 855.

Data 870 is data that occurs between the UE 806 and the BS 802 in either UL or DL directions that is reflected by the RIS 804.

Message 880 is an example of UL physical layer control information sent by the UE 806 to the BS 802 that is reflected by the RIS 804. As the RIS 804 was configured for setting up the RIS to detect RIS-reflected control signaling with message 810, the RIS is able to detect 875 the UL physical layer control information sent by the UE 806, while also reflecting the physical layer control information to the BS 802. In some embodiments, RIS can optimize a RIS beam pattern to be used to reflect a signal in the direction of the BS or UE by the CSI and/or scheduling information detected by the RIS that the RIS is reflecting to the BS or UE.

The steps shown in FIG. 8 allow the RIS-UE links to be detected, setup, activated and data sent over the RIS assisted connection. While the flow signaling diagram 800 shows a complete series of steps that may be used for the RIS-UE link to be detected, setup, and activated, data sent over the RIS assisted connection and the RIS assisted connection to be disconnected, it should be understood that individual steps, or combinations of steps, may be considered independently from the entire method.

As shown in FIG. 8, the RIS can detect UL or DL control channel information.

In some embodiments, the RIS is used for data reflection and the RIS is capable of CSI/CQI acquisition through RS transmission/reception.

In terms of the RIS being able to aid in performing channel measurement, in some embodiments, the RIS can measure CSI-RS that has been transmitted by the BS and measure SRS that has been transmitted by the UEs. The measurement may be made by the RIS using detection elements that are part of the RIS panel that can receive and detect a signal, as opposed to only reflecting the signal impinging the surface.

In some embodiments, the RIS can transmit a reference signal, such as some form of CSI-RS, and the CSI-RS is measured by the BS for channel measurement of the BS-RIS link or measured by the UE for channel measurement of the RIS-UE link. If the RIS is going to be transmitting a reference signal to be measured by the BS or UE, this assumes that the RIS has at least some transmission elements that are part of the RIS panel that can transmit a signal, as opposed to only reflecting the signal impinging the surface.

In some embodiments, the RIS shares CSI with the BS and then the BS instructs the RIS with the RIS pattern to be configured by the RIS panel. The RIS does not need to generate the RIS pattern, it simply uses the provided configuration information to configure the RIS pattern.

In some embodiments, the RIS pattern configured on the RIS panel can be implicitly provided to the RIS in the form of CSI and scheduling information provided by the network or CSI and scheduling information that may have been detected by the RIS while reflecting that same CSI and scheduling information.

In some embodiments, there is a control channel information exchange between the BS and UE via the RIS by the RIS reflecting signaling based on an appropriately configured RIS pattern at the scheduled time.

Figure 9:
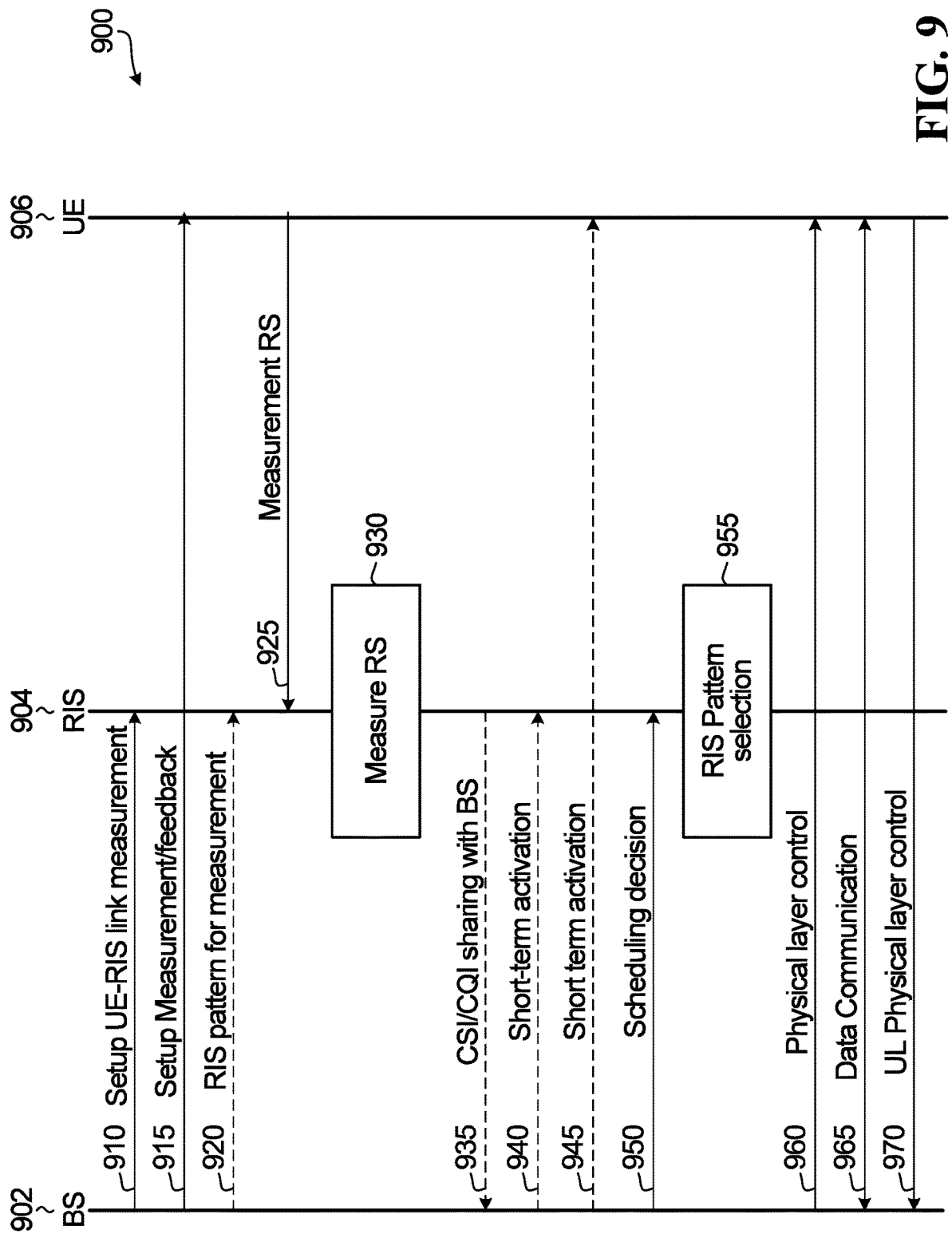
FIG. 9 is a flow diagram illustrating signaling between a BS, a RIS and a UE for RIS and UE configuration and data transmission between the BS and UE wherein the RIS is used for data and control signaling reflection and the RIS has a transceiver for transmitting and receiving a RS signal according to an aspect of the application.

FIG. 9 is a signal flow diagram 900 that shows an example signaling diagram for signaling between a BS 902, a RIS 904, and a UE 906 where the RIS 904 is controlled by the BS 902. The signal flow diagram 900 incorporates some of the above described functionalities. The signal flow diagram 900 shows signaling that may occur subsequent to RIS discovery and BS-RIS links being identified and set up.

Signaling lines 915 and 945 indicate higher layer configuration information sent from the BS 902 to the UE 906 that may be sent by direct link, not reflected by the RIS or reflected by a RIS panel.

Signaling line 925 indicates a reference signal sent from the UE 906 to the RIS 904, which the RIS 904 can measure.

Signaling lines 910, 920, 935, 940 and 950 indicate signaling commands from the BS 902 to the RIS 904. These commands can be transmitted over-the-air or through a wired connection. If they occur over-the-air then the RIS 904 are assumed to have a transceiver or sensor for receiving from the BS 902 and reflecting on the configurable elements for transmitting to the BS 902. In some embodiments, the commands may use a standardized mechanism designed for RIS control. In some embodiments, the commands may use new or existing mechanisms such as RRC or Xn.

Signaling lines 960, 965, and 970 show the signals that are reflected by RIS 904 between the BS 902 and the UE 906.

The BS 902 sends a message 910 to the RIS 904 that provides configuration information for setting up the RIS to detect, or "overhear", RIS-reflected control signaling from either the BS 802 or UE 806. This message may include information that enables the RIS to know what type of reference signal (RS) may be transmitted by the BS or UE as part of the channel. measurement process and when, the RS sequence, RS time/frequency patterns, and RS timing. This configuration information may also include information that identifies UEs that send the RS that are in proximity of the RIS 904 that the RIS 904 may need to measure their RS and reflect their signaling in the direction thereof, for example the identification of UE 906

The BS 902 sends a message 915 to the UE 906 that provides configuration information for setting up channel measurement. This message may include information that enables the UE 906 to know at least one of what type of RS may be received and when, that the RS is associate with which RIS, in this case the RIS 904, the RS sequence, RS time/frequency patterns, RS timing and corresponding port and beam direction, such as QCL information. The configuration does not need to identify that the RIS is in the link between the BS and the US. The configuration may also include feedback configuration information that enables how feedback could be provided to the BS, i.e. the time/frequency resource that could be used for sending the feedback, the scrambling sequence for feedback information, and the type of information to be sent as feedback information.

Message 920 is an optional message that may be sent by the BS 902 to the RIS 904 that provides pattern information for channel measurement to the RIS 904. This message may be information specific to the RIS 904 to set the RIS pattern without having to generate the pattern or it may be general information that identifies location information for the UE 906 to allow the RIS 904 to generate the RIS pattern itself. In some embodiments, this configuration information may include information for multiple RIS patterns.

Message 925 is a RS that is sent by the UE 906 to the RIS 904 to be measured by the RIS 904. At the 930, the RIS 904 measures the RS sent by the UE 906. While the UE 906 is shown transmitting the RS and the RIS 904 measuring the RS, the RS could be transmitted by the RIS, if RIS has transmitter elements, to perform channel measurement for the UE-RIS link.

Following measurement of the RS, the RIS 904 sends 935 channel state information (CSI) or channel quality information (CQI) based on the channel measurement performed at 930 to the BS 902. The information provided in message 935 may be used by the BS 902 to determine a RIS pattern that the RIS 904 should use for data reflection.

Messages 940 and 945 are an optional pair of messages that may be used to activate the RIS-assisted connection and UE configuration. Message 940 may be sent by the BS 902 to the RIS 904 to activate the RIS 904 for a short term duration. Message 945 may be sent by the BS 902 to the UE 906 to activate the UE 906 for a short term duration.

Message 950 is sent by the BS 902 to the RIS 904 that provides scheduling information to the RIS 904. At step 955 the RIS 904 selects an RIS pattern from a groups of RIS patterns stored at the RIS, based at least on part on the scheduling information from message 950, so that the RIS 904 can reflect a signal to the appropriate UE 906.

Message 960 is sent by the BS 902 to the UE 906 that includes physical layer control information that is used to identify a scheduled data transmission to the UE 906. Message 960 is sent between the BS 902 and the UE 906 as reflected off the RIS 904. Data 965 is data that occurs between the UE 906 and the BS 902 in either UL or DL directions that is reflected off the RIS 904.

Message 980 is an example of UL physical layer control information sent by the UE 906 to the BS 902 that is reflected off the RIS 904.

The steps shown in FIG. 9 allow the RIS-UE links to be detected, setup, activated and data sent over the RIS assisted connection. While the flow signaling diagram 900 shows a complete series of steps that may be used for the RIS-UE link to be detected, setup, and activated, data sent over the RIS assisted connection and the RIS assisted connection to be disconnected, it should be understood that individual steps, or combinations of steps, may be considered independently from the entire method.

In some embodiments, the RIS is used for data reflection and the RIS is capable of CSI/CQI acquisition through RS transmission/reception and RIS pattern selection. In some embodiments, the RIS is capable of control and/or data signaling with the UE. The control and/or data signaling between the RIS and the UE can be in-band, out-of-band, or other RATs. In some embodiments, the control and/or data signaling between the RIS and the UE can be network initiated and/or network assisted.

In terms of the RIS being able to aid in performing channel measurement, in some embodiments, the RIS can measure CSI-RS that has been transmitted by the BS and measure SRS that has been transmitted by the UEs. The measurement may be made by the RIS using detection elements that are part of the RIS panel that can receive and detect a signal, as opposed to only reflecting the signal impinging the surface.

In some embodiments, the RIS can transmit a reference signal, such as some form of CSI-RS, and the CSI-RS is measured by the BS for channel measurement of the BS-RIS link or measured by the UE for channel measurement of the RIS-UE link. If the RIS is going to be transmitting a reference signal to be measured by the BS or UE, this assumes that the RIS has at least some transmission elements that are part of the RIS panel that can transmit a signal, as opposed to only reflecting the signal impinging the surface.

In some embodiments, the BS and the UE can transmit a reference signal, such as CSI-RS or SRS, respectively, and the reference signal is measured by the UE or BS for channel measurement of the BS-UE link. The BS then shares the result measurement information, such as CQI or CSI, with the RIS.

In some embodiments, the BS can transmit a reference signal, such as CSI-RS, and the reference signal is measured by the UE for channel measurement of the BS-UE link. The UE then shares the result measurement information, such as CQI or CSI, with the RIS.

In some embodiments, there is a control channel information exchange between the BS and UE via the RIS by the RIS reflecting signaling based on an appropriately configured RIS pattern at the scheduled time.

In some embodiments, the RIS can be used to relay control channel signaling as opposed to over a direct link between the BS and UE. For example, for DL, the RIS receives control channel information, either over-the-air or a wired connection, and relays the control channel information to the UE. For UL, the RIS receives control channel information over-the-air and relays the control channel information to the TRP, either over-the-air or a wired connection.

In some embodiments, CSI information pertaining to the RIS-UE link can be relayed to the BS.

Figure 10:
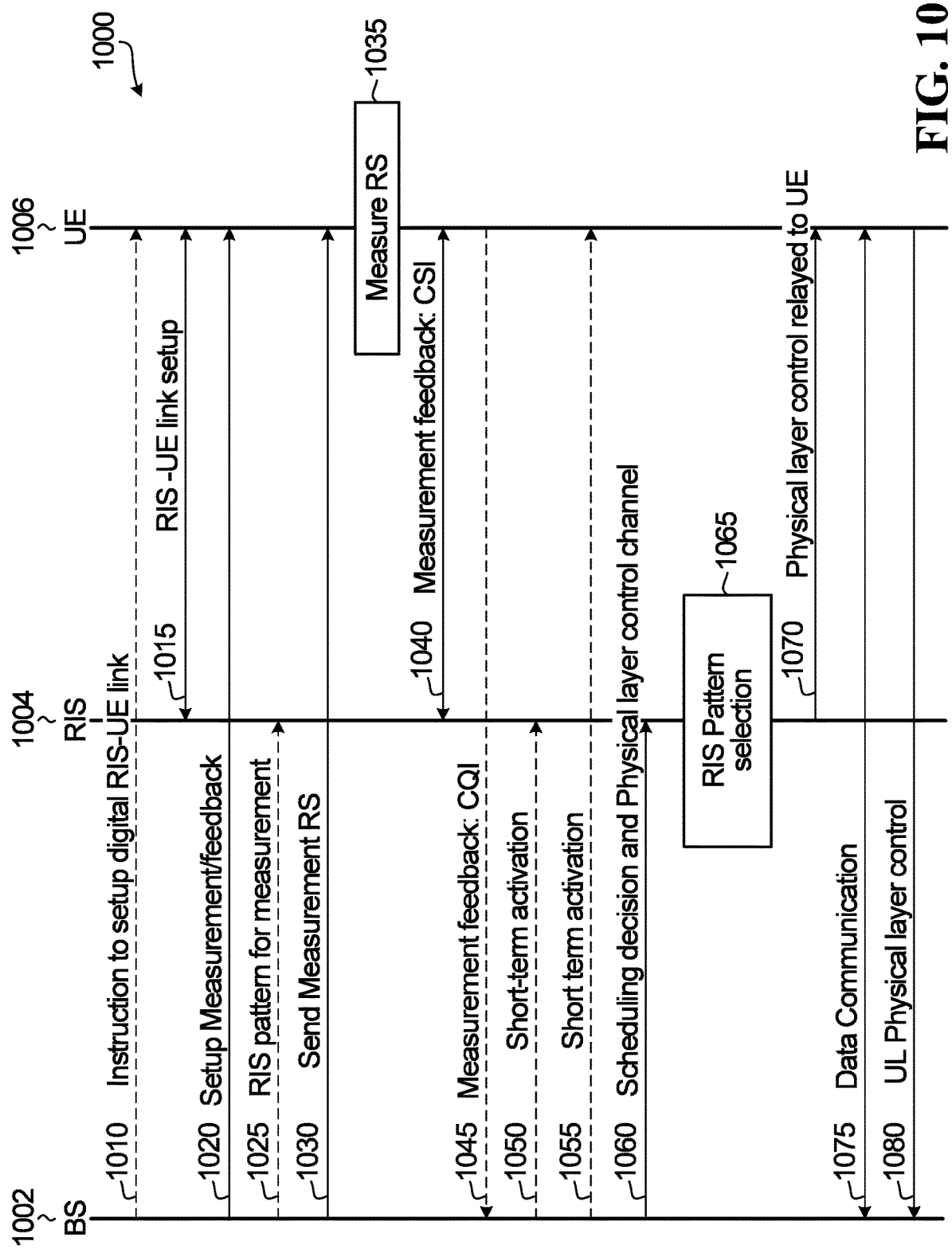
FIG. 10 is a flow diagram illustrating signaling between a BS, a RIS and a UE for RIS and UE configuration and data transmission between the BS and the UE wherein the RIS has a digital link with the UE over which a control channel occurs according to an aspect of the application.

FIG. 10 is a signal flow diagram 1000 that shows an example signaling diagram for signaling between a BS 1002, a RIS 1004, and a UE 1006 where the RIS 1004 is controlled by the BS 1002. The signal flow diagram 1000 incorporates some of the above described functionalities. The signal flow diagram 1000 shows signaling that may occur subsequent to RIS discovery and BS-RIS links being identified and set up.

Signaling lines 1010, 1020, and 1055 indicate higher layer configuration information sent from the BS 1002 to the UE 1006 that may be sent by direct link, not reflected by the RIS or reflected by a RIS panel.

Signaling lines 1015, 1040 and 1070 indicate control signaling sent between the UE 1006 and the RIS 1004 on the RIS-UE link. The RIS-UE link can be in the same frequency band as the data communication, a different frequency, or a different RAT. The UE-RIS link can utilize an existing mechanism such as dual connectivity (same or different cells) or sidelink or through a new communication mechanism suited to this purpose.

Signaling lines 1025, 1050 and 1060 indicate signaling commands from the BS 1002 to the RIS 1004. These commands can be transmitted over-the-air or through a wired connection. If they occur over-the-air then the RIS 1004 are assumed to have a transceiver or sensor for receiving from the BS 1002 and reflecting on the configurable elements for transmitting to the BS 1002. In some embodiments, the commands may use a standardized mechanism designed for RIS control. In some embodiments, the commands may use new or existing mechanisms such as RRC or Xn.

Signaling lines 1030, 1075 and 1080 show the signals that are reflected by RIS 1004 between the BS 1002 and the UE 1006.

Signaling line 1045 shows feedback information that is sent on a direct link uplink physical layer control signaling, not reflected by the RIS 1004. However, in some embodiments, the uplink physical layer control signaling could be reflected by the RIS 1004.

Message 1010 is an optional message that may be sent by the BS 1002 to the UE 1006 that provides configuration information for setting up the digital RIS-UE link. The digital RIS-UE link indicated here refers to low rate control signaling relayed by the RIS using a transceiver that is part of the RIS panel, as opposed to being reflected by configurable elements of the RIS. This configuration information may include information that identifies RISs in proximity of the UE 1006 that it may reflect information in the direction of the of the UE 1004, for example the identification of RIS 1004.

The UE 1006 sends a message 1015 that provides the RIS 1004 with configuration information for setting up the RIS-UE link. This configuration information may include information that identifies the UE.

The BS 1002 sends a message 1020 to the UE 1006 that provides configuration information for setting up channel measurement. This message may include information that enables the UE 1006 to know at least one of what type of RS may be received and when, that the RS is associate with which RIS, in this case the RIS 1004, the RS sequence, RS time/frequency patterns, RS timing and corresponding port and beam direction, such as QCL information. The configuration does not need to identify that the RIS is in the link between the BS and the US. The configuration may also include feedback configuration information that enables how feedback could be provided to the BS, i.e. the time/frequency resource that could be used for sending the feedback, the scrambling sequence for feedback information, and the type of information to be sent as feedback information.

Message 1025 is an optional message that may be sent by the BS 1002 to the RIS 1004 that provides pattern information to the RIS 1004 to be able to reflect a signal to the UE 1006. This message may be information specific to the RIS 1004 to set the pattern without having to generate the pattern or it may be general information that identifies location information for the UE 1006 to allow the RIS 1004 to generate the RIS pattern itself. In some embodiments, this configuration information may include information for multiple RIS patterns.

Message 1030 is a RS that is sent by the BS 1002 to the UE 1006 to be measured by the UE 1006. At the 1035, the UE 1006 measures the RS sent by the BS 1002.

Following measurement of the RS, the UE 1006 sends 1040 channel state information (CSI) or channel quality information (CQI) to the RIS 1004. The information provided in message 1045 may be used by the BS 1002 to determine a RIS pattern that the RIS 1004 should use for data reflection. The UE 1006 also sends 1045 channel state information (CSI) or channel quality information (CQI) to the BS 1002.

Messages 1050 and 1055 are optional messages that may be used to activate the RIS-assisted connection and UE configuration. Message 1050 may be sent by the BS 1002 to the RIS 1004 to activate the RIS 1004 for a short term duration. Message 1055 may be sent by the BS 1002 to the UE 1006 to activate the UE 1006 for a short term duration.

Message 1060 is sent by the BS 1002 to the RIS 1004 that provides scheduling information to the RIS 1004. At step 1065 the RIS 1004 selects an RIS pattern from a groups of RIS patterns stored at the RIS, based at least on part on the scheduling information from message 1060, so that the RIS 1004 can reflect a signal to the appropriate UE 1006.

Message 1070 is sent by the RIS 1004 to the UE 1006 that includes physical layer control information that is used to identify a scheduled data transmission to the UE 1006 that may in part be based on message 1060.

While a DL control channel relay is shown by signaling steps 1060 and 1070, it should be understood that a UL control channel and CSI relay is also possible.

Data 1075 is data that occurs between the UE 1006 and the BS 1002 in either UL or DL directions that is reflected off the RIS 1004.

Message 1080 is an example of UL physical layer control information sent by the UE 1006 to the BS 1002 that is reflected off the RIS 1004.

The steps shown in FIG. 10 allow the RIS-UE links to be detected, setup, activated and data sent over the RIS assisted connection. While the flow signaling diagram 1000 shows a complete series of steps that may be used for the RIS-UE link to be detected, setup, and activated, data sent over the RIS assisted connection and the RIS assisted connection to be disconnected, it should be understood that individual steps, or combinations of steps, may be considered independently from the entire method.

While SRS based channel measurement by the RIS is shown in FIG. 10, it is to be understood that if the RIS has transmitter element and can transmit a RS, the RS transmits the RS, the UE measures the RS and provided a channel measurement feedback message to the BS.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method comprising:
   transmitting channel measurement configuration information to a user equipment (UE), the channel measurement configuration information for configuring the UE to measure a channel between a base station (BS) and the UE for which a signal on the channel has been reflected by a reflective intelligent surface (RIS);
   transmitting physical layer configuration information for the UE, the physical layer configuration information for configuring the UE to receive data from the BS or transmit data to the BS that is reflected by the RIS; and transmitting data to the RIS or receiving data from the RIS.

2. The method of claim 1, further comprising receiving feedback information comprising channel measurement information pertaining to the channel on a link between the BS and UE via reflection by the RIS or the channel on a link between the RIS and UE.

3. The method of claim 1, further comprising at least one of:
  transmitting a message comprising an indication for activation of the RIS; or
  transmitting a message comprising an indication for activation of the UE.

4. The method of claim 1, further comprising: transmitting channel measurement configuration information to the RIS, the channel measurement configuration information for configuring the RIS to reflect a reference signal (RS) to the UE.

5. The method of claim 1, further comprising: transmitting the RS to the RIS to reflect to the UE for measurement.

6. The method of claim 1, further comprising: transmitting RIS panel configuration information to the RIS, the RIS panel configuration information for configuring the RIS to reflect data between the BS and the UE.

7. The method of claim 1, further comprising: transmitting scheduling configuration information to the RIS, the scheduling configuration information for scheduling the RIS to reflect data between the BS and the UE.

8. The method of claim 1, further comprising: transmitting configuration information to the RIS to enable the RIS to measure a channel measurement signal from the UE.

9. The method of claim 1, further comprising: transmitting configuration information to the RIS to enable the RIS to detect control and feedback information that the RIS is reflecting from a transmitter to a receiver.

10. The method of claim 1, further comprising: transmitting configuration information to the UE to enable the UE to establish a link with the RIS.

11. A method comprising:
  receiving channel measurement configuration information from a base station (BS), the channel measurement configuration information for configuring a user equipment (UE) to measure a channel between the BS and the UE for which a signal on the channel has been reflected by a reflective intelligent surface (RIS);
  receiving physical layer configuration information, the physical layer configuration information for configuring the UE to receive data from the BS or transmit data to the BS that is reflected by the RIS; and
  receiving data from the RIS or transmitting data to the RIS.

12. The method of claim 11, further comprising: transmitting feedback information comprising channel measurement information pertaining to the channel on a link between the BS and UE via reflection by the RIS or the channel on a link between the RIS and UE.

13. The method of claim 11, further comprising: receiving a message comprising an indication for activation of the UE.

14. The method of claim 11, further comprising:
  receiving a reference signal (RS) for channel measurement; and
  measuring the RS.

15. The method of any one of claim 11, further comprising:
  receiving configuration information from the BS to enable the UE to establish a link with the RIS; and
  establishing a link with the RIS.

16. A method comprising:
  receiving reflective intelligent surface (RIS) panel channel measurement configuration information, the RIS panel channel measurement configuration information for configuring a RIS to reflect a reference signal (RS) for measurement to a user equipment (UE);
  redirecting the RS to the UE, or receiving the RS from the UE;
  receiving RIS panel configuration information, the RIS panel configuration information for configuring the RIS to reflect data from a base station (BS) to the UE or from UE to the BS; and
  redirecting the data from the BS to the UE or from UE to the BS.

17. An apparatus comprising:
  a non-transitory computer readable storage medium storing programming including instructions; and
  a processor configured to execute the instructions to cause the apparatus to:
  receive channel measurement configuration information from a base station (BS), the channel measurement configuration information for configuring the apparatus to measure a channel between the BS and the apparatus for which a signal on the channel has been reflected by a reflective intelligent surface (RIS);
  receive physical layer configuration information, the physical layer configuration information for configuring the apparatus to receive data from the BS or transmit data to the BS that is reflected by the RIS; and
  receive data from the RIS or transmit data to the RIS.

18. The apparatus of claim 17, the processor further configured to execute the instructions to cause the apparatus to: transmit feedback information comprising channel measurement information pertaining to the channel on a link between the BS and the apparatus via reflection by the RIS or the channel on a link between the RIS and the apparatus.

19. The apparatus of claim 17, the processor further configured to execute the instructions to cause the apparatus to:
  receive configuration information from the BS to enable the apparatus to establish a link with the RIS; and
  establish a link with the RIS.

20. The apparatus of claim 17, the processor further configured to execute the instructions to cause the apparatus to: receive a message comprising an indication for activation of the UE.

* * * * *

UNITED STATES PATENT AND TRADEMARK OFFICE
CERTIFICATE OF CORRECTION

| | | |
|---|---|---|
| PATENT NO. | : 12,218,717 B2 | Page 1 of 1 |
| APPLICATION NO. | : 18/325454 | |
| DATED | : February 4, 2025 | |
| INVENTOR(S) | : Baligh et al. | |

It is certified that error appears in the above-identified patent and that said Letters Patent is hereby corrected as shown below:

On the Title Page

Item (71), in Column 1, in "Applicant", Line 2, delete "Guangdong" and insert -- Shenzhen --.

Signed and Sealed this
First Day of April, 2025

Coke Morgan Stewart
*Acting Director of the United States Patent and Trademark Office*